US006172176B1

(12) United States Patent
Tanaka et al.

(10) Patent No.: US 6,172,176 B1
(45) Date of Patent: Jan. 9, 2001

(54) ELECTROPHOTOGRAPHIC PHOTOCONDUCTOR AND AROMATIC POLYCARBONATE RESIN FOR USE THEREIN

(75) Inventors: Chiaki Tanaka; Masaomi Sasaki; Katsukiyo Nagai; Shinichi Kawamura, all of Shizuoka; Susumu Suzuka, Saitama; Katsuhiro Morooka, Ibaraki, all of (JP)

(73) Assignee: Ricoh Company, Ltd., Tokyo (JP)

( * ) Notice: Under 35 U.S.C. 154(b), the term of this patent shall be extended for 0 days.

(21) Appl. No.: 09/337,559

(22) Filed: Jun. 22, 1999

Related U.S. Application Data

(62) Division of application No. 09/095,708, filed on Jun. 11, 1998.

(30) Foreign Application Priority Data

| | | |
|---|---|---|
| Jun. 11, 1997 | (JP) | 9-153846 |
| Jun. 11, 1997 | (JP) | 9-153988 |
| Nov. 27, 1997 | (JP) | 9-326324 |
| Jun. 9, 1998 | (JP) | 10-160845 |
| Jun. 9, 1998 | (JP) | 10-160853 |
| Jun. 10, 1998 | (JP) | 10-162207 |
| Jun. 10, 1998 | (JP) | 10-162228 |

(51) Int. Cl.$^7$ C08G 64/00
(52) U.S. Cl. 528/196; 430/73; 528/198
(58) Field of Search 430/73, 56, 59, 430/83; 528/196

(56) References Cited

U.S. PATENT DOCUMENTS

| | | | |
|---|---|---|---|
| 4,806,443 | 2/1989 | Yanus et al. | 430/56 |
| 4,818,650 | 4/1989 | Limburg et al. | 430/56 |
| 5,736,285 | 4/1998 | Nukada et al. | 430/83 |
| 5,789,128 | 8/1998 | Adachi et al. | 430/83 |
| 5,840,454 | 11/1998 | Nagai et al. | 430/56 |
| 5,846,680 | 12/1998 | Adachi et al. | 430/73 |

*Primary Examiner*—Terressa M. Boykin
(74) *Attorney, Agent, or Firm*—Oblon, Spivak, McClelland, Maier & Neustadt, P.C.

(57) ABSTRACT

An electrophotographic photoconductor has an electroconductive support, and a photoconductive layer which is formed thereon and contains as an effective component an aromatic polycarbonate resin having a structural unit of formula (1), two structural units of formula (1) and (2), or a repeat unit of formula (3):

(1)

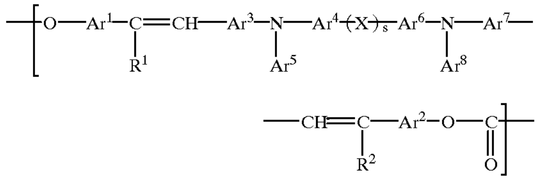

(2)

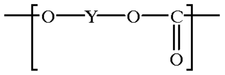

(3)

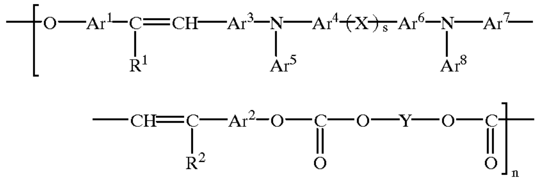

wherein $R^1$ and $R^2$, $Ar^1$ to $Ar^8$, X, Y, s and n are as specified in the specification. The above-mentioned aromatic polycarbonate resin is provided with charge transporting properties.

12 Claims, 20 Drawing Sheets

ELECTROPHOTOGRAPHIC PHOTOCONDUCTOR AND AROMATIC POLYCARBONATE RESIN FOR USE THEREIN

This application is a division of application Ser. No. 09/095,708, filed on Jun. 11, 1998, pending.

BACKGROUND OF THE INVENTION

1. Field of the Invention

The present invention relates to an electrophotographic photoconductor comprising an electroconductive support, and a photoconductive layer formed thereon, comprising an aromatic polycarbonate resin. In addition, the present invention also relates to the above-mentioned aromatic polycarbonate resin with charge transporting properties.

2. Discussion of Background

Recently organic photoconductors (OPC) are used in many copying machines and printers. These organic photoconductors have a layered structure comprising a charge generation layer (CGL) and a charge transport layer (CTL) which are successively overlaid on an electroconductive support. The charge transport layer (CTL) is a film-shaped layer comprising a binder resin and a low-molecular-weight charge transport material (CTM) dissolved therein. The addition of such a low-molecular-weight charge transport material (CTM) to the binder resin lowers the intrinsic mechanical strength of the binder resin, so that the CTL film is fragile and has a low tensile strength. Such lowering of the mechanical strength of the CTL causes the wearing of the photoconductor or forms scratches and cracks on the surface of the photoconductor.

Although some vinyl polymers such as polyvinyl anthracene, polyvinyl pyrene and poly-N-vinylcarbazole have been studied as high-molecular-weight photoconductive materials for forming a charge transporting complex for use in the conventional organic photoconductor, such polymers are not satisfactory from the viewpoint of photosensitivity.

In addition, high-molecular-weight materials having charge transporting properties have been also studied to eliminate the shortcomings of the above-mentioned layered photoconductor. For instance, there are proposed an acrylic resin having a triphenylamine structure as reported by M. Stolka et al., in "J. Polym. Sci., vol 21, 969 (1983)"; a vinyl polymer having a hydrazone structure as described in "Japan Hard Copy '89 p. 67"; and polycarbonate resins having a triarylamine structure as disclosed in U.S. Pat. Nos. 4,801,517, 4,806,443, 4,806,444, 4,937,165, 4,959,288, 5,030,532, 5,034,296, and 5,080,989, and Japanese Laid-Open Patent Applications Nos. 64-9964, 3-221522, 2-304456, 4-11627, 4-175337, 4-18371, 4-31404, and 4-133065. However, any materials have not yet been put to practical use.

According to the report of "Physical Review B46 6705 (1992)" by M. A. Abkowitz et al., it is confirmed that the drift mobility of a high-molecular weight charge transport material is lower than that of a low-molecular weight material by one figure. This report is based on the comparison between the photoconductor comprising a low-molecular weight tetraarylbenzidine derivative dispersed in the photoconductive layer and the one comprising a high-molecular polycarbonate having a tetraarylbenzidine structure in its molecule. The reason for this has not been clarified, but it is suggested that the photoconductor employing the high-molecular weight charge transport material produces poor results in terms of the photosensitivity and the residual potential although the mechanical strength of the photoconductor is improved.

Conventionally known representative aromatic polycarbonate resins are obtained by allowing 2,2-bis(4-hydroxyphenyl)propane (hereinafter referred to as bisphenol A) to react with phosgene or diphenylcarbonate. Such polycarbonate resins made from bisphenol A are used in many fields because of their excellent characteristics, such as high transparency, high heat resistance, high dimensional accuracy, and high mechanical strength.

For example, this kind of polycarbonate resin is intensively studied as a binder resin for use in an organic photoconductor in the field of electrophotography. A variety of aromatic polycarbonate resins have been proposed as the binder resins for use in the charge transport layer of the layered photoconductor.

As previously mentioned, however, the mechanical strength of the aforementioned aromatic polycarbonate resin is decreased by the addition of the low-molecular-weight charge transport material in the charge transport layer of the layered electrophotographic photoconductor.

The electrophotographic process is one of the image formation processes, through which the surface of the photoconductor is charged uniformly in the dark to a predetermined polarity, for instance, by corona charge. The uniformly charged photoconductor is exposed to a light image to selectively dissipate the electric charge of the light-exposed area, so that a latent electrostatic image is formed on the photoconductor. The thus formed latent electrostatic image is developed to a visible image by a developer comprising a coloring agent such as a dye or pigment, and a binder agent such as a polymeric material.

Fundamental characteristics required for the photoconductor used in such an electrophotographic process are: (1) chargeability to an appropriate potential in the dark, (2) minimum dissipation of electric charge in the dark, and (3) rapid dissipation of electric charge when exposed to light.

However, the conventional photoconductive materials are not always satisfactory in light of the above-mentioned fundamental characteristics for the photoconductor and the mechanical durability.

SUMMARY OF THE INVENTION

It is therefore a first object of the present invention to provide an electrophotographic photoconductor free from the conventional shortcomings, which can show high photosensitivity and high durability.

A second object of the present invention is to provide an aromatic polycarbonate resin that is remarkably useful as a high-molecular-weight charge transport material for use in an organic electrophotographic photoconductor.

The above-mentioned first object of the present invention can be achieved by an electrophotographic photoconductor comprising an electroconductive support, and a photoconductive layer formed thereon comprising as an effective component an aromatic polycarbonate resin comprising a structural unit of formula (1):

(1)

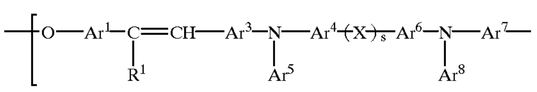

-continued

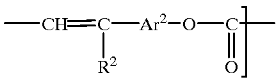

wherein $R^1$ and $R^2$, which may be the same or different, are each a hydrogen atom, an alkyl group which may have a substituent, or an aryl group which may have a substituent; $Ar^1$, $Ar^2$, $Ar^3$, $Ar^4$, $Ar^6$ and $Ar^7$, which may be the same or different, are each an arylene group which may have a substituent; $Ar^5$ and $Ar^8$, which may be the same or different, are each an aryl group which may have a substituent; and s is an integer of 0 or 1, and when s=1, X is —O—, —S—, —SO—, —$SO_2$—, —CO—, a straight-chain, branched or cyclic alkylene group having 1 to 12 carbon atoms, or an arylene group which may have a substituent.

In the above-mentioned photoconductor, the structural unit of formula (1) may be represented by the following formula (4):

(4)

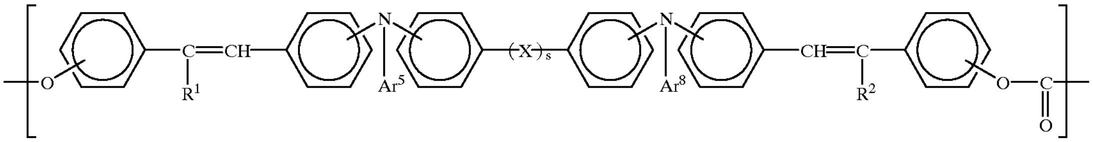

wherein $R^1$, $R^2$, $Ar^5$, $Ar^8$ and X are the same as those previously defined in formula (1).

Further, the structural unit of formula (4) may be represented by formula (6):

(6)

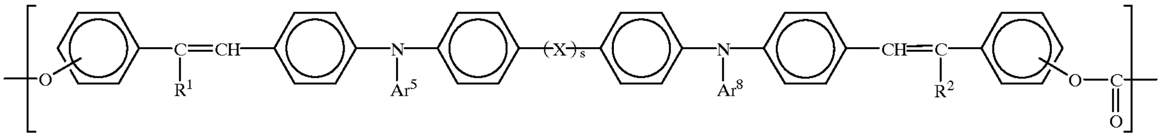

wherein $R^1$, $R^2$ , $Ar^5$, $Ar^8$ and X are the same as those previously defined in formula (1).

To be more specific, the structural unit of formula (6) may be represented by formula (8):

(8)

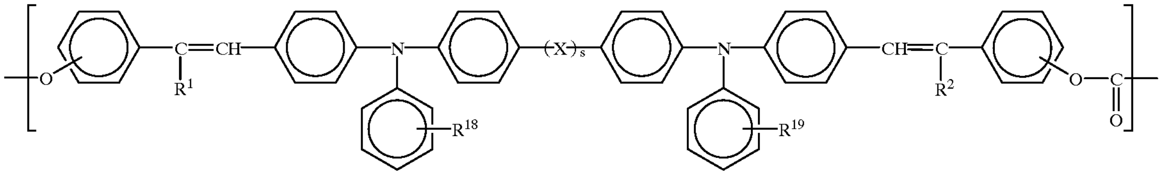

wherein $R^1$, $R^2$ and X are the same as those previously defined in formula (1); and $R^{18}$ and $R^{19}$, which may be the same or different, are each a hydrogen atom, an alkyl group which may have a substituent, or an aryl group which may have a substituent.

The first object of the present invention can also be achieved by an electrophotographic photoconductor comprising an electroconductive support, and a photoconductive layer formed thereon comprising as an effective component an aromatic polycarbonate resin having the aforementioned structural unit of formula (1) and a structural unit of the following formula (2), with the composition ratio of the structural unit of formula (1) to the structural unit of formula (2) satisfying a relationship of $0<k/(k+j)\leqq 1$, wherein k is the moiety ratio of the structural unit of formula (1), and j is the moiety ratio of the structural unit of formula (2):

(2)

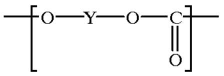

wherein Y is a bivalent aliphatic group, a bivalent cyclic aliphatic group, a bivalent aromatic group, a bivalent group obtained by bonding the above-mentioned bivalent groups, or

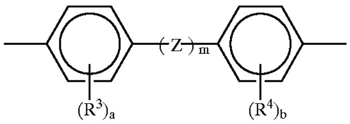

or

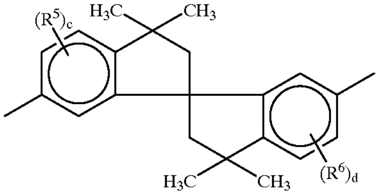

in which $R^3$, $R^4$, $R^5$ and $R^6$ are each independently an alkyl group which may have a substituent, an aryl group which may have a substituent, or a halogen atom; a and b are each independently an integer of 0 to 4; c and d are each independently an integer of 0 to 3; and m is an integer of 0 or 1, and when m=1, Z is a straight-chain alkylene group having 2 to 12 carbon atoms, —O—, —S—, —SO—, —$SO_2$—, —CO—,

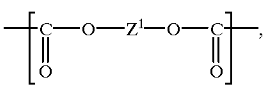, 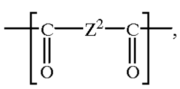,

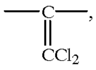, 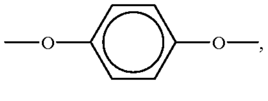, 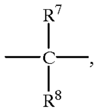,

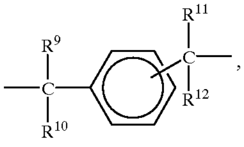, 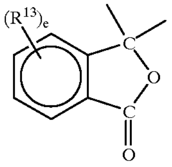,

-continued

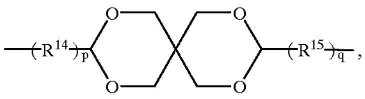, or

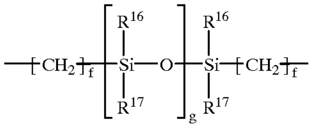

in which $Z^1$ and $Z^2$ are each a bivalent aliphatic group which may have a substituent or an arylene group which may have a substituent; and $R^7$, $R^8$, $R^9$, $R^{10}$, $R^{11}$, $R^{12}$ and $R^{13}$ are each independently a hydrogen atom, a halogen atom, an alkyl group having 1 to 5 carbon atoms which may have a substituent, an alkoxyl group having 1 to 5 carbon atoms which may have a substituent, or an aryl group which may have a substituent, and $R^7$ and $R^8$ may form a carbocyclic ring or heterocyclic ring having 6 to 12 carbon atoms in combination, or may form a carbocyclic ring or heterocyclic ring in combination with $R^3$ and $R^4$; p and q are each an integer of 0 or 1, when p and q represent 1, $R^{14}$ and $R^{15}$ are each an alkylene group having 1 to 4 carbon atoms; $R^{16}$ and $R^{17}$ are each independently an alkyl group having 1 to 5 carbon atoms which may have a substituent, or an aryl group which may have a substituent; e is an integer of 0 to 4; f is an integer of 0 to 20; and g is an integer of 0 to 2000.

Furthermore, the above-mentioned first object of the present invention can be achieved by an electrophotographic photoconductor comprising an electroconductive support, and a photoconductive layer formed thereon comprising as en effective component an aromatic polycarbonate resin having a repeat unit of formula (3):

(3)

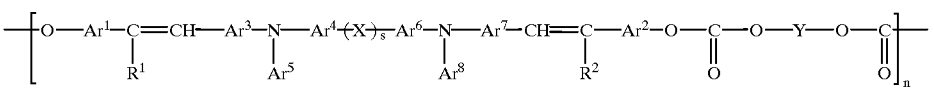

wherein $R^1$, $R^2$, $Ar^1$, $Ar^2$, $Ar^3$, $Ar^4$, $Ar^5$, $Ar^6$, $Ar^7$, $Ar^8$, X and Y are the same as those previously defined in formulas (1) and (2); and n is an integer of 2 to 5000.

In the above-mentioned photoconductor, the repeat unit of formula (3) may be represented by the following formula (5):

(5)

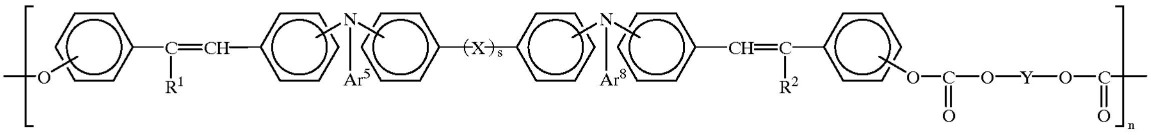

wherein $R^1$, $R^2$, $Ar^5$, $Ar^8$, X, Y and n are the same as those previously defined in formula (3).

Further, the repeat unit of formula (5) may be represented by the following formula (7):

mentioned formula (4), preferably formula (6), and further preferably formula (8).

(7)

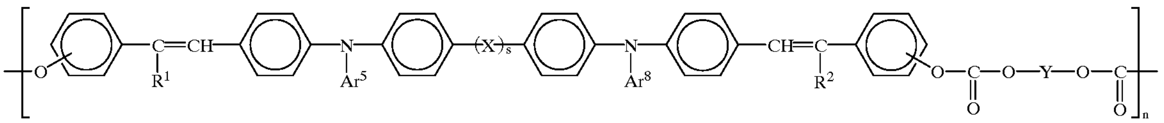

wherein $R^1$, $R^2$, $Ar^5$, $Ar^8$, X, Y and n are the same as those previously defined in formula (5).

To be more specific, the repeat unit of formula (7) may be represented by the following formula (9):

the second object of the present invention can also be achieved by an aromatic polycarbonate resin comprising the aforementioned structural units of formulas (1) and (2), with the composition ratio of the structural unit of formula (1) to (9)

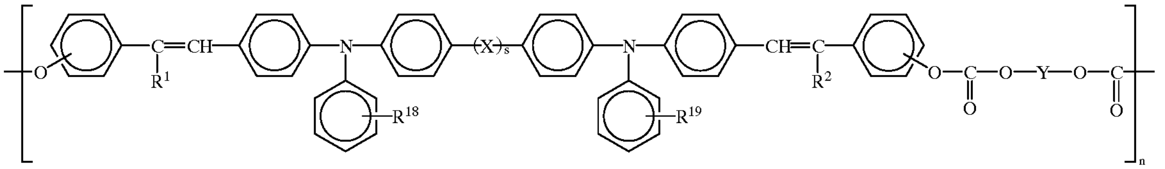

wherein $R^1$, $R^2$, $R^{10}$, $R^{15}$, X, Y and n are the same as those previously defined in formulas (8) and (2).

The second object of the present invention can be achieved by an aromatic polycarbonate resin comprising a structural unit of formula (1):

(1)

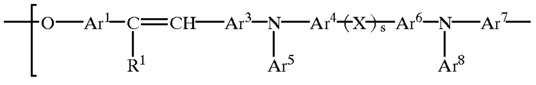

-continued

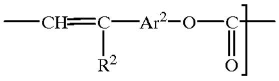

wherein $R^1$ and $R^2$, which may be the same or different, are each a hydrogen atom, an alkyl group which may have a substituent, or an aryl group which may have a substituent; $Ar^1$, $Ar^2$, $Ar^3$, $Ar^4$, $Ar^6$ and $Ar^7$, which may be the same or different, are each an arylene group which may have a substituent; $Ar^5$ and $Ar^6$, which may be the same or different, are each an aryl group which may have a substituent; and s is an integer of 0 or 1, and when s=1, X is —O—, —S—, —SO—, —$SO_2$—, —CO—, a straight-chain, branched or cyclic alkylene group having 1 to 12 carbon atoms, or an arylene group which may have a substituent.

In the above-mentioned polycarbonate resin, the structural unit of formula (1) may be represented by the abovethe structural unit of formula (2) satisfying a relationship of $0<k/(k+j)\leqq 1$, wherein k is the moiety ratio of the structural unit of formula (1), and j is the moiety ratio of the structural unit of formula (2).

Furthermore, the above-mentioned second object of the present invention can also be achieved by an aromatic polycarbonate resin comprising a repeat unit of formula (3):

(3)

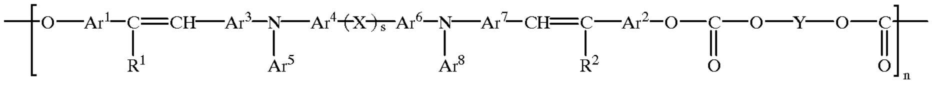

wherein $R^1$, $R^2$, $Ar^1$, $Ar^2$, $Ar^3$, $Ar^4$, $Ar^5$, $Ar^6$, $Ar^7$, $Ar^8$, X and Y are the same as those previously defined in formulas (1) and (2); and n is an integer of 2 to 5000.

In the above-mentioned aromatic polycarbonate resin, the repeat unit of formula (3) may be represented by the aforementioned formula (5), preferably formula (7), and more preferably formula (9).

BRIEF DESCRIPTION OF THE DRAWINGS

A more complete appreciation of the invention and may of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
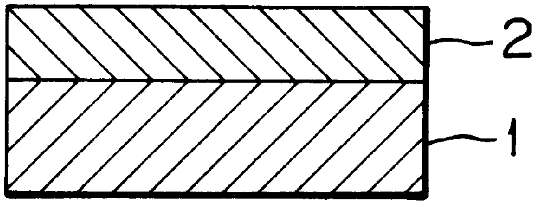
FIG. 1 is a schematic cross-sectional view of a first example of an electrophotographic photoconductor according to the present invention.

The electrophotographic photoconductor according to the present invention comprises a photoconductive layer comprising:

(i) an aromatic polycarbonate resin comprising at least a structural unit with the charge transporting properties, represented by formula (1), (4), (6) or (8), (ii) an aromatic polycarbonate resin consisting of a structural unit with the charge transporting properties, represented by (1), (4), (6) or (8), (iii) an aromatic polycarbonate copolymer resin comprising a structural unit with the charge transporting properties, represented by formula (1), (4), (6) or (8), and a structural unit of formula (2) for imparting other properties than the charge transporting properties to the obtained resin, and (iv) an aromatic polycarbonate alternating copolymer resin comprising a repeat unit with the charge transporting properties, represented by formula (3), (5), (7) or (9).

Those aromatic polycarbonate resins, which are novel compounds, have charge transporting properties and high mechanical strength, so that the electrical, optical and mechanical characteristics required for the charge transport layer of the photoconductor are satisfactory when the polycarbonate resins are used therein.

As previously mentioned, the aromatic polycarbonate resin of the present invention comprises the structural unit of formula (1):

(1)

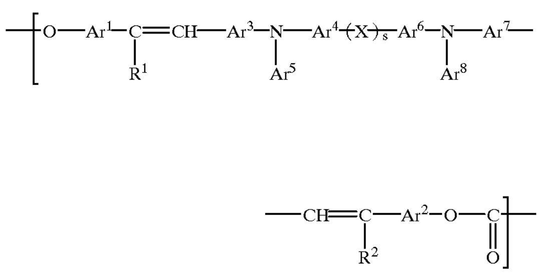

wherein $R^1$ and $R^2$, which may be the same or different, are each a hydrogen atom, and alkyl group which may have a substituent, or an aryl group which may have a substituent; $Ar^1$, $Ar^2$, $Ar^3$, $Ar^4$, $Ar^6$ and $Ar^7$, which may be the same or different, are each an arylene group which may have a substituent; $Ar^5$ and $Ar^8$, which may be the same or different, are each an aryl group which may have a substituent; and s is an integer of 0 and 1, and when s=1, X is —O—, —S—, —SO—, —$SO_2$—, —CO—, a straight-chain, branched or cyclic alkylene group having 1 to 12 carbon atoms, or an arylene group which may have a substituent.

It is preferable that the structural unit of formula (1) be represented by the following formula (4):

(4)

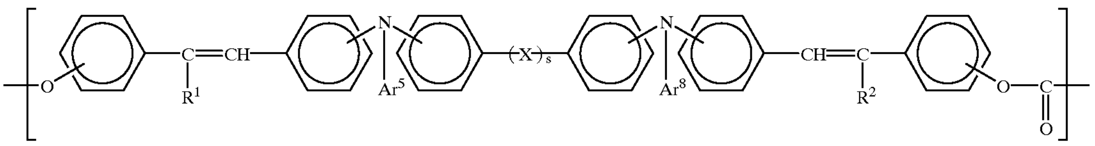

wherein $R^1$, $R^2$, $Ar^5$, $Ar^8$ and X are the same as those previously defined in formula (1).

Further, the structural unit of formula (4) may be represented by formula (6):

(6)

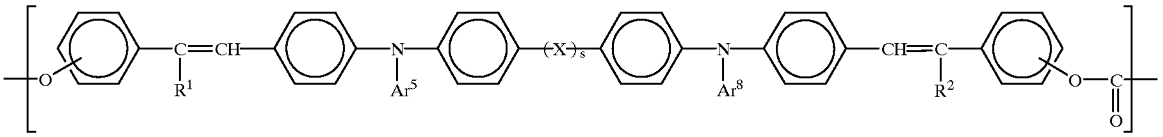

wherein $R^1$, $R^2$, $Ar^5$, $Ar^8$ and X are the same as those previously defined in formula (1).

To be more specific, the structural unit of formula (6) may be represented by formula (8):

(8)

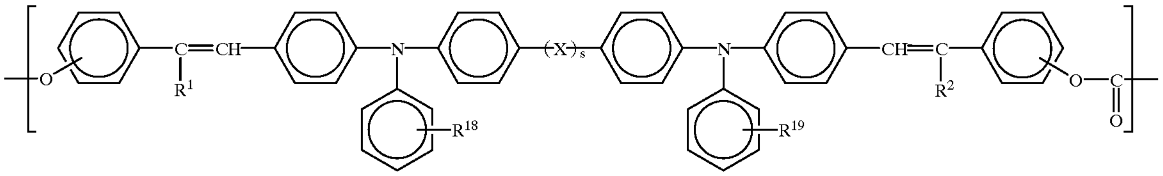

wherein $R^1$, $R^2$ and X are the same as those previously defined in formula (1); and $R^{18}$ and $R^{19}$, which may be the same or different, are each a hydrogen atom, an alkyl group which may have a substituent, or an aryl group which may have a substituent.

In addition, the polycarbonate resin of the present invention comprises the repeat unit of formula (3):

(3)

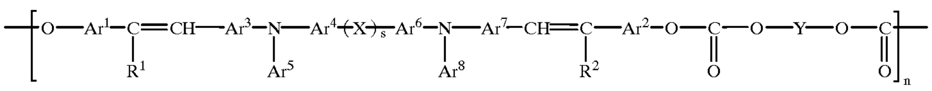

wherein $R^1$, $R^2$, $Ar^1$, $Ar^2$, $Ar^3$, $Ar^4$, $Ar^5$, $Ar^6$, $Ar^7$, $Ar^8$, X and Y are the same as those previously defined in formulas (1) and (2); and n is an integer of 2 to 5000.

It is preferable that the repeat unit of formula (3) be represented by the following formula (5):

(5)

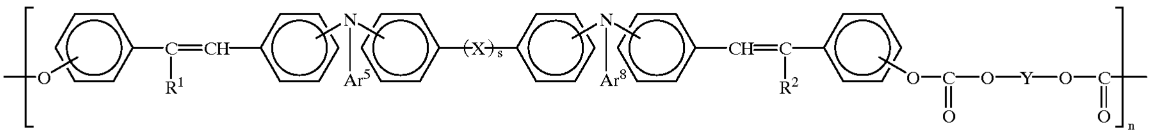

wherein $R^1$, $R^2$, $Ar^5$, $Ar^8$, X, Y and n are the same as previously defined in formula (3).

Further, the repeat unit of formula (5) may be represented by the following formula (7):

(7)

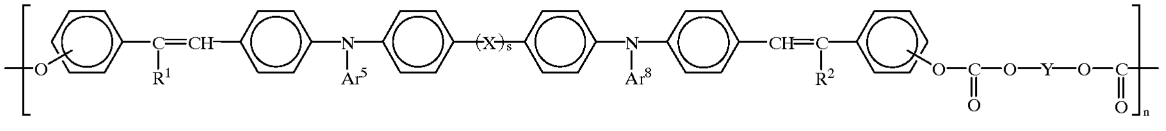

wherein $R^1$, $R^2$, $Ar^5$, $Ar^8$, X, Y and n are the same as those previously defined in formula (5).

To be more specific, the repeat unit of formula (7) may be represented by the following formula (9):

(9)

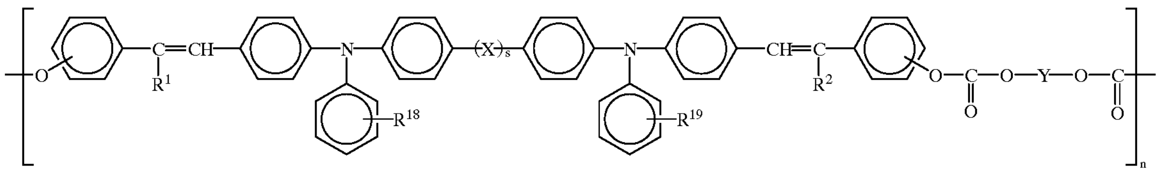

wherein $R^1$1, $R^2$, $R^{18}$, $R^{19}$, X, Y and n are the same as those previously defined.

Those aromatic polycarbonate resins according to the present invention can be obtained by the method of synthesizing a conventional polycarbonate resin, that is, polymerization of a bisphenol and a carbonic acid derivative.

(10)

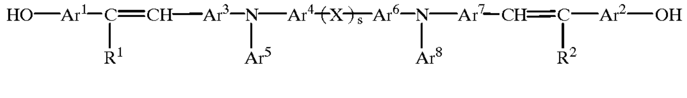

(11)

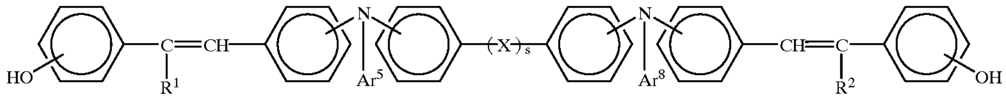

(12)

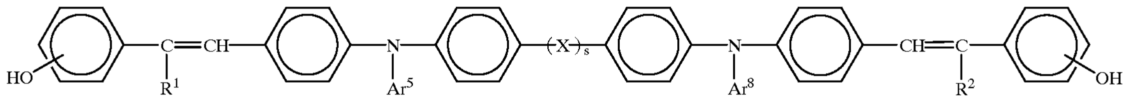

(13)

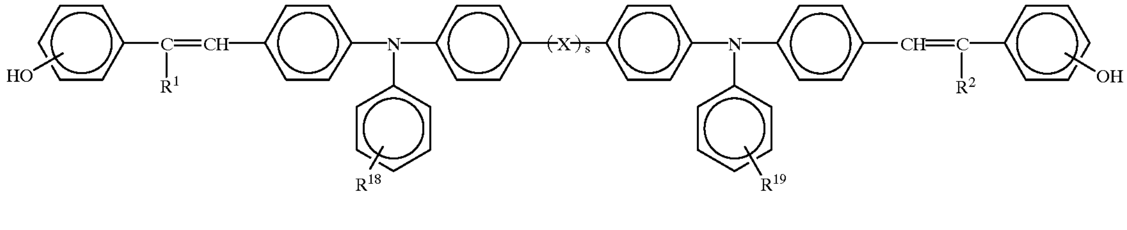

To be more specific, the aromatic polycarbonate resin of the present invention can be produced by the ester interchange between a diol compound having the charge transporting properties, represented by the following formula (10), (11), (12) or (13) and a bisarylcarbonate compound, or by the polymerization of the above-mentioned diol compound with a halogenated carbonyl compound such as phosgene in accordance with solution polymerization or interfacial polymerization, or by the polymerization of the above-mentioned diol compound with a bischloroformate compound derived from a diol compound in accordance with solution polymerization or interfacial polymerization.

wherein $R^1$ and $R^2$, $Ar^1$ to $Ar^8$, $R^{18}$ and $R^{19}$, and X are the same as those previously defined in formulas (1) and (8).

In addition to the phosgene, trichloromethyl chloroformate that is a dimer of phosgene, and bis(trichloromethyl carbonate that is a trimer of phosgene are usable as the hologenated carbonyl compounds in the above-mentioned polymerization. Further, halogenated carbonyl compounds derived from other halogen atoms than chlorine, for example, carbonyl bromide, carbonyl iodide and carbonyl fluoride are also employed.

Those conventional synthesis methods are described in the reference, such as "Handbook of Polycarbonate Resin" (issued by the Nikkan Kogyo Shimbun Ltd.).

When a diol of the following formula (14) is employed in combination with the diol of formula (10), (11), (12) or (13) with the charge transporting properties in the course of the polymerization, there can be produced a copolymer polycarbonate resin with improved mechanical characteristics. In this case, a plurality of kinds of diol compounds represented by formula (14) may be employed.

$$OH—Y—OH \quad (14)$$

wherein Y is the same as that previously defined in formula (2).

In such a synthesis method, the amount ratio of the diol represented by formula (10), (11), (12) or (13) which is provided with the charge transporting properties to the diol of formula (14) can be selected within a wide range in light of the desired characteristics of the obtained aromatic polycarbonate resin. Further, a variety of copolymers, such as a random copolymer, an alternating copolymer, a block copolymer, a random alternating copolymer, or a random block copolymer can be obtained according to the polymerization procedure.

For instance, a random copolymer comprising the structural unit of formula (1), (4), (6) or (8) and the structural unit of formula (2) can be obtained when the diol of formula (10), (11), (12) or (13) with the charge transporting properties and the diol of formula (4) are uniformly mixed prior to the condensation reaction with the phosgene. A random block copolymer can be obtained by adding several diols in the course of the polymerization reaction. Further, an alternating copolymer comprising a repeat unit of formula (3), (5), (7) or (9) can be produced by carrying out the condensation reaction of a bischloroformate compound derived from the diol of formula (14) with the diol having the charge transporting properties, represented by formula (10), (11), (12) or (13). In such a case, the above-mentioned alternating copolymer comprising a repeat unit of formula (3), (5), (7) or (9) can be similarly produced by carrying out the condensation reaction of a bischloroformate compound derived from the diol of formula (10), (11), (12) or (13) with the diol of formula (14). Further, a random alternating copolymer can be produced by employing a plurality of bischloroformate compounds and diol compounds in the course of the aforementioned condensation reaction between the bishchloroformate compound and the diol.

The interfacial polymerization is carried out at the interface between two phases of an alkaline aqueous solution of a diol and an organic solvent which is substantially incompatible with water and capable of dissolving a polycarbonate therein in the presence of the carbonic acid derivative and a catalyst. In this case, a polycarbonate resin with a narrow molecular-weight distribution can be speedily obtained by emulsifying the reactive medium through high-speed stirring operation or addition of an emulsifying material.

As a base for preparing the aforementioned alkaline aqueous solution, there can be employed an alkali metal and an alkaline earth metal. Specific examples of the base include hydroxides such as sodium hydroxide, potassium hydroxide and calcium hydroxide; and carbonates such as sodium carbonate, potassium carbonate, calcium carbonate and sodium hydrogencarbonate. Those bases may be used alone or in combination. Of those bases, sodium hydroxide and potassium hydroxide are preferable. In addition, distilled water or ion exchange water are preferably employed for the preparation of the above-mentioned alkaline aqueous solution.

Examples of the organic solvent used in the above-mentioned interfacial polymerization are alphatic halogenated hydrocarbon solvents such as dichloromethane, 1,2-dichoroethane, 1,2-dichloroethylene, trichloroethane, tetrachloroethane and dischloropropane; aromatic halogenated hydrocarbon solvents such as chlorobenzene and dichlorobenzene; and mixed solvents thereof. Further, aromatic hydrocarbon solvents such as toluene, xylene and ethylbenzene, and aliphatic hydrocarbon solvents such as hexane and cyclohexane may be added to the above-mentioned solvents. Of those organic solvents, the aliphatic halogenated hydrocarbon solvents and aromatic halogenated hydrocarbon solvents, in particular, dichloromethane and chlorobenzene are preferable in the present invention.

Examples of the catalyst used in the preparation of the polycarbonate resin are a tertiary amine, a quaternary ammonium salt, a tertiary phosphine, a quaternary phosphonium salt, a nitrogen-containing heterocyclic compound and salts thereof, an iminoether and salts thereof, and a compound having amide group.

Specific examples of such a catalyst used in the interfacial polymerization include trimethylamine, triethylamine, tri-n-propylamine, tri-n-hexylamine, N,N,N',N'-tetramethyl-1,4-tetramethylene-diamine, 4-pyrrolidinopyridine, N,N'-dimethylpiperazine, N-ethylpiperidine, benzyltrimethylammonium chloride, benzyltriethylammonium chloride, tetrmethylammonium chloride, tetraethylammonium bromide, phenyltriethyl-ammonium chloride, triethylphosphine, triphenylphosphine, diphenylbutylphosphine, tetra(hydroxymethyl) phosphonium chloride, benzyltriethlphosphonium chloride, benzyltriphenylphosphonium chloride, 4-methylpyridine, 1-methylimidazole, 1,2-diemthylimidazole, 3-methylpyridazine, 4,6-dimethylpyrimidine, 1-cyclohexyl-3,5-dimethylpyrazole, and 2,3,5,6-tetramethylpyrazine.

Those catalysts may be used alone or in combination. Of the above-mentioned catalysts, the tertiary amine, in particular, a tertiary amine having 3 to 30 carbon atoms, such as triethylamine is preferably employed in the present invention. Before and/or after the carbonic acid derivatives such as phosgene and bishcloroformate are placed in the reaction system, any of the above-mentioned catalysts may be added thereto.

To control the molecular weight of the obtained polycarbonate resin, it is desirable to employ a terminator as a molecular weight modifier for any of the above-mentioned polymerization reactions. Consequently, a substituent derived from the terminator may be bonded to the end of the molecule of the obtained polycarbonate resin.

As the terminator for use in the present invention, a monovalent aromatic hydroxy compound and haloformate derivatives thereof, and a monovalent carboxylic acid and halide derivatives thereof can be used alone or in combination.

Specific examples of the monovalent aromatic hydroxy compound are phenols such as phenol, p-cresol, o-ethylphenol, p-ethylphenol, p-isopropylphenol, p-tert-butylphenol, p-cumylphenol, p-cyclohexylphenol, p-octylphenol, p-nonylphenol, 2,4-xylenol, p-methoxyphenol, p-hexyloxyphenol, p-decyloxyphenol, o-chlorophenol, m-chlorophenol, p-chlorophenol, p-bromophenol, pentabromophenol, pentachlorophenol, p-phenylphenol, p-isopropenylphenol, 2,4-di(1'-methyl-1'-phenylethyl)phenol, β-naphthol, α-naphthol, p-(2',4',4'-trimethylchromanyl)phenol, and 2-(4'-methoxyphenyl)-2-(4"-hydroxyphenyl)propane. In addition, alkali metal salts and alkaline earth metal salts of the above phenols can also be employed.

Specific examples of the movalent carboxylic acid are aliphatic acids such as acetic acid, propionic acid, butyric acid, valeric acid, caproic acid, heptanic acid, caprylic acid, 2,2-dimethylpropionic acid, 3-methylbutyric acid, 3,3-dimethylbutyric acid, 4-methylvaleric acid, 3,3-dimethylvaleric acid, 4-methylcaproic acid, 3,5-dimethylcaproic acid and phenoxyacetic acid; and benzoic acids such as p-methylbenzoic acid, p-tert-butylbenzoic acid, p-butoxybenzoic acid, p-octyloxbenzoic acid, p-phenylbenzoic acid, p-benzylbenzoic acid and p-chlorobenzoic acid. In addition, alkali metal salts and alkaline earth metal salts of the above-mentioned aliphatic acids and benzoic acids can also be employed as the terminators.

Of those terminators, the monovalent aromatic hydroxy compound, in particular, phenol, p-tert-butylphenol, or p-cumylphenol is preferable.

It is preferable that the aromatic polycarbonate resin for use in the photoconductor of the present invention have a number-average molecular weight of 1,000 to 500,000, more preferably in the range of 10,000 to 200,000 when expressed by the styrene-reduced value.

Furthermore, a branching agent may be added in a small amount during the polymerization in order to improve the mechanical properties of the obtained polycarbonate resin. Any compounds having three or more reactive groups, which may be the same or different, selected from the group consisting of an aromatic hydroxyl group, a haloformate group, a carboxylic acid group, a carboxylic acid halide group, and an active halogen atom can be used as the branching agents for use in the present invention.

Specific examples of the branching agent for use in the present invention are as follows:

phloroglucinol,
4,6-dimethyl-2,4,6-tris(4'-hydroxyphenyl)-2-heptene,
4,6-dimethyl-2,4,6-tris(4'-hydroxyphenyl)heptane,
1,3,5-tris(4'-hydroxyphenyl)benzene,
1,1,1-tris(4'-hydroxyphenyl)ethane,
1,1,2-tris(4'-hydroxyphenyl)propane,
α,α,α'-tris(4'-hydroxyphenyl)-1-ethyl-4-isopropylbenzene,
2,4-bis[α-methyl-α-(4'-hydroxyphenyl)ethyl]phenol,
2-(4'-hydroxyphenyl)-2-(2",4"-dihydroxyphenyl)-propane,
tris)4-hydroxyphenyl)phosphine,
1,1,4,4-tetrakis(4'-hydroxyphenyl)cyclohexane,
2,2-bis[4',4'-bis(4"-hydroxyphenyl)cyclohexyl]-propane,
α,α,α',α'-tetrakis(4'-hydroxyphenyl)-1,4-diethylbenzene,
2,2,5,5-tetrakis(4'-hydroxyphenyl)hexane,
1,1,2,3-tetrakis(4'-hydroxphenyl)propane,
1,4-bis(4',4"-dihydroxytriphenylmethyl)benzene,
3,3',5,5'-tetrahydroxydiphenyl ether,
3,5-dihydroxybenzoic acid,
3,5-bis(chlorocarbonyloxy)benzoic acid,
4-hydroxyisophthalic acid,
4-chlorocarbonyloxyisophthalic acid,
5-hydroxyphthalic acid,
5-chlorocarbonyloxyphthalic acid,
trimesic trichloride, and
cyanuric chloride.

Those branching agents may be used alone or in combination.

To prevent the oxidation of the diol in the alkaline aqueous solution, an antioxidant such as hydrosulfite may be used in the interfacial polymerization reaction.

The interfacial polymerization reaction is generally carried out at temperature in the range of 0 to 40° C., and terminated in several minutes to 5 hours. It is desirable to maintain the reaction system to pH 10 or more.

In the case of the solution polymerization, the diol is dissolved in a proper solvent to prepare a solution of the diol, and a deacidifying agent is added thereto. Then, the bischloroformate compound, or the phosgene (or dimer and trimer thereof) is added to the above prepared mixture. In this case, tertiary amine compounds such as trimethylamine, trimethylamine and tripropylamine, and pyridine can be used as the deacidifying agent. Examples of the solvent for use in the above-mentioned solution polymerization are halogenated hydrocarbon solvents such as dichloromethane, dichloroethane, trichloroethane, tetrachloroethane, trichloroethylene, and chloroform; cyclic ethers such as tetrahydrofuran and dioxane; and pyridine. In addition, the same molecular weight modifier and branching agent as those employed in the interfacial polymerization can be used. The reaction temperature of the solution polymerization is generally in the range of 0 to 40° C. In this case, the polymerization is generally terminated in several minutes to 5 hours.

In the case where the polycarbonate resin is synthesized by the ester interchange method, the diol and the bisarylcarbonate are mixed in the presence of an inert gas, and the reaction is carried out at a temperature in the range of 120 to 350° C. under reduced pressure. The pressure in the reaction system is stepwise reduced to 1 mmHg or less in order to distill away the phenols generated during the reaction from the reaction system. The reaction is commonly terminated in about one to 4 hours. When necessary, the molecular weight modifier and the antioxidant may be added to the reaction system. As the bisarylcarbonate compound, diphenyl carbonate, di-p-tolyl carbonate, phenyl-p-tolyl carbonate, di-p-chlorophenyl carbonate and dinaphthyl carbonate can be employed.

The polycarbonate resin thus synthesized is purified by removing the catalyst and the antioxidant used in the polymerization; unreacted diol and terminator; and impurities such as an inorganic salt generated during the polymerization, and then subjected to the preparation of the photoconductive layer of the electrophotographic photoconductor according to the present invention. The previously mentioned “Handbook of Polycarbonate Resin” (issued b Nikkan Kogyo Shimbun Ltd.) can be referred to for such a procedure for purifying the polycarbonate resin.

To the aromatic polycarbonate resin produced by the previously mentioned methods, various additives such as an antioxidant, a light stabilizer, a thermal stabilizer, a lubricant and a plasticizer can be added when necessary.

The structural unit of formula (1) for use in the polycarbonate resin according to the present invention will now be explained in detail.

In the formula (1), the alkyl group represented by $R^1$ and $R^2$ is a straight-chain or branched alkyl group having 1 to 5 carbon atoms. The above alkyl group may have a substituent such as a halogen atom, or a phenyl group which may have a substituent of a straight-chain or branched alkyl group having 1 to 5 carbon atoms.

Specific examples of the above alkyl group represented by $R^1$ and $R^2$ include methyl group, ethyl group, n-propyl group, isopropyl group, tert-butyl group, sec-butyl group, n-butyl group, isobutyl group, trifluoromethyl group, benzyl group, 4-chlorobenzyl group, and 4-methylbenzyl group.

As the aryl group represented by $R^1$, $R^2$, $Ar^5$ and $Ar^6$, there can be employed phenyl group, naphthyl group, and bisphenylyl group. The aryl group may have as a substituent the above-mentioned substituted or unsubstituted alkyl group.

Specific examples of the aryl group represented by $R^1$,$R^2$, $Ar^5$ and $Ar^6$ include phenyl group, 4-methylphenyl group and 4'-methyl-4-biphenylyl group.

As the substituted or unsubstituted arylene group represented by $Ar^1$, $Ar^2$, $Ar^3$, $Ar^4$, $Ar^6$, $Ar^7$ and X, the bivalent groups derived from the substituted or unsubstituted aryl group defined in the description of $R^1$, $R^2$, $Ar^5$ and $Ar^8$.

Specific examples of the alkylene group represented by X include methylene group, ethylene group, 1,3-propylene group, 2,2-propylene group and 1,1-cyclohexylene group.

In other formulas than the formula (1), the same examples as defined in the description of formula (1) can be employed so long as the symbol such as $R^1$, $R^2$ or $Ar^1$ for use in the formula is identical.

Specific examples of the diol compound represented by formula (10), which is a raw material for the preparation of the polycarbonate resin according to the present invention, are shown in TABLE 1.

TABLE 1
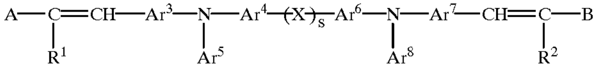
(s = 1)
| Diol Comp. No. | $Ar^3$ | $Ar^4$ | $Ar^5$ | $Ar^6$ | $Ar^7$ | $Ar^8$ |
|---|---|---|---|---|---|---|
| 1 |  | | | | | |
| 2 |  | | | | | |
| 3 |  | | | | | |
| 4 |  | | | | | |
| 5 |  | | | | | |
| 6 |  | | | | | |
| 7 |  | | | | | |

TABLE 1-continued
| | |
|---|---|
| | 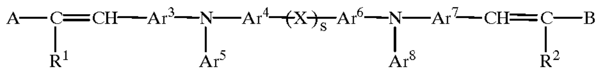 (s = 1) |
| 8 |  |
| 9 |  |
| 10 |  |
| 11 |  |
| 12 |  |
| 13 |  |
| 14 |  |
| 15 |  |

TABLE 1-continued
| | 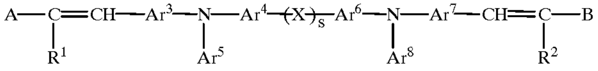 (s = 1) |
|---|---|
| 16 |  |
| 17 | 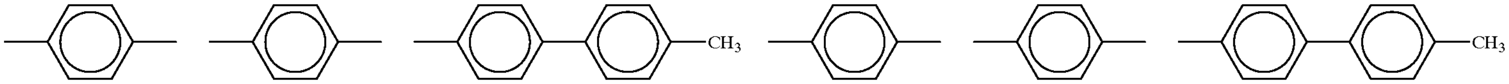 |
| 18 |  |
| 19 |  |
| 20 |  |
| 21 |  |
| 22 |  |
| 23 |  |

TABLE 1-continued
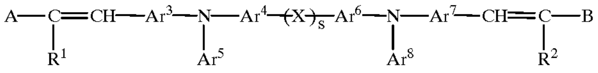
(s = 1)
| | |
|---|---|
| 24 |  |
| 25 |  |
| 26 |  |
| 27 |  |
| 28 |  |
| 29 |  |
| 30 |  |
| 31 |  |

TABLE 1-continued
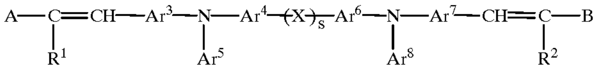
(s = 1)
| | |
|---|---|
| 32 |  |
| 33 |  |
| 34 |  |
| 35 |  |
| 36 |  |
| 37 |  |
| 38 |  |
| 39 |  |

TABLE 1-continued
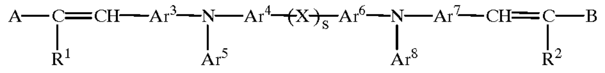
(s = 1)
| | |
|---|---|
| 40 |  |
| 41 |  |
| 42 |  |
| 43 |  |
| 44 |  |
| 45 | 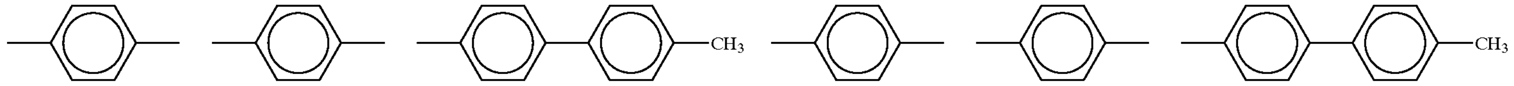 |
| 46 |  |
| 47 |  |

TABLE 1-continued
| | |
|---|---|
| | 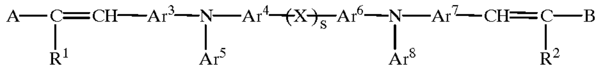 (s = 1) |
| 48 |  |
| 49 |  |
| 50 |  |
| 51 |  |
| 52 |  |
| 53 |  |
| 54 |  |
| 55 |  |

TABLE 1-continued
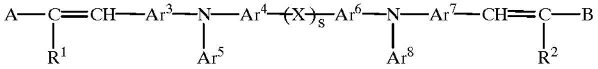
(s = 1)
| | |
|---|---|
| 56 |  |
| 57 |  |
| 58 |  |
| 59 |  |
| 60 |  |
| 61 |  |
| 62 |  |
| 63 |  |

TABLE 1-continued
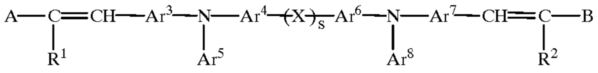
(s = 1)
| No. | |
|---|---|
| 64 |  |
| 65 | 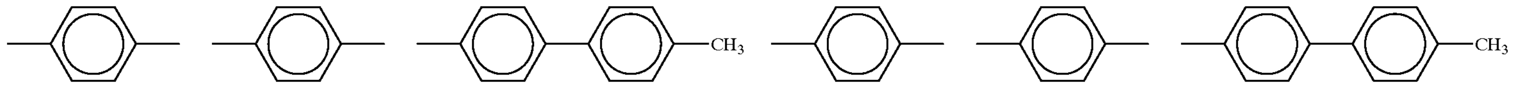 |
| 66 |  |
| 67 |  |
| 68 |  |
| 69 |  |
| 70 |  |
| 71 |  |

TABLE 1-continued
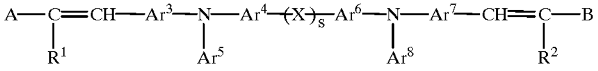
(s = 1)
| | | | | | | |
|---|---|---|---|---|---|---|
| 72 | 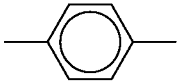 | 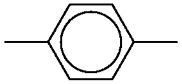 | 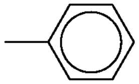 | 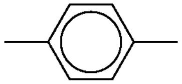 | 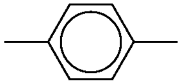 | 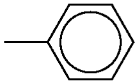 |
| 73 | 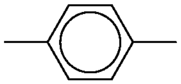 | 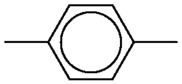 | 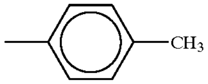 | 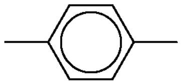 | 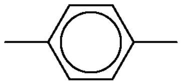 | 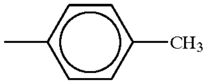 |
| 74 | 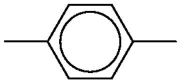 | 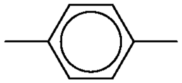 | 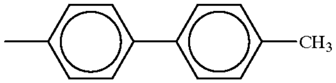 | 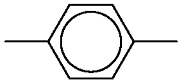 | 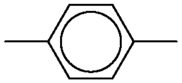 | 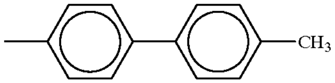 |
| Diol Comp. No. | $R^1$ | $R^2$ | A | B | X |
|---|---|---|---|---|---|
| 1 | H | H | 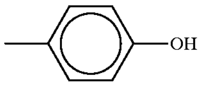 | 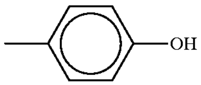 | $-CH_2CH_2-$ |
| 2 | H | H | 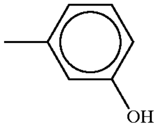 | 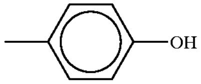 | $-CH_2CH_2-$ |
| 3 | H | H | 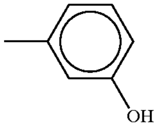 | 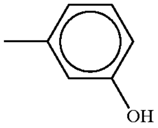 | $-CH_2CH_2-$ |
| 4 | H | H | 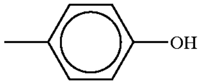 | 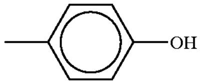 | $-CH_2-$ |

TABLE 1-continued
| | | | 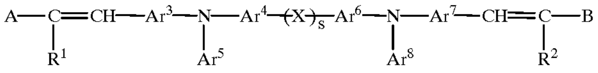 (s = 1) | | |
|---|---|---|---|---|---|
| 5 | H | H | 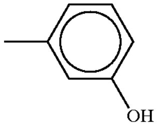 | 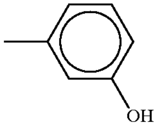 | —$CH_2$— |
| 6 | H | H | 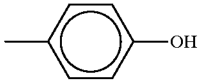 | 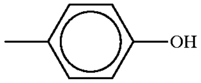 | 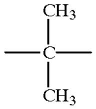 |
| 7 | H | H | 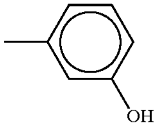 | 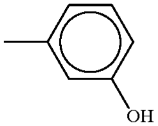 | 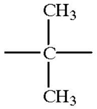 |
| 8 | H | H | 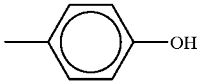 | 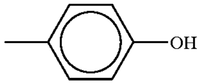 | —$CH_2CH_2CH_2$— |
| 9 | H | H | 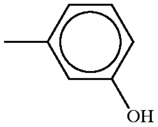 | 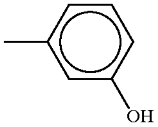 | —$CH_2CH_2CH_2$— |
| 10 | H | H | 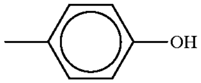 | 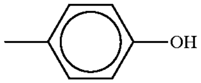 | 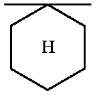 |
| 11 | H | H | 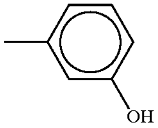 | 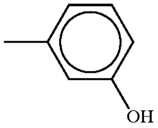 | 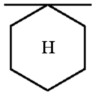 |

TABLE 1-continued
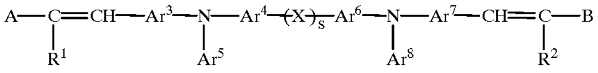
(s = 1)
| | | | | |
|---|---|---|---|---|
| 12 | H | H | 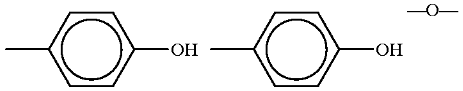 | —O— |
| 13 | H | H | 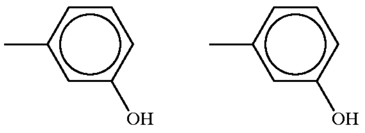 | —O— |
| 14 | H | H | 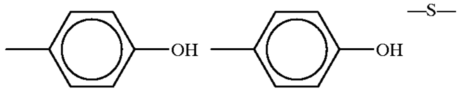 | —S— |
| 15 | H | H | 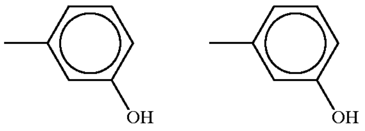 | —S— |
| 16 | H | H | 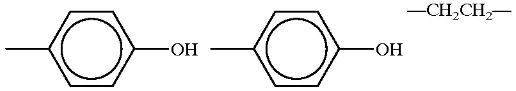 | $—CH_2CH_2—$ |
| 17 | H | H | 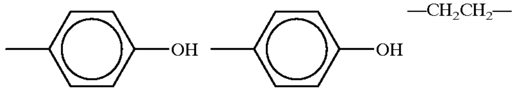 | $—CH_2CH_2—$ |
| 18 | H | H | 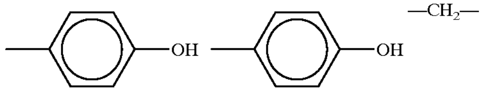 | $—CH_2—$ |

TABLE 1-continued
| | | | | |
|---|---|---|---|---|
| | | | 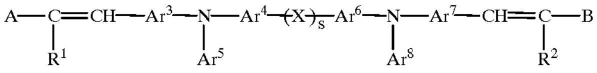<br>(s = 1) | |
| 19 | H | H | 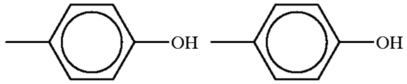 | 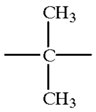 |
| 20 | H | H | 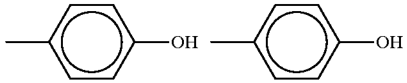 | $-CH_2CH_2-$ |
| 21 | H | H | 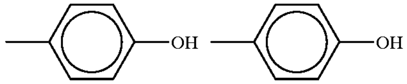 | 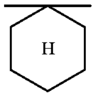 |
| 22 | H | H | 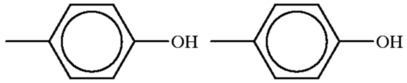 | —O— |
| 23 | H | H | 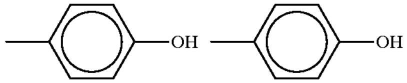 | —S— |
| 24 | H | H | 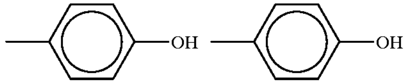 | $-CH_2CH_2-$ |
| 25 | H | H | 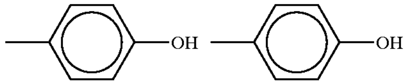 | 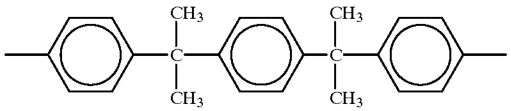 |

TABLE 1-continued
| | | | | | |
|---|---|---|---|---|---|
| | | | 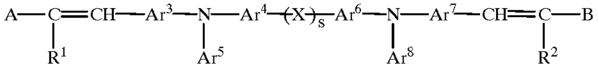 (s = 1) | | |
| 26 | H | H | 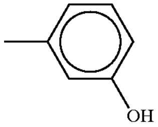 | 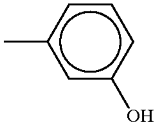 | 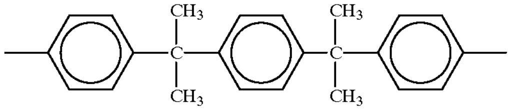 |
| 27 | H | H | 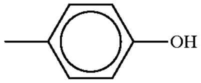 | 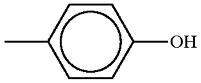 | 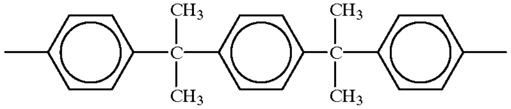 |
| 28 | H | H | 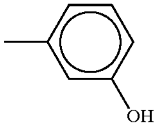 | 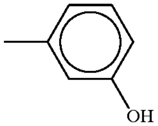 | 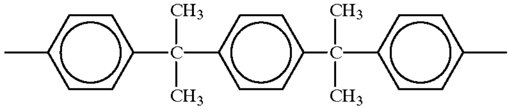 |
| 29 | 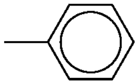 | 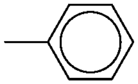 | 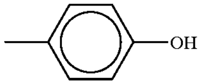 | 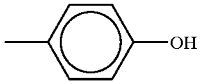 | $-CH_2CH_2-$ |
| 30 | 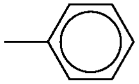 | 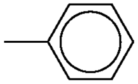 | 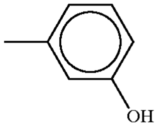 | 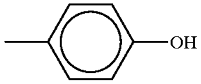 | $-CH_2CH_2-$ |
| 31 | 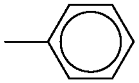 | 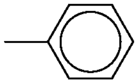 | 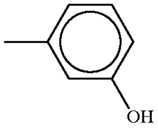 | 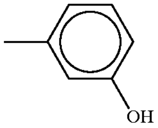 | $-CH_2CH_2-$ |
| 32 | 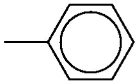 | 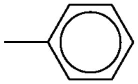 | 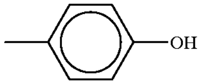 | 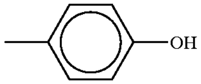 | $-CH_2-$ |

TABLE 1-continued
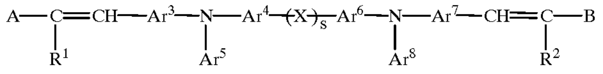
(s = 1)
| | | |
|---|---|---|
| 33 | 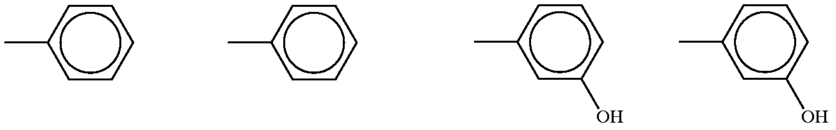 | —$CH_2$— |
| 34 | 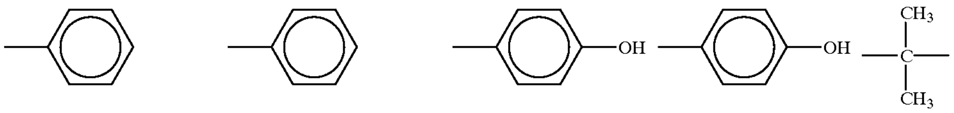 | |
| 35 | 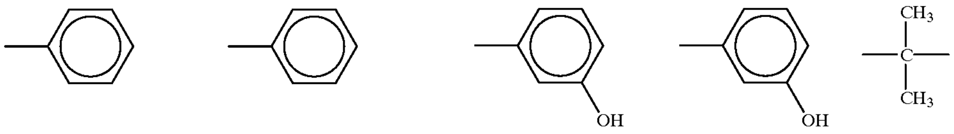 | |
| 36 | 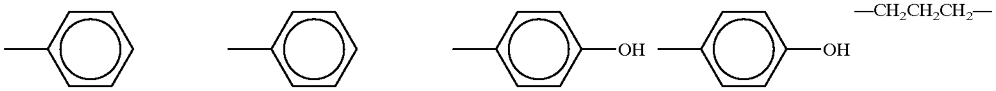 | —$CH_2CH_2CH_2$— |
| 37 | 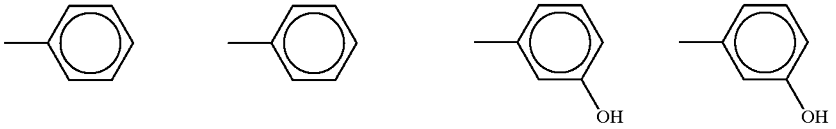 | —$CH_2CH_2CH_2$— |
| 38 | 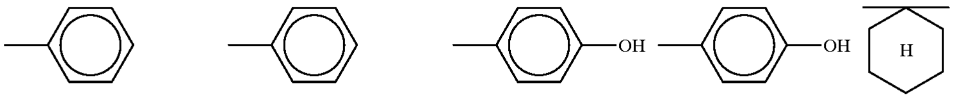 | |

TABLE 1-continued
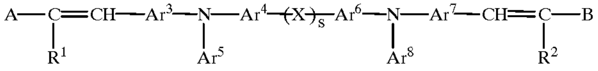
(s = 1)
| | | | | | |
|---|---|---|---|---|---|
| 39 | 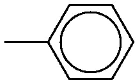 | 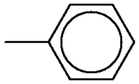 | 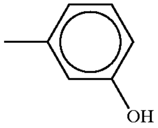 | 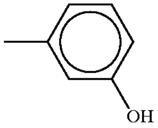 | 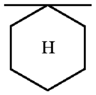 |
| 40 | 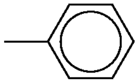 | 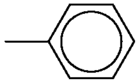 | 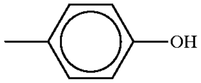 | 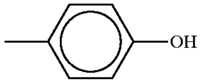 | —O— |
| 41 | 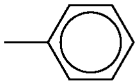 | 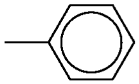 | 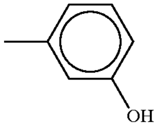 | 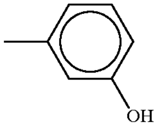 | —O— |
| 42 | 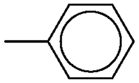 | 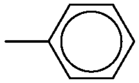 | 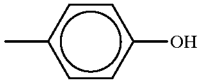 | 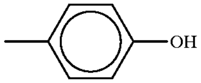 | —S— |
| 43 | 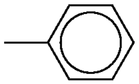 | 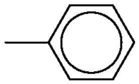 | 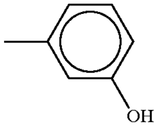 | 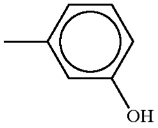 | —S— |
| 44 | 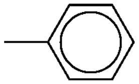 | 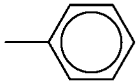 | 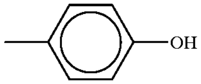 | 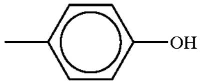 | $—CH_2CH_2—$ |
| 45 | 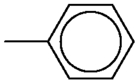 | 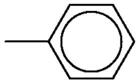 | 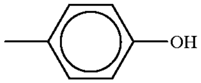 | 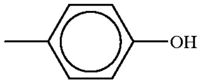 | $—CH_2CH_2—$ |

TABLE 1-continued
| | | |
|---|---|---|
| | 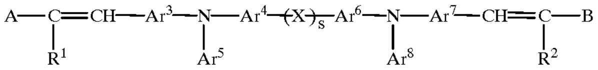 | |
| | (s = 1) | |
| 46 | 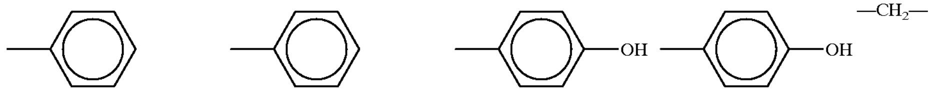 | $—CH_2—$ |
| 47 | 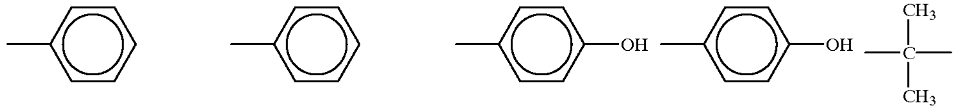 | |
| 48 | 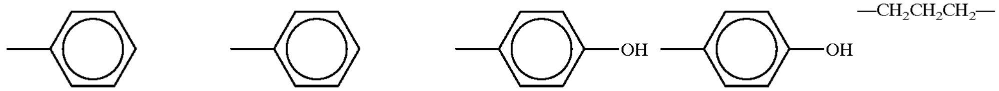 | $—CH_2CH_2CH_2—$ |
| 49 | 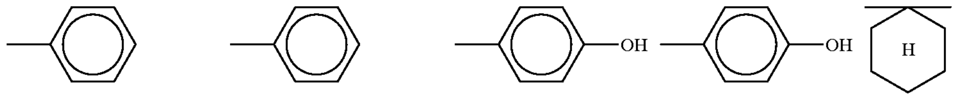 | |
| 50 | 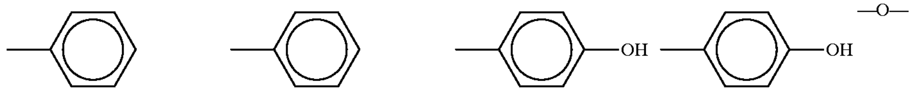 | —O— |
| 51 | 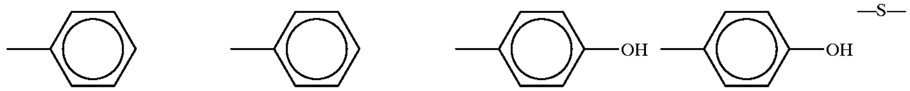 | —S— |
| 52 | 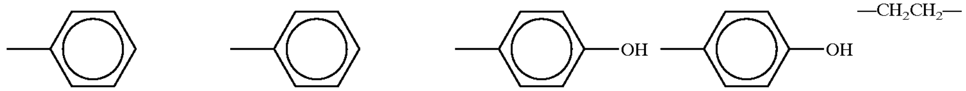 | $—CH_2CH_2—$ |
| 53 | 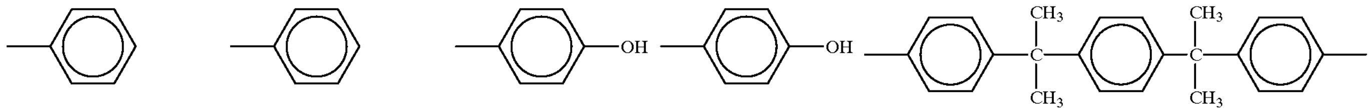 | |

TABLE 1-continued
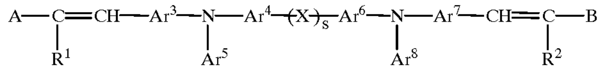
(s = 1)
| | | | | | |
|---|---|---|---|---|---|
| 54 | 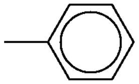 | 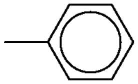 | 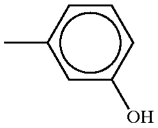 | 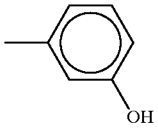 | 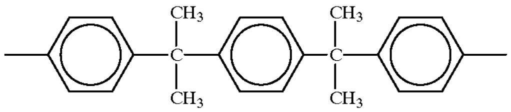 |
| 55 | 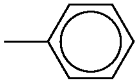 | 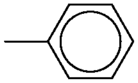 | 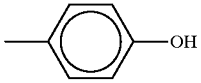 | 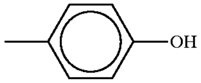 | 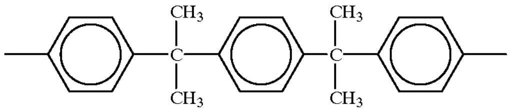 |
| 56 | 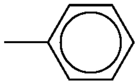 | 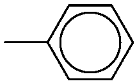 | 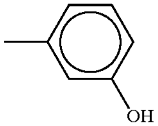 | 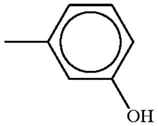 | 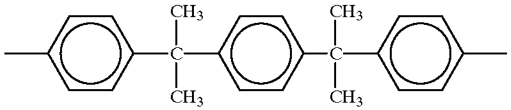 |
| 57 | $CH_3$ | $CH_3$ | 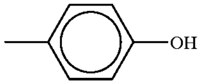 | 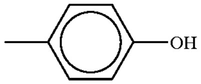 | $-CH_2CH_2-$ |
| 58 | $CH_3$ | $CH_3$ | 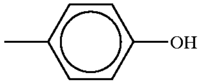 | 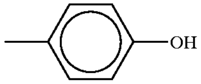 | $-CH_2-$ |
| 59 | $CH_3$ | $CH_3$ | 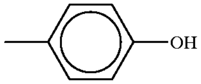 | 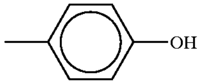 | 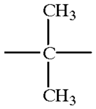 |
| 60 | $CH_3$ | $CH_3$ | 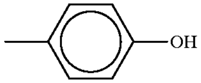 | 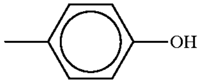 | $-CH_2CH_2CH_2-$ |

TABLE 1-continued
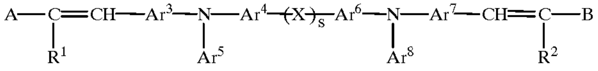
(s = 1)
| | | | | | |
|---|---|---|---|---|---|
| 61 | $CH_3$ | $CH_3$ | 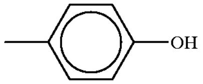 | 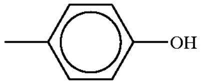 | 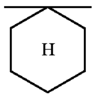 |
| 62 | $CH_3$ | $CH_3$ | 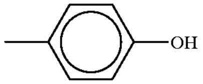 | 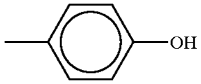 | —O— |
| 63 | $CH_3$ | $CH_3$ | 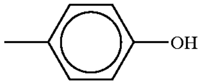 | 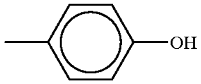 | —S— |
| 64 | $CH_3$ | $CH_3$ | 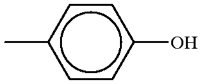 | 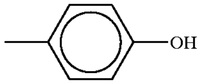 | $—CH_2CH_2—$ |
| 65 | $CH_3$ | $CH_3$ | 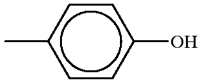 | 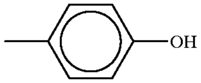 | $—CH_2CH_2—$ |
| 66 | 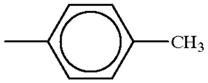 | 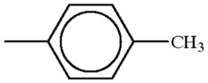 | 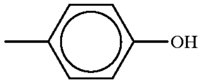 | 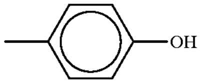 | $—CH_2CH_2—$ |
| 67 | 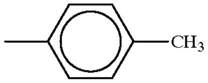 | 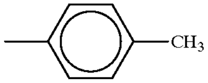 | 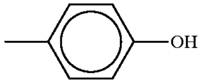 | 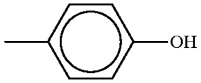 | $—CH_2—$ |
| 68 | 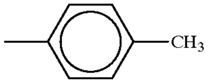 | 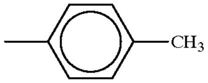 | 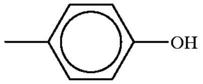 | 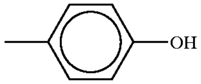 | 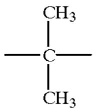 |

TABLE 1-continued
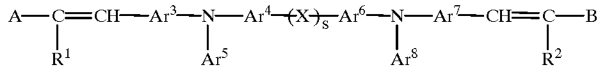
(s = 1)
| No. | Ar | X |
|---|---|---|
| 69 | 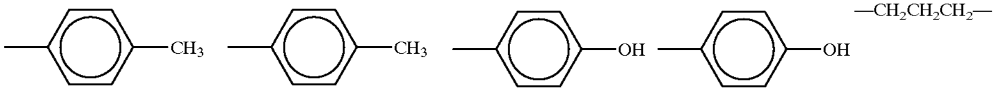 | $-CH_2CH_2CH_2-$ |
| 70 | 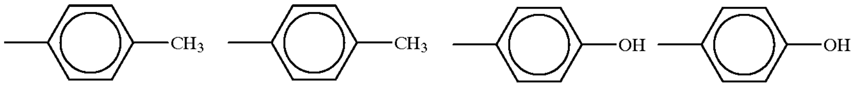 | 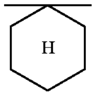 |
| 71 | 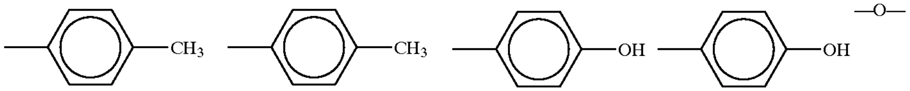 | —O— |
| 72 | 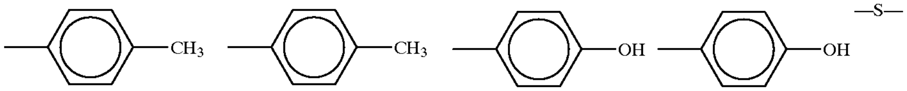 | —S— |
| 73 | 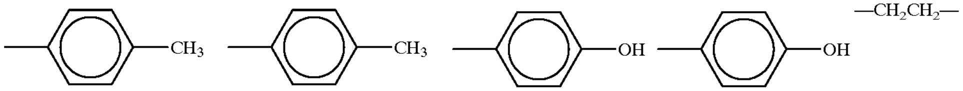 | $-CH_2CH_2-$ |
| 74 | 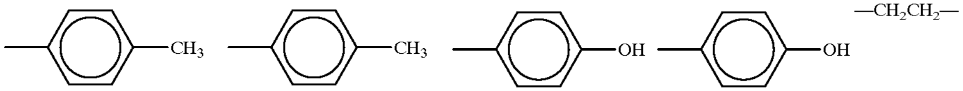 | $-CH_2CH_2-$ |

The diols represented by the formulas (10), (11), (12) and (13), which are intermediates for preparation of the aromatic polycarbonate resins according to the present invention, will now be explained in detail.

The above-mentioned diols (10), (11), (12) and (13) are hydroxystilbene compounds, which are novel compounds.

Those hydroxystilbene compounds are obtained from aminostilbene compounds by dealkylation or deacylation. The aminostilbene compounds of formulas (15), (16), (17) and (18), serving as the intermediates for the hydroxystilbene compounds of formulas (10), (11), (12) and (13), are as follows:

(15)

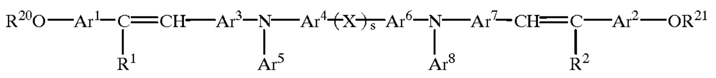

wherein $R^1$ and $R^2$, which may be the same or different, are each a hydrogen atom, an alkyl group which may have a substituent, or an aryl group which may have a substituent; $R^{20}$ and $R^{21}$, which may be the same or different, are each an alkyl group which may have a substituent or an acyl group which may have a substituent; $Ar^1$, $Ar^2$, $Ar^3$, $Ar^4$, $Ar^6$ and $Ar^7$, which may be the same or different, are each an arylene group which may have a substituent, $Ar^5$ and $Ar^8$, which may be the same or different, are each an aryl group which may have a substituent; and s is an integer of 0 or 1, and when s=1, X is —O—, —S—, —SO—, —$SO_2$—, —CO—, a straight-chain, branched or cyclic alkylene group having 1 to 12 carbon atoms, or an arylene group which may have a substituent.

(16)

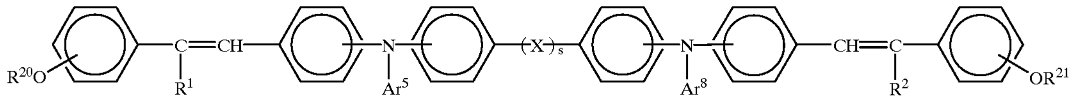

wherein $R^1$ and $R^2$, $R^{20}$ and $R^{21}$, $Ar^5$ and $Ar^8$, and X are the same as those previously defined in formula (15).

(17)

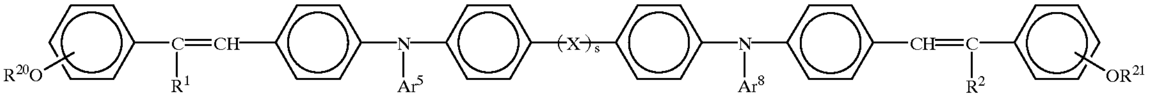

wherein $R^1$, $R^2$, $R^{20}$, $R^{21}$, $Ar^5$, $Ar^8$, and X are the same as those previously defined in formula (15).

(18)

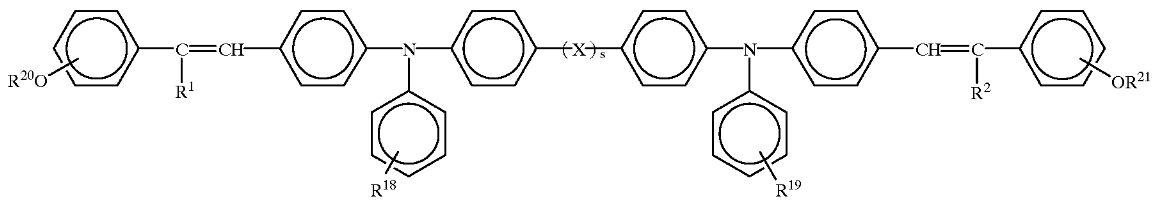

wherein $R^1$, $R^2$, $R^{18}$ and $R^{19}$, which may be the same or different, are each a hydrogen atom, an alkyl group which may have a substituent, or an aryl group which may have a substituent; $R^{20}$ and $R^{21}$, which may be the same or different, are each an alkyl group which may have a substituent or an acyl group which may have a substituent; and s is an integer of 0 or 1, and when s=1, X is —O—, —S—, —SO—, —$SO_2$—, —CO—, a straight-chain, branched or cyclic alkylene group having 1 to 12 carbon atoms, or an arylene group which may have a substituent.

To carry out the dealkylation of the aminostilbene compounds, the cleavage reaction in the aminostilbene compound is performed using an acidic reagent or a basic reagent.

Specific examples of the acidic reagent used in the cleavage reaction are hydrogen bromide, hydrogen iodide, trifluoroacetic acid, hydrochloride of pyridine, concentrated hydrochloric acid, magnesium iodide ethylate, aluminum chloride, aluminum bromide, boron tribromide, boron trichloride, and boron triiodide.

Specific examples of the basic reagent are potassium hydroxide, lithium diphenyl phosphide, and sodium thiolate.

For the above-mentioned cleavage reaction, a solvent such as dichloromethane, tetrahydrofuran (THF), N,N-dimethylformamide (DMF), pyridine or butanol can be employed. The reaction temperature, which varies depending on the activity of the employed reagent, is generally in the range of room temperature to 200° C.

As previously mentioned, the hydroxystilbene compound can be obtained by the deacylation of the aminostilbene compound. In this case, deacylation may be carried out using an acidic reagent such as hydrochloric acid or sulfuric acid, and a basic reagent such as sodium hydroxide or potassium hydroxide. As the solvent, there can be employed methanol, ethanol, isopropanol, butanol, 2-methoxyethanol, 1,2-dimethoxyethane, bis(2-methoxyethyl)ether, dioxane, tetrahydrofuran, benzene, toluene, xylene, dimethyl sulfoxide, N,N-dimethylformamide, N-methylpyrrolidone, and 1,3-dimethyl-2-imidazolydinone.

The above-mentioned aminostilbene compound can be obtained by allowing an aldehyde compound represented by the following formula (19) to react with a phosphorus-containing compound represented by the following formulas (20a) and (20b) in the presence of a basic catalyst at a temperature in the range of room temperature to about 100° C.:

(19)

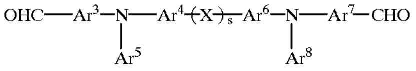

wherein $Ar^3$, $Ar^4$, $Ar^5$ and $Ar^7$, which may be the same or different, are each an arylene group which may have a substituent; $Ar^5$ and $Ar^8$, which may be the same or different, are each an aryl group which may have a substituent; and s is an integer of 0 or 1, and when s=1, X is —O—, —S—, —SO—, —$SO_2$—, —CO—, a straight-chain, branched or cyclic alkylene group having 1 to 12 carbon atoms, or an arylene group which may have a substituent.

(20a)

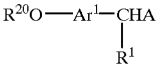

(20b)

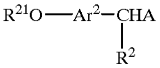

wherein $R^1$ and $R^2$ are each a hydrogen atom, an alkyl group which may have a substituent, or an aryl group which may have a substituent; $R^{20}$ and $R^{21}$ are each an alkyl group which may have a substituent or an acyl group which may have a substituent; $Ar^1$ and $Ar^2$ are each an arylene group which may have a substituent; and A represents (i) a phosphonium salt of formula —$P^{30}$ $(R^{22})_3B^-$, in which $R^{22}$ is phenyl group or a lower alkyl group, and B is a halogen atom; or (ii) a dialkyl phosphorous acid group of formula —$PO(OR^{23})_2$, in which $R^{25}$ is a lower alkyl group.

In the above-mentioned reaction for preparation of the aminostilbene compound, phenyl lithium, sodium hydroxide, potassium hydroxide, sodium amide, sodium hydride, and alcoholates such as sodium methylate and potassium-t-butoxide can be used as the basic catalysts.

Examples of the reaction solvent used in the above-mentioned reaction are methanol, ethanol, isopropanol, butanol, 2-methoxyethanol, 1,2-dimethoxyethane, bis(2-methoxyethyl)ether, dioxane, tetrahydrofuran, benzene, toluene, xylene, dimethyl sulfoxide, N,N-dimethylformamide, N-methylpyrrolidone and 1,3-dimethyl-2-imidazolidinone. Of these solvents, a polar solvent such as N,N-dimethylformamide or dimethyl sulfoxide is preferably employed.

The reaction temperature in the above-mentioned reaction may be determined within a wide range depending on (i) the stability of the employed solvent with respect to the employed basic catalyst, (ii) the reactivity of the condensed components, that is, the above-mentioned compounds (19), (20a) and (20b), and (iii) the reactivity of the employed basic catalyst as a condensation agent in the solvent. For instance, when a polar solvent is employed, the reaction temperature is in the range of room temperature to 100° C., preferably in the range of room temperature to 80° C. The reaction temperature may be further increased when it is desired to curtail the reaction time, or the activity of a condensation agent to be employed is low. Specific examples of the aminostilbene compound thus obtained are shown in TABLE 2.

TABLE 2
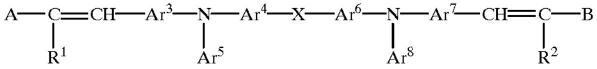
(s = 1)
| Amino-stil-bene Comp. No. | $Ar^3$ | $Ar^4$ | $Ar^5$ | $Ar^6$ | $Ar^7$ | $Ar^8$ |
| --- | --- | --- | --- | --- | --- | --- |
| 1 | 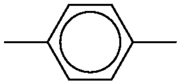 | 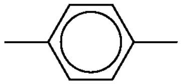 | 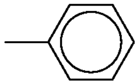 | 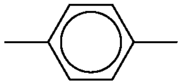 | 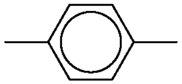 | 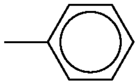 |
| 2 | 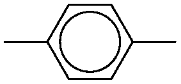 | 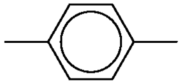 | 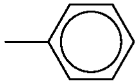 | 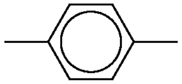 | 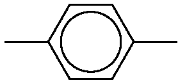 | 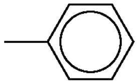 |
| 3 | 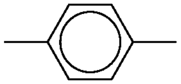 | 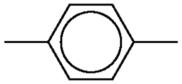 | 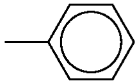 | 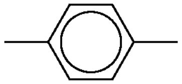 | 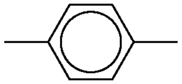 | 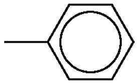 |
| 4 | 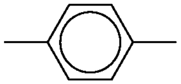 | 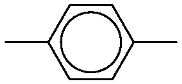 | 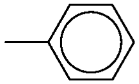 | 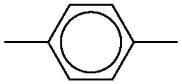 | 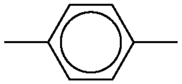 | 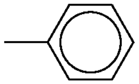 |
| 5 | 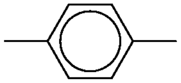 | 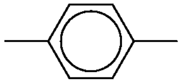 | 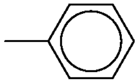 | 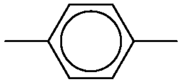 | 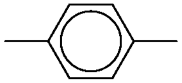 | 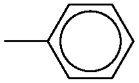 |
| 6 | 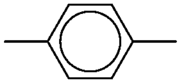 | 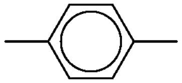 | 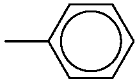 | 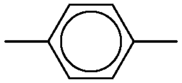 | 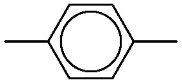 | 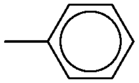 |
| 7 | | | | | | |

TABLE 2-continued
| | |
|---|---|
| | 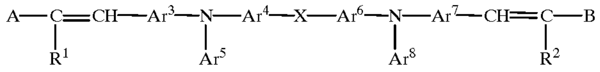 (s = 1) |
| 8 |  |
| 9 |  |
| 10 |  |
| 11 |  |
| 12 |  |
| 13 |  |
| 14 |  |
| 15 |  |

TABLE 2-continued
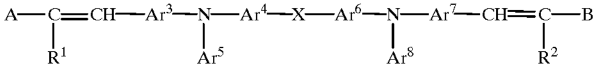
(s = 1)
| | |
|---|---|
| 16 |  |
| 17 | 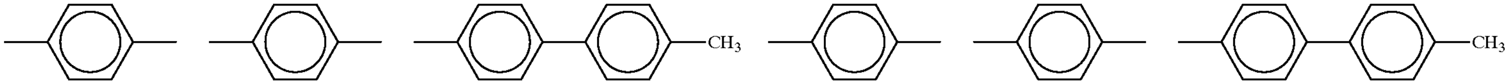 |
| 18 |  |
| 19 |  |
| 20 |  |
| 21 |  |
| 22 |  |
| 23 |  |

TABLE 2-continued
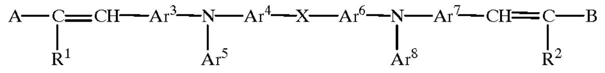
(s = 1)
| | |
|---|---|
| 24 |  |
| 25 |  |
| 26 |  |
| 27 |  |
| 28 |  |
| 29 |  |
| 30 |  |
| 31 |  |

TABLE 2-continued
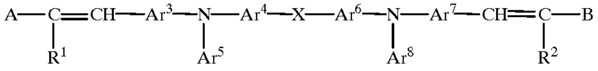
(s = 1)
| | |
|---|---|
| 32 |  |
| 33 |  |
| 34 |  |
| 35 |  |
| 36 |  |
| 37 |  |
| 38 |  |
| 39 |  |

TABLE 2-continued
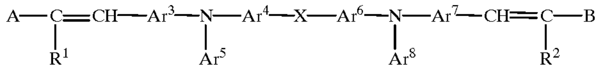
(s = 1)
| | |
|---|---|
| 40 |  |
| 41 |  |
| 42 |  |
| 43 |  |
| 44 |  |
| 45 |  |
| 46 | 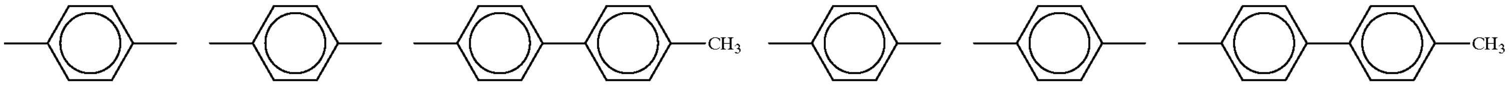 |
| 47 |  |

TABLE 2-continued
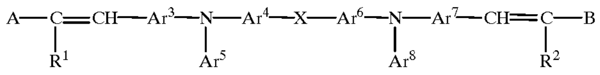
(s = 1)
| | |
|---|---|
| 48 |  |
| 49 |  |
| 50 |  |
| 51 |  |
| 52 |  |
| 53 |  |
| 54 |  |
| 55 |  |

TABLE 2-continued
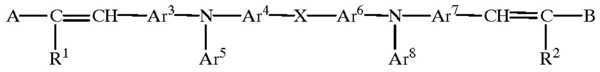
(s = 1)
| | |
|---|---|
| 56 |  |
| 57 |  |
| 58 |  |
| 59 |  |
| 60 |  |
| 61 |  |
| 62 |  |
| 63 |  |

TABLE 2-continued
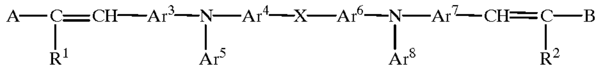
(s = 1)
| | |
|---|---|
| 64 |  |
| 65 |  |
| 66 |  |
| 67 | 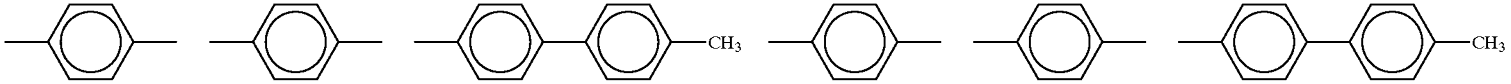 |
| 68 |  |
| 69 |  |
| 70 |  |
| 71 |  |

TABLE 2-continued
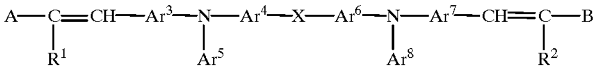
(s = 1)
| | |
|---|---|
| 72 |  |
| 73 |  |
| 74 |  |
| 75 |  |
| 76 | 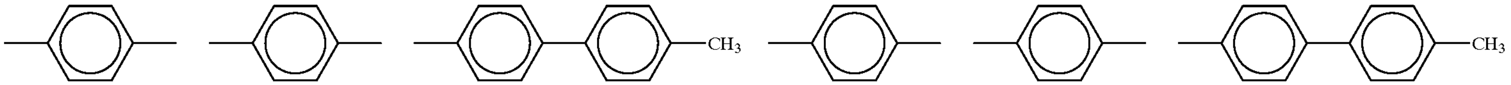 |
| Amino-stil-bene Comp. No. | $R^1$ | $R^2$ | A | B | X |
|---|---|---|---|---|---|
| 1 | H | H | 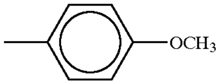 | 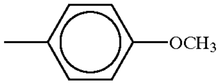 | $-CH_2CH_2-$ |
| 2 | H | H | 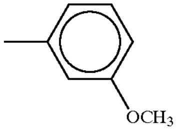 | 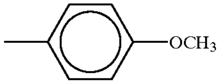 | $-CH_2CH_2-$ |

TABLE 2-continued
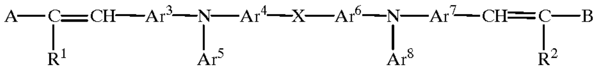
(s = 1)
| | | | | | |
|---|---|---|---|---|---|
| 3 | H | H | 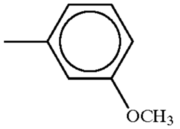 | 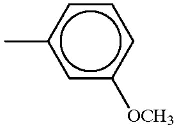 | $—CH_2CH_2—$ |
| 4 | H | H | 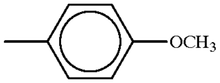 | 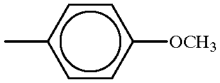 | $—CH_2—$ |
| 5 | H | H | 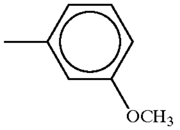 | 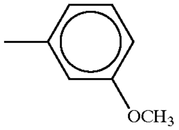 | $—CH_2—$ |
| 6 | H | H | 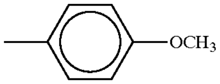 | 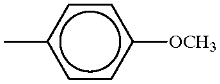 | 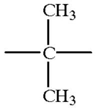 |
| 7 | H | H | 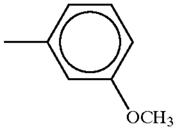 | 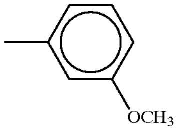 | 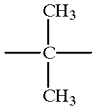 |
| 8 | H | H | 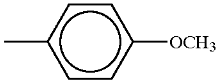 | 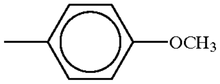 | $—CH_2CH_2CH_2—$ |

TABLE 2-continued
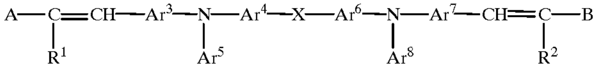
(s = 1)
| | | | | | |
|---|---|---|---|---|---|
| 9 | H | H | 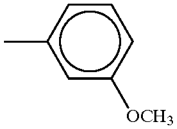 | 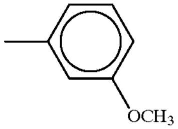 | $-CH_2CH_2CH_2-$ |
| 10 | H | H | 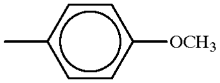 | 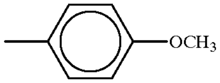 | 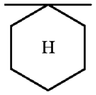 |
| 11 | H | H | 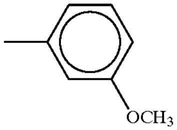 | 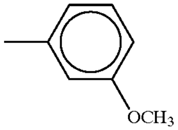 | 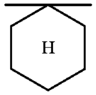 |
| 12 | H | H | 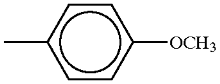 | 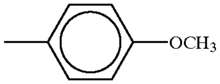 | —O— |
| 13 | H | H | 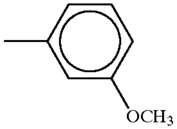 | 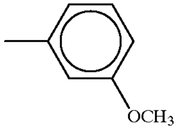 | —O— |
| 14 | H | H | 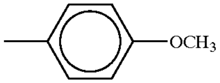 | 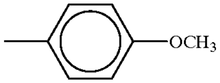 | —S— |
| 15 | H | H | 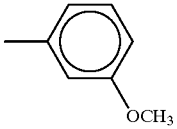 | 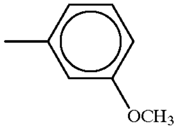 | —S— |

TABLE 2-continued
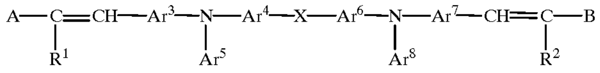
(s = 1)
| | | | | | |
|---|---|---|---|---|---|
| 16 | H | H | 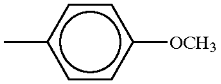 | 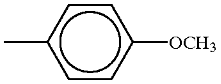 | $—CH_2CH_2—$ |
| 17 | H | H | 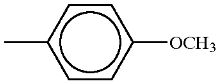 | 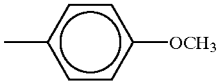 | $—CH_2CH_2—$ |
| 18 | H | H | 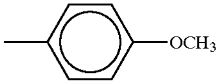 | 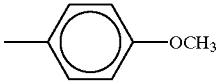 | $—CH_2—$ |
| 19 | H | H | 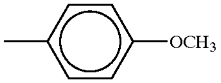 | 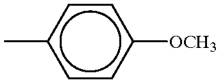 | 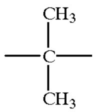 |
| 20 | H | H | 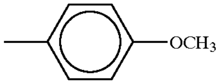 | 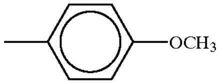 | $—CH_2CH_2CH_2—$ |
| 21 | H | H | 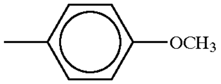 | 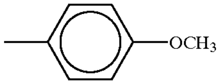 | 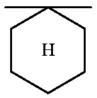 |
| 22 | H | H | 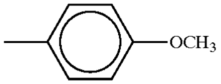 | 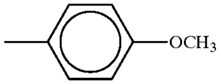 | —O— |
| 23 | H | H | 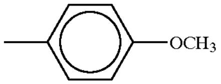 | 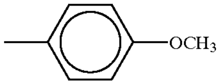 | —S— |

TABLE 2-continued
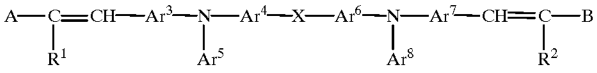
(s = 1)
| | | | | | |
|---|---|---|---|---|---|
| 24 | H | H | 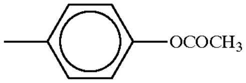 | 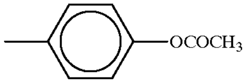 | $-CH_2CH_2-$ |
| 25 | H | H | 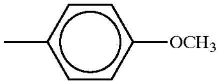 | 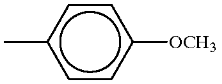 | $-CH_2CH_2-$ |
| 26 | H | H | 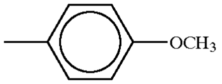 | 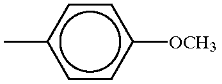 | 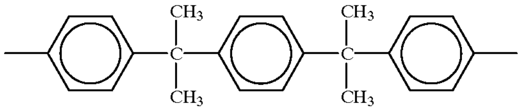 |
| 27 | H | H | 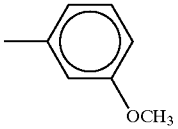 | 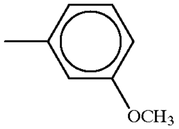 | 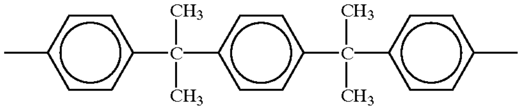 |
| 28 | H | H | 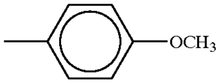 | 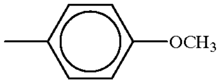 | 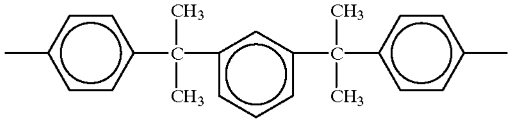 |
| 29 | H | H | 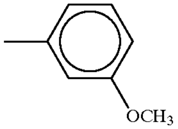 | 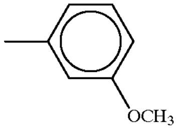 | 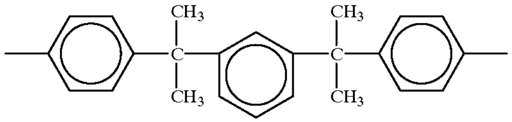 |
| 30 | 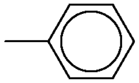 | 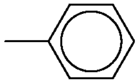 | 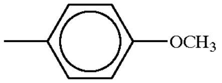 | 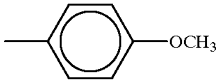 | $-CH_2CH_2-$ |

TABLE 2-continued
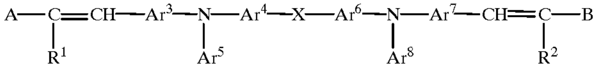
(s = 1)
| | | | | | |
|---|---|---|---|---|---|
| 31 | 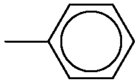 | 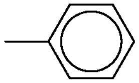 | 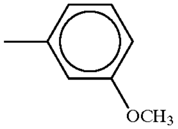 | 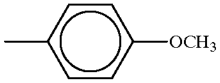 | $—CH_2CH_2—$ |
| 32 | 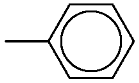 | 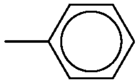 | 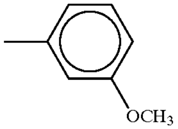 | 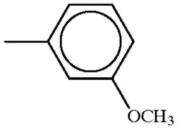 | $—CH_2CH_2—$ |
| 33 | 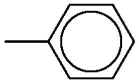 | 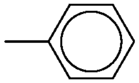 | 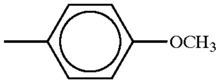 | 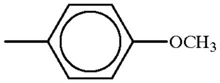 | $—CH_2—$ |
| 34 | 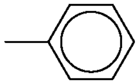 | 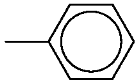 | 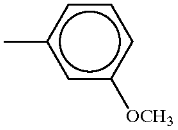 | 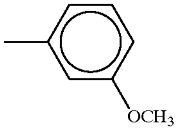 | $—CH_2—$ |
| 35 | 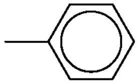 | 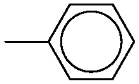 | 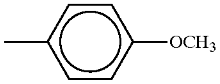 | 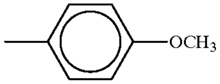 | 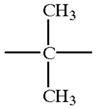 |
| 36 | 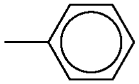 | 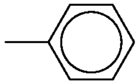 | 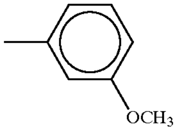 | 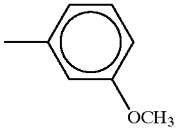 | 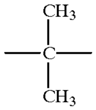 |

TABLE 2-continued
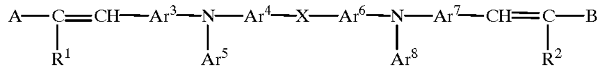
(s = 1)
| | | | | | |
|---|---|---|---|---|---|
| 37 | 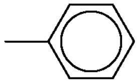 | 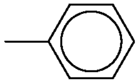 | 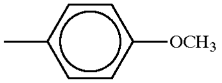 | 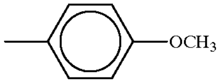 | $—CH_2CH_2CH_2—$ |
| 38 | 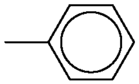 | 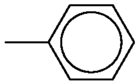 | 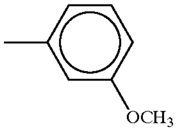 | 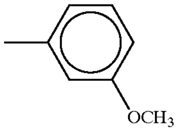 | $—CH_2CH_2CH_2—$ |
| 39 | 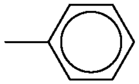 | 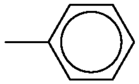 | 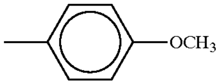 | 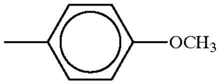 | 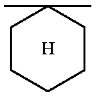 |
| 40 | 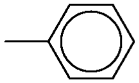 | 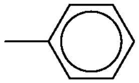 | 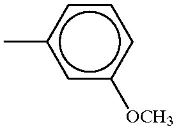 | 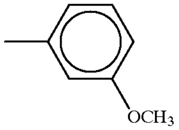 | 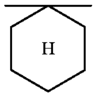 |
| 41 | 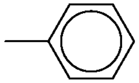 | 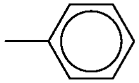 | 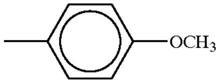 | 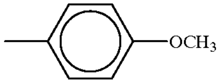 | —O— |
| 42 | 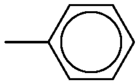 | 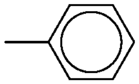 | 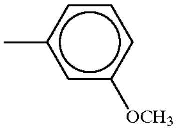 | 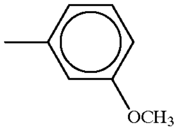 | —O— |
| 43 | 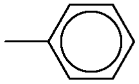 | 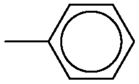 | 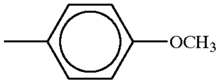 | 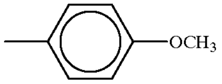 | —S— |

TABLE 2-continued
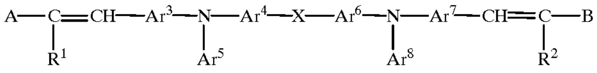
(s = 1)
| | | | | | |
|---|---|---|---|---|---|
| 44 | 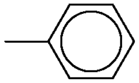 | 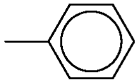 | 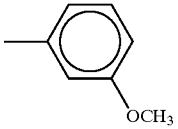 | 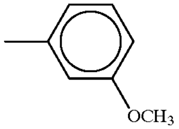 | —S— |
| 45 | 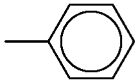 | 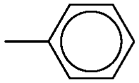 | 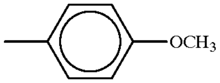 | 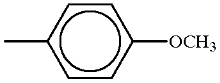 | $—CH_2CH_2—$ |
| 46 | 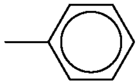 | 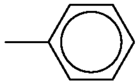 | 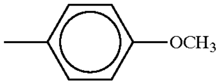 | 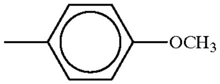 | $—CH_2CH_2—$ |
| 47 | 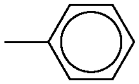 | 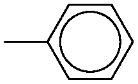 | 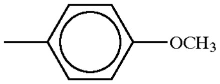 | 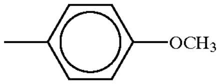 | $—CH_2—$ |
| 48 | 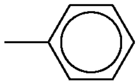 | 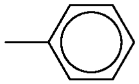 | 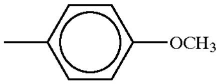 | 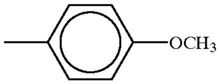 | 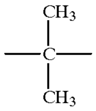 |
| 49 | 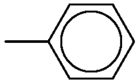 | 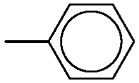 | 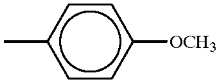 | 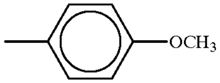 | $—CH_2CH_2CH_2—$ |
| 50 | 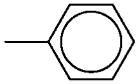 | 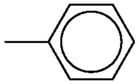 | 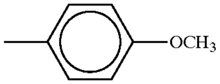 | 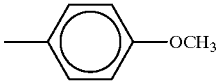 | 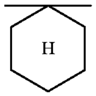 |
| 51 | 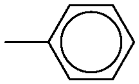 | 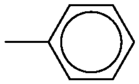 | 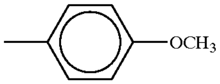 | 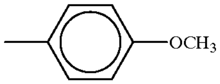 | —O— |

TABLE 2-continued
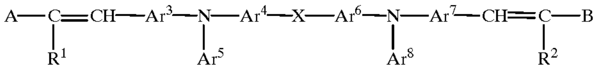
(s = 1)
| | | | | | |
|---|---|---|---|---|---|
| 52 | 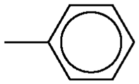 | 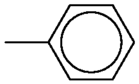 | 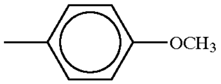 | 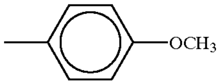 | $—S—$ |
| 53 | 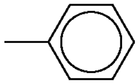 | 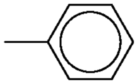 | 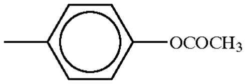 | 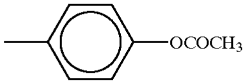 | $—CH_2CH_2—$ |
| 54 | 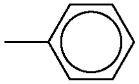 | 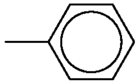 | 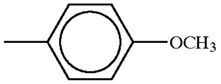 | 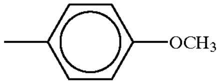 | $—CH_2CH_2—$ |
| 55 | 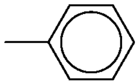 | 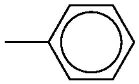 | 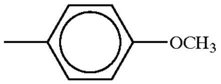 | 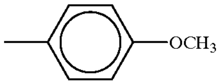 | 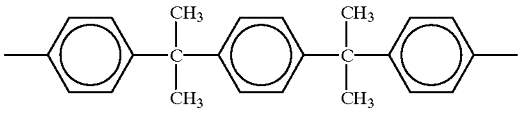 |
| 56 | 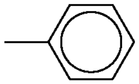 | 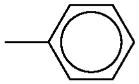 | 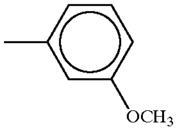 | 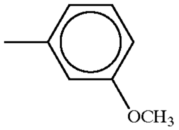 | 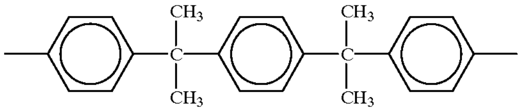 |
| 57 | 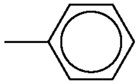 | 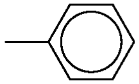 | 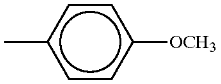 | 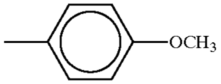 | 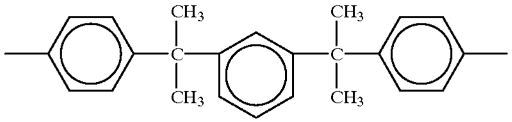 |
| 58 | 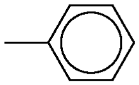 | 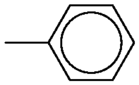 | 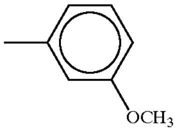 | 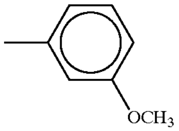 | 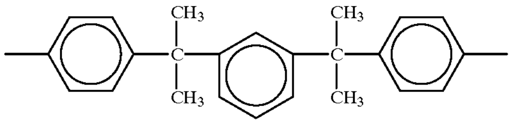 |

TABLE 2-continued
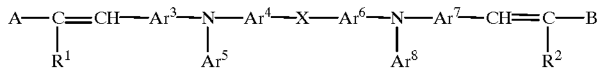
(s = 1)
| | | | | | |
|---|---|---|---|---|---|
| 59 | $CH_3$ | $CH_3$ | 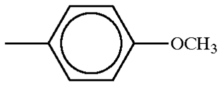 | 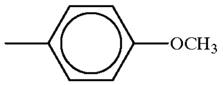 | $—CH_2CH_2—$ |
| 60 | $CH_3$ | $CH_3$ | 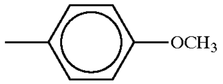 | 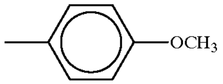 | $—CH_2—$ |
| 61 | $CH_3$ | $CH_3$ | 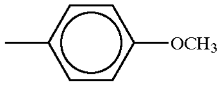 | 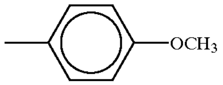 | 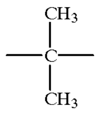 |
| 62 | $CH_3$ | $CH_3$ | 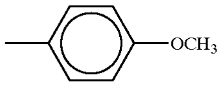 | 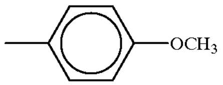 | $—CH_2CH_2CH_2—$ |
| 63 | $CH_3$ | $CH_3$ | 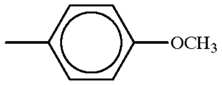 | 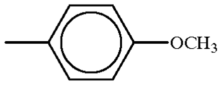 | 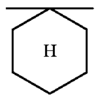 |
| 64 | $CH_3$ | $CH_3$ | 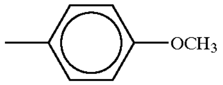 | 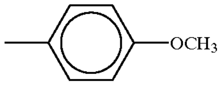 | —O— |
| 65 | $CH_3$ | $CH_3$ | 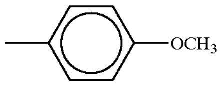 | 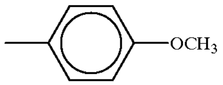 | —S— |
| 66 | $CH_3$ | $CH_3$ | 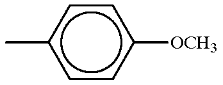 | 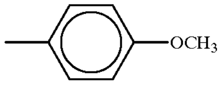 | $—CH_2CH_2—$ |

TABLE 2-continued
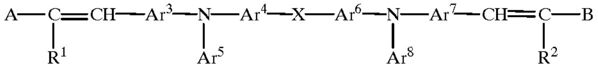
(s = 1)
| | | | | | |
|---|---|---|---|---|---|
| 67 | $CH_3$ | $CH_3$ | 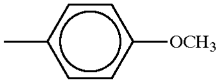 | 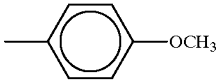 | $—CH_2CH_2—$ |
| 68 | 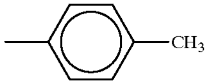 | 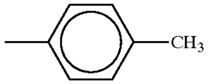 | 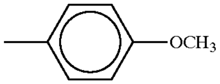 | 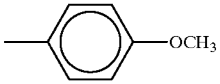 | $—CH_2CH_2—$ |
| 69 | 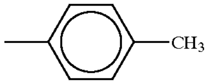 | 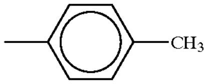 | 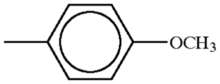 | 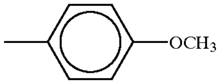 | $—CH_2—$ |
| 70 | 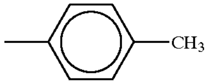 | 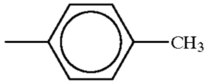 | 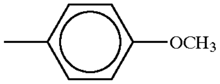 | 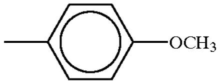 | 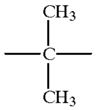 |
| 71 | 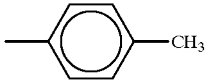 | 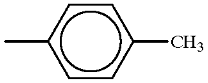 | 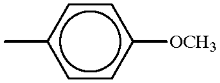 | 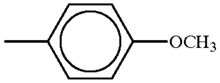 | $—CH_2CH_2CH_2—$ |
| 72 | 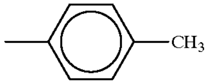 | 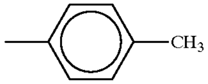 | 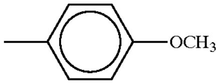 | 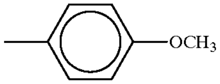 | 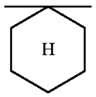 |

TABLE 2-continued
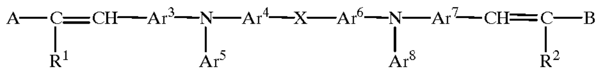
(s = 1)
| | | | | | |
|---|---|---|---|---|---|
| 73 | 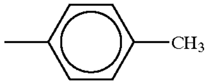 | 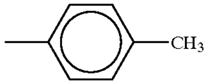 | 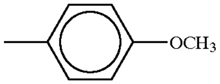 | 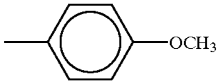 | —O— |
| 74 | 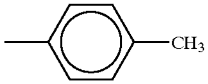 | 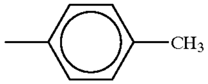 | 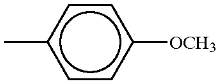 | 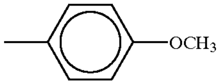 | —S— |
| 75 | 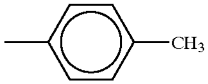 | 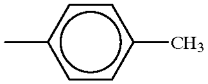 | 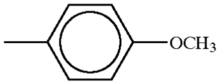 | 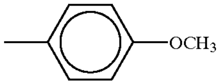 | $—CH_2CH_2—$ |
| 76 | 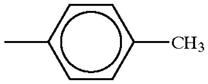 | 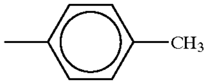 | 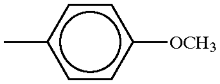 | 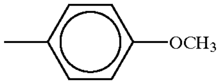 | $—CH_2CH_2—$ |

The previously mentioned hydroxystilbene compounds and aminostilbene compounds for use in the present invention, which are remarkably effective as photoconductive materials in the electrophotographic photoconductor, are optically or chemically sensitized with a sensitizer such as a dye or Lewis acid. In particular, the hydroxystilbene compounds and aminostilbene compounds effectively function as charge transport materials in a function-separating type electrophotographic photoconductor where an organic or inorganic pigment serves as a charge generation material.

In this case, there can be employed as the sensitizer triarylmethane dyes such as Methyl Violet and Crystal Violet; xanthene dyes such as Rose Bengale, Erythrosin and Rhodamine B; thiazine dyes such as Methylene Blue; and 2,4,7-trinitro-9-fluorenone and 2,4-dinitro-9-fluorenone.

In addition, specific examples of the charge generation material used in the above-mentioned function-separating photoconductor include organic pigments, for example, an azo pigment such as C.I. Pigment Blue 25 (C.I. 21180), C.I. Pigment Red 41 (C.I. 21200) and C.I. Basic Red 3 (C.I. 45210), a phthalocyanine pigment such as C.I. Pigment Blue 16 (C.I. 74100), an indigo pigment such as C.I. Vat Brown 5 (C.I. 73410) and C.I. Vat Dye (C.I. 73030), and a perylene pigment such as Algol Scarlet B and Indanthrene Scarlet R (made by Bayer Co., Ltd.); and inorganic pigments such as selenium, selenium-tellurium, cadmium sulfide, and α-silicon (amorphous silicon).

Furthermore, a variety of materials such as a polycarbonate resin, polyester resin, polyurethane resin and epoxy resin can be obtained by deriving from the hydroxyl group of the above-mentioned hydroxystilbene compound. In other words, the hydroxystilbene compound for use in the present invention is considered to be useful as an intermediate for the preparation of those materials, in particular, the aromatic polycarbonate resin of the present invention.

The previously mentioned aldehyde compound represented by formula (19), which is a raw material for the aminostilbene compound of formula (15) will now be explained in detail.

(19)

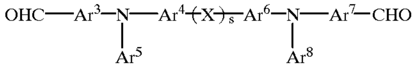

wherein $Ar^3$, $Ar^4$, $Ar^6$ and $Ar^7$, which may be the same or different, are each an arylene group which may have a substituent; $Ar^5$ and $R^8$, which may be the same or different, are each an aryl group which may have a substituent; and s is an integer of 0 or 1, and when s=1, X is —O—, —S—, —SO—, —$SO_2$—, —CO—, a straight-chain, branched or cyclic alkylene group having 1 to 12 carbon atoms, or an arylene group which may have a substituent.

To be more specific, the following aldehyde compounds of formulas (21) and (22) are usable for the preparation of the aminostilbene compounds in the present invention.

(21)

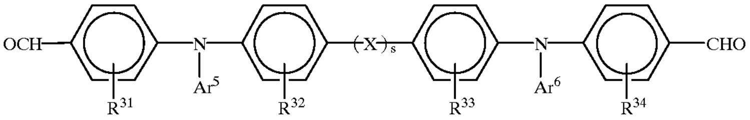

(22)

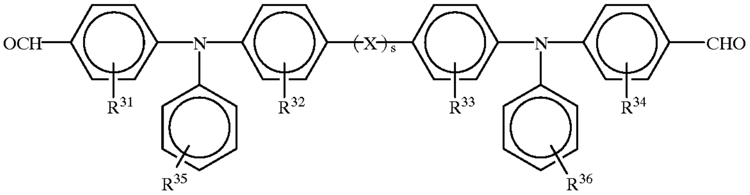

wherein $Ar^5$ and $Ar^8$, which may be the same or different, are each an aryl group which may have a substituent; $R^{31}$, $R^{32}$, $R^{33}$, $R^{34}$, $R^{35}$ and $R^{36}$, which may be the same or different, are each a hydrogen atom, an alkyl group which may have a substituent, or an alkoxy group which may have a substituent; and s is an integer of 0 or 1, and when s=1, X is —O—, —S—, —SO—, —$SO_2$—, —CO—, a straight-chain, branched or cyclic alkylene group having 1 to 12 carbon atoms, or an arylene group which may have a substituent.

In the above formulas (21) and (22), specific examples of the alkyl group represented by $R^{31}$, $R^{32}$, $R^{33}$, $R^{34}$, $R^{35}$ and $R^{36}$ are lower alkyl groups such as methyl group, ethyl, group, propyl group, and butyl group; and specific examples of the alkoxy group represented by $R^{31}$, $R^{32}$, $R^{33}$, $R^{34}$, $R^{35}$ and $R^{36}$ are lower alkoxyl groups such as methoxy group, ethoxy group, and propoxy group. Further, the above-mentioned alkyl group may have a substituent such as phenyl group, a halogen atom, an alkoxyl group or an aryloxy group.

The aldehyde compound of formula (19) for use in the present invention is obtained by formylation of a diamine compound, to be more specific, by allowing a diamine compound of the following formula (23) to react with a Vilsmeier reagent to produce an immonium salt intermediate, and the obtained immonium salt is subjected to hydrolysis.

(23)

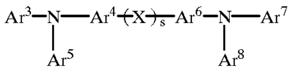

wherein $Ar^3$ to $Ar^8$, and X are the same as those previously defined in formula (19).

The aforementioned Vilsmeier reagent for use in the present invention can be prepared by the conventional method, that is, by allowing an amide compound such as N,N-dimethylformamide (DMF) or N-methylformanilide (MFA) to react with an acid halide such as phosphoryl chloride, phosphoryl bromide, oxalyl chloride, phosgene, thionyl chloride, triphenylphosphine-Br, or hexachlorotriphosphazatriene in an amount equivalent to the above amide compound.

The Vilsmeier reagent may be added in a stoichiometric amount to the diamine compound of formula (23), preferably in an amount of 2 mole or more to one mole of the diamine compound.

For producing the aldehyde compound of formula (19) for use in the present invention, the Vilsmeier reagent which has been previously prepared is allowed to react with the diamine compound of formula (23) in a proper solvent. Alternatively, the above-mentioned acid halide is added dropwise to a solution in which the diamine compound of formula (23) and the above-mentioned amide compound are dissolved, thereby carrying out the reaction as generating the Vilsmeier reagent.

In the above reaction for the preparation of the aldehyde compound, an inert aromatic hydrocarbon such as benzene, chloroform, dichloroethane, and o-dichlorobenzene are usable as the reaction solvents. Further, the above-mentioned amide compounds may be used as the reaction solvents as they are.

The reaction temperature is generally in the range of 0 to 150° C., preferably in the range of 20 to 80° C.

The immonium salt thus generated by the above-mentioned reaction between the diamine compound and the Vilsmeier reagent is subjected to hydrolysis in water or an alkaline aqueous solution, so that the aldehyde compound represented by the formula (19) is derived. In this case, an aqueous solution of sodium hydroxide, potassium hydroxide, sodium acetate, or potassium acetate can be used as the alkaline aqueous solution.

Likewise, the previously mentioned aldehyde compounds of formulas (21) and (22) can be obtained by formulation of the following diamine compounds of formulas (24) and (25), respectively.

(24)

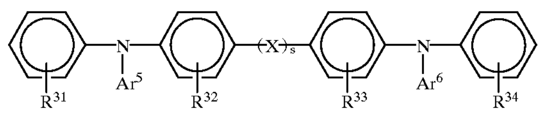

(25)

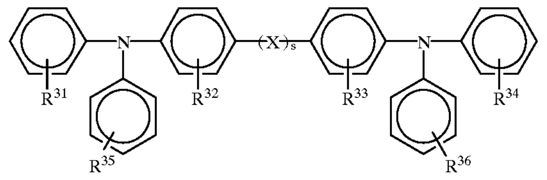

wherein $Ar^5$, $Ar^8$, $R^{31}$, $R^{32}$, $R^{33}$, $R^{34}$, $R^{35}$, $R^{36}$, and X are the same as those previously defined.

Specific examples of the thus prepared aldehyde compound of formula (22) are shown in TABLE 3.

TABLE 3

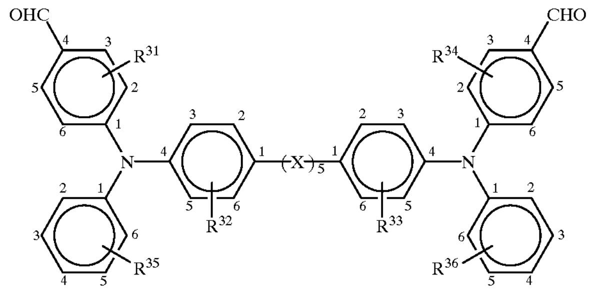

| Aldehyde Comp. No. | $R^{31}$ | $R^{32}$ | $R^{35}$ | $R^{34}$ | $R^{33}$ | $R^{36}$ | X |
|---|---|---|---|---|---|---|---|
| 1 | H | H | H | H | H | H | $—CH_2CH_2—$ |
| 2 | H | H | 4-$CH_3$ | H | H | 4-$CH_3$ | $—CH_2CH_2—$ |
| 3 | H | H | 4-$OCH_3$ | H | H | 4-$OCH_3$ | $—CH_2CH_2—$ |
| 4 | H | H | 4-$C_2H_5$ | H | H | 4-$C_2H_5$ | $—CH_2CH_2—$ |
| 5 | 3-$CH_3$ | H | 3-$CH_3$ | H | 3-$CH_3$ | 3-$CH_3$ | $—CH_2CH_2—$ |
| 6 | 2-$CH_3$ | 2-$CH_3$ | 4-$CH_3$ | 2-$CH_3$ | 2-$CH_3$ | 4-$CH_3$ | $—CH_2CH_2—$ |
| 7 | H | H | H | H | H | H | —O— |
| 8 | H | H | 4-$CH_3$ | H | H | 4-$CH_3$ | —O— |
| 9 | H | H | 4-$OCH_3$ | H | H | 4-$OCH_3$ | —O— |
| 10 | H | H | 4-$C_2H_5$ | H | H | 4-$C_2H_5$ | —O— |
| 11 | 3-$CH_3$ | H | 3-$CH_3$ | H | 3-$CH_3$ | 3-$CH_3$ | —O— |
| 12 | 2-$CH_3$ | 2-$CH_3$ | 4-$CH_3$ | 2-$CH_3$ | 2-$CH_3$ | 4-$CH_3$ | —O— |
| 13 | H | H | H | H | H | H | —S— |
| 14 | H | H | 4-$CH_3$ | H | H | 4-$CH_3$ | —S— |
| 15 | H | H | 4-$OCH_3$ | H | H | 4-$OCH_3$ | —S— |
| 16 | H | H | 4-$C_2H_5$ | H | H | 4-$C_2H_5$ | —S— |
| 17 | 3-$CH_3$ | H | 3-$CH_3$ | H | 3-$CH_3$ | 3-$CH_3$ | —S— |
| 18 | 2-$CH_3$ | 2-$CH_3$ | 4-$CH_3$ | 2-$CH_3$ | 2-$CH_3$ | 4-$CH_3$ | —S— |
| 19 | H | H | H | H | H | H | —SO— |

TABLE 3-continued

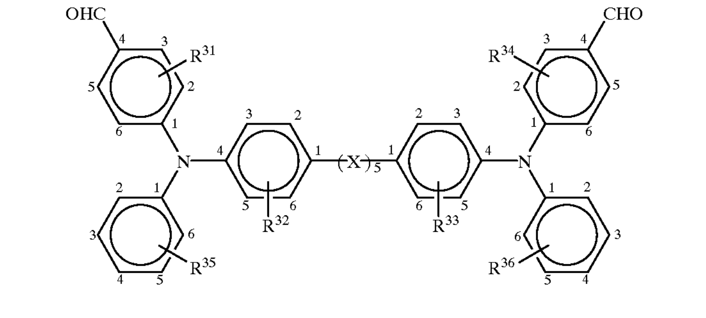

| Aldehyde Comp. No. | $R^{31}$ | $R^{32}$ | $R^{35}$ | $R^{34}$ | $R^{33}$ | $R^{36}$ | X |
|---|---|---|---|---|---|---|---|
| 20 | H | H | H | H | H | H | $—SO_2—$ |
| 21 | H | H | H | H | H | H | —CO— |
| 22 | H | H | H | H | H | H | $—CH_2CH_2CH_2CH_2—$ |

According to the present invention, the polycarbonate resin for use in the photoconductive layer of the photoconductor comprises the structural unit of formula (1) which is provided with the charge transporting properties. To control the mechanical characteristics of the obtained polycarbonate resin, a copolymer resin comprising one structural unit of formula (1) and the other structural unit for use in the conventionally known polycarbonate resin, for example, as described in the previously mentioned "Handbook of Polycarbonate Resin" (issued by The Nikkan Kogyo Shimbun Ltd.) can be employed. The structural unit of formula (2) is one of the conventionally known structural units for use in the conventional polycarbonate resin, which can be preferably employed in the present invention.

The structural unit of formula (2) will now be explained by referring to the diol of formula (14) that is the starting material for the structural unit of formula (2).

$$HO—Y—OH \qquad (14)$$

In the case where Y in the diol of formula (14) represents a bivalent aliphatic group or bivalent cyclic aliphatic group, the representative examples of the obtained diol are as follows: ethylene glycol, diethylene glycol, triethylene glycol, polyethylene glycol, polytetramethylene ether glycol, 1,3-propanediol, 1,4-butanediol, 1,5-pentanediol, 3-methyl-1,5-pentanediol, 1,6-hexanediol, 1,5-hexanediol, 1,7-heptanediol, 1,8-octanediol, 1,9-nonanediol, 1,10-decanediol, 1,11-undecanediol, 1,12-dodecanediol, neopentyl glycol, 2-ethyl-1,6-hexanediol, 2-methyl-1,3-propanediol, 2-ethyl-1,3-propanediol, 2,2-dimethyl-1,3-propanediol, 1,3-cyclohexanediol, 1,4-cyclohexanediol, cyclohexane-1,4-dimethanol, 2,2-bis(4-hydroxycyclohexyl) propane, xylylenediol, 1,4-bis(2 -hydroxyethyl)benzene, 1,4-bis(3-hydroxypropyl)benzene, 1,4-bis(4-hydroxybutyl) benzene, 1,4-bis(5-hydroxypentyl)benzene, and 1,4-bis(6-hydroxyhexyl)benzene.

In the case where Y in the diol of formula (14) represents a bivalent aromatic group, there can be employed any bivalent groups derived from the same substituted or unsubstituted aryl group as defined in the description of $R^1$, $R^2$, $Ar^5$ and $Ar^8$. In addition, Y represents the following bivalent groups:

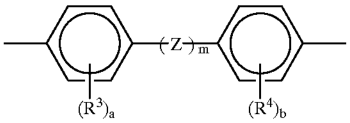

and

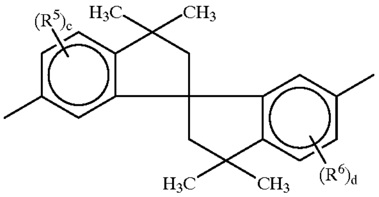

in which $R^3$, $R^4$, $R^5$ and $R^6$ are each independently an alkyl group which may have a substituent, an aryl group which may have a substituent, or a halogen atom; a and b are each independently an integer of 0 to 4; c and d are each independently an integer of 0 to 3; and m is an integer of 0 or 1, and when m=1, Z is a straight-chain alkylene group having 2 to 12 carbon atoms, —O—, —S—, —SO—, $—SO_2—$, —CO—,

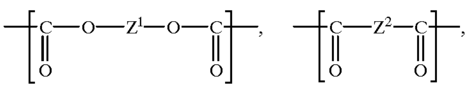

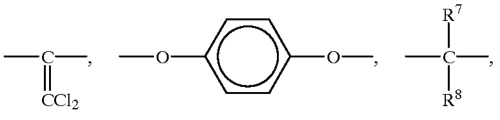

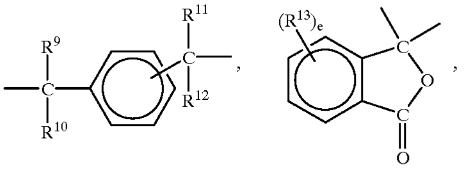

-continued

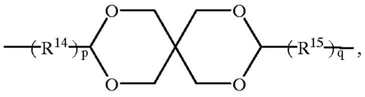

, or

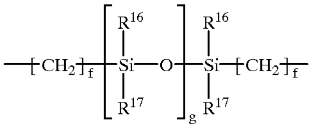

in which $Z^1$ and $Z^2$ are each a bivalent aliphatic group which may have a substituent or an arylene group which may have a substituent; and $R^7$, $R^8$, $R^9$, $R^{10}$, $R^{11}$, $R^{12}$ and $R^{13}$ are each independently a hydrogen atom, a halogen atom, an alkyl group having 1 to 5 carbon atoms which may have a substituent, an alkoxyl group having 1 to 5 carbon atoms which may have a substituent, or an aryl group which may have a substituent, and $R^7$ and $R^8$ may form a carbocyclic ring or heterocyclic ring having 6 to 12 carbon atoms in combination, or may form a carbocyclic ring or heterocyclic ring in combination with $R^3$ and $R^4$; p and q are each an integer of 0 or 1, when p and q represent 1, $R^{14}$ and $R^{15}$ are each an alkylene group having 1 to 4 carbon atoms; $R^{16}$ and $R^{17}$ are each independently an alkyl group having 1 to 5 carbon atoms which may have a substituent, or an aryl group which may have a substituent; e is an integer of 0 to 4; f is an integer of 0 to 20; and g is an integer of 0 to 2000.

In the above-mentioned bivalent groups, the same substituted or unsubstituted alkyl group, and the same substituted or unsubstituted aryl group as defined in the description of $R^1$, $R^2$, $Ar^5$ and $Ar^8$ in the structural unit of formula (1) can be employed.

Examples of the halogen atom in the description of the above bivalent groups include a fluorine atom, a chlorine atom, a bromine atom and an iodine atom.

When $Z^1$ and $Z^2$ each represent a substituted or unsubstituted bivalent aliphatic group, there can be employed any bivalent groups obtained by removing the hydroxyl groups from the diol of formula (14) in which Y represents a bivalent aliphatic group or a bivalent cyclic aliphatic group. On the other hand, when $Z^1$ and $Z^2$ each represent a substituted or unsubstituted arylene group, there can be employed any bivalent groups derived from the substituted or unsubstituted aryl group previously defined in the description of $R^1$, $R^2$, $Ar^5$ and $Ar^8$.

Preferable examples of the diol of formula (14) in which Y represents a bivalent aromatic group are as follows:

bis(4-hydroxyphenyl)methane,
bis(2-methyl-4-hydroxyphenyl)methane,
bis(3-methyl-4-hydroxyphenyl)methane,
1,1-bis(4-hydroxyphenyl)ethane,
1,2-bis(4-hydroxyphenyl)ethane,
bis(4-hydroxyphenyl)phenylmethane,
bis(4-hydroxyphenyl)diphenylmethane,
1,1-bis(4-hydroxyphenyl)-1-phenylethane,
1,3-bis(4-hydroxyphenyl)-1,1-dimethylpropane,
2,2-bis(4-hydroxyphenyl)propane,
2-(4-hydroxyphenyl)-2-(3-hydroxyphenyl)propane,
1,1-bis(4-hydroxyphenyl)-2-methylpropane,
2,2-bis(4-hydroxyphenyl)butane,
1,1-bis(4-hydroxyphenyl)-3-methylbutane,
2,2-bis(4-hydroxyphenyl)pentane,
2,2-bis(4-hydroxyphenyl)-4-methylpentane,
2,2-bis(4-hydroxyphenyl)hexane,
4,4-bis(4-hydroxyphenyl)heptane,
2,2-bis(4-hydroxyphenyl)nonane,
bis(3,5-dimethyl-4-hydroxyphenyl)methane,
2,2-bis(3-methyl-4-hydroxyphenyl)propane,
2,2-bis(3-isopropyl-4-hydroxyphenyl)propane,
2,2-bis(3-sec-butyl-4-hydroxyphenyl)propane,
2,2-bis(3-tert-butyl-4-hydroxyphenyl)propane,
2,2-bis(3-cyclohexyl-4-hydroxyphenyl)propane,
2,2-bis(3-allyl-4-hydroxyphenyl)propane,
2,2-bis(3-phenyl-4-hydroxyphenyl)propane,
2,2-bis(3,5-dimethyl-4-hydroxyphenyl)propane,
2,2-bis(3-chloro-4-hydroxyphenyl)propane,
2,2-bis(3,5-dichloro-4-hydroxyphenyl)propane,
2,2-bis(3-bromo-4-hydroxyphenyl)propane,
2,2-bis(3,5-dibromo-4-hydroxyphenyl)propane,
2,2-bis(4-hydroxyphenyl)hexafluoropropane,
1,1-bis(4-hydroxyphenyl)cyclopentane,
1,1-bis(4-hydroxyphenyl)cyclohexane,
1,1-bis(3-methyl-4-hydroxyphenyl)cyclohexane,
1,1-bis(3,5-dimethyl-4-hydroxyphenyl)cyclohexane,
1,1-bis(3,5-dichloro-4-hydroxyphenyl)cyclohexane,
1,1-bis(4-hydroxyphenyl)-3,3,5-trimethylcyclohexane,
1,1-bis(4-hydroxyphenyl)cycloheptane,
2,2-bis(4-hydroxyphenyl)norbornane,
2,2-bis(4-hyroxyphenyl)adamantane,
4,4'-dihydroxydiphenyl ether,
4,4'-dihydroxy-3,3'-dimethyldiphenyl ether,
ethylene glycol bis(4-hydroxyphenyl)ether,
4,4'-dihydroxydiphenylsulfide,
3,3'-dimethyl-4,4'-dihydroxydiphenylsulfide,
3,3',5,5'-tetramethyl-4,4'-dihydroxydiphenylsulfide,
4,4'-dihydroxydiphenylsulfoxide,
3,3'-dimethyl-4,4'-dihydroxydiphenylsulfoxide,
4,4'-dihydroxydiphenylsulfone,
3,3'-dimethyl-4,4'-dihydroxydiphenylsulfone,
3,3'-diphenyl-4,4'-dihydroxydiphenylsulfone,
3,3'-dichloro-4,4'-dihydroxydiphenylsulfone,
bis(4-hydroxyphenyl)ketone,
bis(3-methyl-4-hydroxyphenyl)ketone,
3,3,3',3'-tetramethyl-6,6'-dihydroxyspiro(bis)-indane,
3,3',4,4'-tetrahydro-4,4,4',4'-tetramethyl-2,2'-spirobi(2H-1-benzopyrane-7,7'-diol,
trans-2,3-bis(4-hydroxyphenyl)-2-butene,
9,9-bis(4-hydroxyphenyl)fluorene,
9,9-bis(4-hydroxyphenyl)xanthene,
1,6-bis(4-hydroxyphenyl)-1,6-hexanedione,
α,α,α',α'-tetramethyl-α,α'-bis(4-hydroxyphenyl)-p-xylene,
α,α,α',α'-tetramethyl-α,α'-bis(4-hydroxyphenyl)-m-xylene,
2,6-dihydroxydibenzo-p-dioxine,
2,6-dihydroxythianthrene,
2,7-dihydroxyphenoxathine,
9,10-dimethyl-2,7-dihydroxyphenazine, 3,6-dihydroxydibenzofuran, 3,6-dihydroxydibenzothiophene, 4,4'-dihydroxybiphenyl, 1,4-dihydroxynaphthalene, 2,7-dihydroxypyrene, hydroquinone, resorcin, ethylene glycol-bis(4-hydroxybenzoate), diethylene glycol-bis(4-hydroxybenzoate), triethylene glycol-bis(4-hydroxybenzoate), 1,3-bis(4-hydroxyphenyl)-tetramethyldisiloxane, and phenol-modified silicone oil.

Further, an aromatic diol having an ester linkage produced by the reaction between 2 moles of a diol and one mole of isophthaloyl chloride or terephthaloyl chloride is also usable.

In the polycarbonate copolymer resin comprising the structural unit of formula (1) and the structural unit of formula (2), the molar ratio of a moiety composed of the structural unit of formula (1) with respect to the total amount of the polycarbonate resin may be freely determined, but preferably 5 mol % or more, more preferably 20 mol % or more because the total amount of the structural unit of formula (1) has an effect on the charge transporting properties of the obtained polycarbonate resin.

In the photoconductors according to the present invention, at least one of the previously mentioned aromatic polycarbonate resins is contained in the photoconductive layers 2, 2*a*, 2*b*, 2*c*, 2*d*, and 2*e*. The aromatic polycarbonate resin can be employed in different ways, for example, as shown in FIGS. 1 through 6.

In the photoconductor as shown in FIG. 1, a photoconductive layer 2 is formed on an electroconductive support 1, which photoconductive layer 2 comprises an aromatic polycarbonate resin of the present invention and a sensitizing dye, with the addition thereto of a binder agent (binder resin) when necessary. In this photoconductor, the aromatic polycarbonate resin works as a photoconductive material, through which charge carriers necessary for the light decay of the photoconductor are generated and transported. However, the aromatic polycarbonate resin itself scarcely absorbs light in the visible light range, and therefore, it is necessary to add a sensitizing dye which absorbs light in the visible light range in order to form latent electrostatic images by use of visible light.

Figure 2:
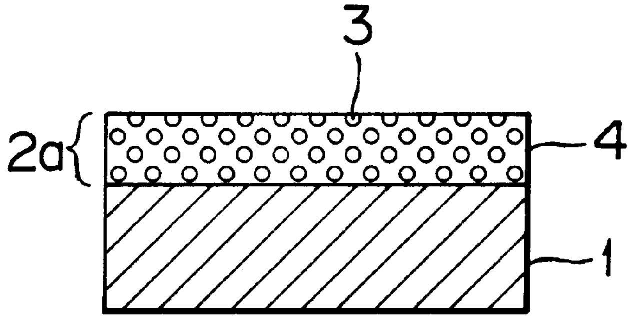
FIG. 2 is a schematic cross-sectional view of a second example of an electrophotographic photoconductor according to the present invention.

Referring to FIG. 2, there is shown an enlarged cross-sectional view of another embodiment of an electrophotographic photoconductor according to the present invention. In this photoconductor, there is formed a photoconductive layer 2*a* on an electroconductive support 1. The photoconductive layer 2*a* comprises a charge transport medium 4 comprising (i) an aromatic polycarbonate resin of the present invention, optionally in combination with a binder agent, and (ii) a charge generation material 3 dispersed in the charge transport medium 4. In this embodiment, the aromatic polycarbonate resin (or a mixture of the aromatic polycarbonate resin and the binder agent) constitutes the charge transport medium 4. The charge generation material 3, which is, for example, an inorganic or organic pigment, generates charge carriers. The charge transport medium 4 accepts the charge carriers generated by the charge generation material 3 and transports those charge carriers.

In this electrophotographic photoconductor, it is basically necessary that the light-absorption wavelength regions of the charge generation material 3 and the aromatic polycarbonate resin not overlap in the visible light range. This is because, in order that the charge generation material 3 produce charge carriers efficiently, it is necessary that light pass through the charge transport medium 4 and reach the surface of the charge generation material 3. Since the aromatic polycarbonate resin comprising the structural unit of formula (1) do not substantially absorb light in the visible range of 600 nm or more, it can work effectively as a charge transport material when used together with the charge generation material 3 which absorbs the light in the visible region to the near infrared region and generates charge carriers. The charge transport medium 4 may further comprise a low-molecular weight charge transport material.

Figure 3:
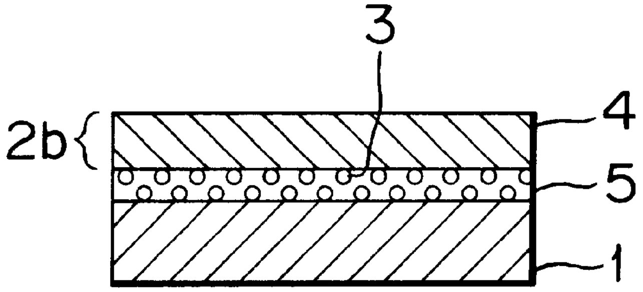
FIG. 3 is a schematic cross-sectional view of a third example of an electrophotographic photoconductor according to the present invention.

Referring to FIG. 3, there is shown an enlarged cross-sectional view of a further embodiment of an electrophotographic photoconductor according to the present invention. In the figure, there is formed on an electroconductive support 1 a two-layered photoconductive layer 2*b* comprising a charge generation layer 5 containing the charge generation material 3, and a charge transport layer 4 comprising an aromatic polycarbonate resin with the charge transporting properties according to the present invention.

In this photoconductor, light which has passed through the charge transport layer 4 reaches the charge generation layer 5, and charge carriers are generated within the charge generation layer 5. The charge carriers which are necessary for the light decay for latent electrostatic image formation are generated by the charge generation material 3, and accepted and transported by the charge transport layer 4. The generation and transportation of the charge carriers are performed by the same mechanism as that in the photoconductor shown in FIG. 2.

In this case, the charge transport layer 4 comprises the aromatic polycarbonate resin, optionally in combination with a binder agent. Furthermore, in order to increase the efficiency of generating the charge carriers, the charge generation layer 5 may further comprise the aromatic polycarbonate resin of the present invention. In addition, the photoconductive layer 2*b* including the charge generation layer 5 and the charge transport layer 4 may further comprise a low-molecular weight charge transport material for the same reason as mentioned above. This can be applied to the embodiments of FIGS. 4 to 6 to be described later.

Figure 4:
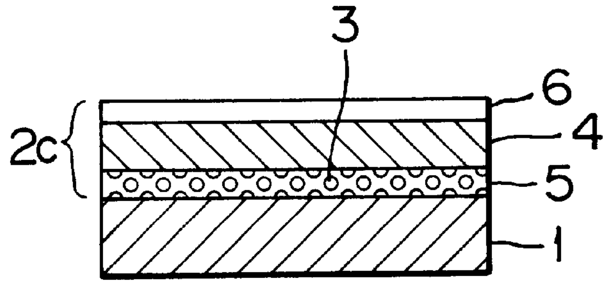
FIG. 4 is a schematic cross-sectional view of a fourth example of an electrophotographic photoconductor according to the present invention.

As shown in the electrophotographic photoconductor of FIG. 4, a protective layer 6 may be overlaid on the charge transport layer 4. The protective layer 6 may comprise the aromatic polycarbonate resin of the present invention, optionally in combination with a binder agent. As a matter of course, it is effective that the protective layer 6 be provided on a charge transport layer in which a low-molecular weight charge transport material is dispersed. The protective layer 6 may be provided on the photoconductive layer 2*a* of the photoconductor as shown in FIG. 2.

Figure 5:
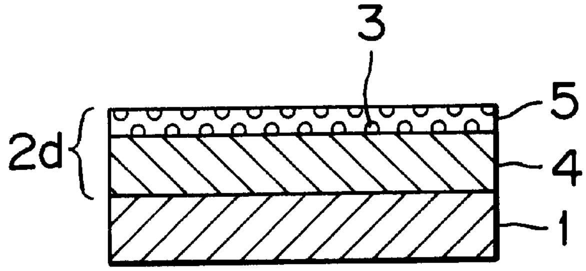
FIG. 5 is a schematic cross-sectional view of a fifth example of an electrophotographic photoconductor according to the present invention.

Referring to FIG. 5, there is shown still another embodiment of an electrophotographic photoconductor according to the present invention. In this figure, the overlaying order of the charge generation layer 5 and the charge transport layer 4 comprising the aromatic polycarbonate resin is reversed in view of the electrophotographic photoconductor as shown in FIG. 3. The mechanism of the generation and transportation of charge carriers is substantially the same as that of the photoconductor shown in FIG. 3.

Figure 6:
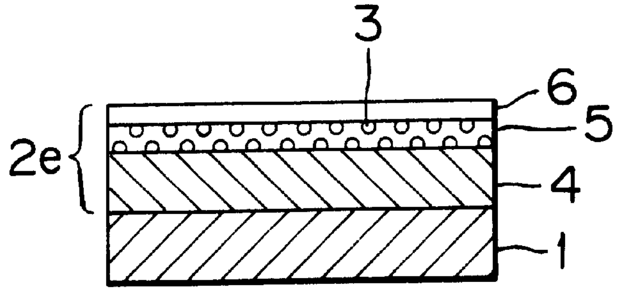
FIG. 6 is a schematic cross-sectional view of a sixth example of an electrophotographic photoconductor according to the present invention.

In the above photoconductor of FIG. 5, a protective layer 6 may be formed on the charge generation layer 5 as shown in FIG. 6 in light of the mechanical strength of the photoconductor.

When the electrophotographic photoconductor according to the present invention as shown in FIG. 1 is fabricated, at least one aromatic polycarbonate resin of the present invention is dissolved in a solvent, with the addition thereto of a binder agent when necessary. To the thus prepared solution, a sensitizing dye is added, so that a photoconductive layer coating liquid is prepared. The thus prepared photoconductive layer coating liquid is coated on an electroconductive support 1 and dried, so that a photoconductive layer 2 is formed on the electroconductive support 1.

It is preferable that the thickness of the photoconductive layer 2 be in the range of 3 to 50 μm, more preferably in the range of 5 to 40 μm. It is preferable that the amount of the aromatic polycarbonate resin of the present invention be in the range of 30 to 100 wt. % of the total weight of the photoconductive layer 2.

It is preferable that the amount of the sensitizing dye for use in the photoconductive layer 2 be in the range of 0.1 to 5 wt. %, more preferably in the range of 0.5 to 3 wt. % of the total weight of the photoconductive layer 2.

Specific examples of the sensitizing dye for use in the present invention are triarylmethane dyes such as Brilliant Green, Victoria Blue B, Methyl Violet, Crystal Violet and Acid Violet 6B; xanthene dyes such as Rhodamine B, Rhodamine 6G, Rhodamine G Extra, Eosin S, Erythrosin, Rose Bengale and Fluoresceine; thiazine dyes such as Methylene Blue; and cyanine dyes such as cyanin.

The electrophotographic photoconductor shown in FIG. 2 can be obtained by the following method:

The finely-divided particles of the charge generation material 3 are dispersed in a solution in which at least one aromatic polycarbonate resin of the present invention, or a mixture of the aromatic polycarbonate resin and the binder agent is dissolved, so that a coating liquid for the photoconductive layer 2*a* is prepared. The coating liquid thus prepared is coated on the electroconductive support 1 and then dried, whereby the photoconductive layer 2*a* is provided on the electroconductive support 1.

It is proper that the thickness of the photoconductive layer 2*a* be in the range of 3 to 50 μm, more preferably in the range of 5 to 40 μm. It is preferable that the amount of the aromatic polycarbonate resin for use in the photoconductive layer 2*a* be in the range of 40 to less than 100 wt. % of the total weight of the photoconductive layer 2*a*.

It is preferable that the amount of the charge generation material 3 for use in the photoconductive layer 2*a* be in the range of 0.1 to 50 wt. %, more preferably in the range of 1 to 20 wt. % of the total weight of the photoconductive layer 2*a*.

Specific examples of the charge generation material 3 for use in the present invention are as follows: inorganic materials such as selenium, selenium-tellurium, cadmium sulfide, cadmium sulfide-selenium and α-silicon; and organic pigments such as an azo pigment, for example, C.I. Pigment Blue 25 (C.I. 21180), C.I. Pigment Red 41 (C.I. 21200), C.I. Acid Red 52 (C.I. 45100), C.I. Basic Red 3 (C.I. 45210), an azo pigment having a carbazole skeleton (Japanese Laid-Open Patent Application 53-95033), an azo pigment having a distyryl benzene skeleton (Japanese Laid-Open Patent Application 53-133445), an azo pigment having a triphenylamine skeleton (Japanese Laid-Open Patent Application 53-132347), an azo pigment having a dibenzothiophene skeleton (Japanese Laid-Open Patent Application 54-21728), an azo pigment having an oxadiazole skeleton (Japanese Laid-Open Patent Application 54-12742), an azo pigment having a fluorenone skeleton (Japanese Laid-Open Patent Application 54-22834), an azo pigment having a bisstilbene skeleton (Japanese Laid-Open Patent Application 54-17733), an azo pigment having a distyryl oxadiazole skeleton (Japanese Laid-Open Patent Application 54-2129), and an azo pigment having a distyryl carbazole skeleton (Japanese Laid-Open Patent Application 54-14967); a phthalocyanine pigment such as C.I. Pigment Blue 16 (C.I. 74100); an indigo pigment such as C.I. Vat Brown 5 (C.I. 73410) and C.I. Vat Dye (C.I. 73030); and a perylene pigment such as Algol Scarlet B and Indanthrene Scarlet R (made by Bayer Co., Ltd.). These charge generation materials may be used alone or in combination.

The electrophotographic photoconductor shown in FIG. 3 can be fabricated by the following method:

To provide the charge generation layer 5 on the electroconductive support 1, the charge generation material is vacuum-deposited on the electroconductive support 1. Alternatively, the finely-divided particles of the charge generation material 3 are dispersed in an appropriate solvent, together with the binder agent when necessary, so that a coating liquid for the charge generation layer 5 is prepared. The thus prepared coating liquid is coated on the electroconductive support 1 and dried, whereby the charge generation layer 5 is formed on the electroconductive support 1. The charge generation layer 5 may be subjected to surface treatment by buffing and adjustment of the thickness thereof if required. On the thus formed charge generation layer 5, a coating liquid in which at least one aromatic polycarbonate resin of the present invention, optionally in combination with a binder agent is dissolved is coated and dried, so that the charge transport layer 4 is formed on the charge generation layer 5. In the charge generation layer 5, the same charge generation materials as employed in the above-mentioned photoconductive layer 2*a* can be used.

The thickness of the charge generation layer 5 is 5 μm or less, preferably 2 μm or less. It is preferable that the thickness of the charge transport layer 4 be in the range of 3 to 50 μm, more preferably in the range of 5 to 40 μm.

When the charge generation layer 5 is provided on the electroconductive support 1 by coating the dispersion in which finely-divided particles of the charge generation material 3 are dispersed in an appropriate solvent, it is preferable that the amount of finely-divided particles of the charge generation material 3 for use in the charge generation layer 5 be in the range of 10 to 100 wt. %, more preferably in the range of about 50 to 100 wt. % of the total weight of the charge generation layer 5. It is preferable that the amount of the aromatic polycarbonate resin of the present invention for use in the charge transport layer 4 be in the range of 40 to 100 wt. % of the total weight of the charge transport layer 4.

The photoconductive layer 2*b* of the photoconductor shown in FIG. 3 may comprise a low-molecular-weight charge transport material as previously mentioned.

Examples of the low-molecular-weight charge transport material for use in the present invention are as follows: oxazole derivatives, oxadiazole derivatives (Japanese Laid-Open Patent Applications 52-139065 and 52-139066), imidazole derivatives, triphenylamine derivatives (Japanese Laid-Open Patent Application 3-285960), benzidine derivatives (Japanese Patent Publication 58-32372), α-phenylstilbene derivatives (Japanese Laid-Open Patent Application 57-73075), hydrazone derivatives (Japanese Laid-Open Patent Applications 55-154955, 55-156954, 55-52063, and 56-81850), triphenylmethane derivatives (Japanese Patent Publication 51-10983), anthracene derivatives (Japanese Laid-Open Patent Application 51-94829), styryl derivatives (Japanese Laid-Open Patent Applications 56-29245 and 58-198043), carbazole derivatives (Japanese Laid-Open Patent Application 58-58552), and pyrene derivatives (Japanese Laid-Open Patent Application 2-94812).

To prepare the photoconductor shown in FIG. 4, a coating liquid for the protective layer 6 is prepared by dissolving the aromatic polycarbonate resin of the present invention, optionally in combination with the binder agent, in a solvent, and the thus obtained coating liquid is coated on the charge transport layer 4 of the photoconductor shown in FIG. 3, and dried.

It is preferable that the thickness of the protective layer 6 be in the range of 0.15 to 10 $\mu$m. It is preferable that the amount of the aromatic polycarbonate resin of the present invention for use in the protective layer 6 be in the range of 40 to 100 wt. % of the total weight of the protective layer 6.

The electrophotographic photoconductor shown in FIG. 5 can be fabricated by the following method:

The aromatic polycarbonate resin of the present invention, optionally in combination with the binder agent, is dissolved in a solvent to prepare a coating liquid for the charge transport layer 4. The thus prepared coating liquid is coated on the electroconductive support 1 and dried, whereby the charge transport layer 4 is provided on the electroconductive support 1. On the thus formed charge transport layer 4, a coating liquid prepared by dispersing the finely-divided particles of the charge generation material 3 in a solvent in which the binder agent may be dissolved when necessary, is coated by spray coating and dried, so that the charge generation layer 5 is provided on the charge transport layer 4. The amount ratios of the components contained in the charge generation layer 5 and charge transport layer 4 are the same as those previously described in FIG. 3.

The electrophotographic photoconductor shown in FIG. 6 can be fabricated by overlaying a protective layer 6 on the charge generation layer 5 of the photoconductor shown in FIG. 5.

To obtain any of the aforementioned photoconductors of the present invention, a metallic plate or foil made of aluminum, a plastic film on which a metal such as aluminum is deposited, and a sheet of paper which has been treated so as to be electroconductive can be employed as the electroconductive support 1.

Specific examples of the binder agent used in the preparation of the photoconductor according to the present invention are condensation resins such as polyamide, polyurethane, polyester, epoxy resin, polyketone and polycarbonate; and vinyl polymers such as polyvinylketone, polystyrene, poly-N-vinylcarbazole and polyacrylamide. All the resins having electrically insulating properties and adhesion properties can be employed.

Some plasticizers may be added to the above-mentioned binder agents, when necessary. Examples of the plasticizer for use in the present invention are halogenated paraffin, dimethylnaphthalene and dibutyl phthalate. Further, a variety of additives such as an antioxidant, a light stabilizer, a thermal stabilizer and a lubricant may also be contained in the binder agents when necessary.

Furthermore, in the electrophotographic photoconductor according to the present invention, an intermediate layer such as an adhesive layer or a barrier layer may be interposed between the electroconductive support and the photoconductive layer when necessary.

Examples of the material for use in the intermediate layer are polyamide, nitrocellulose, aluminum oxide, and titanium oxide. It is preferable that the thickness of the intermediate layer be 1 $\mu$m or less.

When copying is performed by use of the photoconductor according to the present invention, the surface of the photoconductor is uniformly charged to a predetermined polarity in the dark. The uniformly charged photoconductor is exposed to a light image so that a latent electrostatic image is formed on the surface of the photoconductor. The thus formed latent electrostatic image is developed to a visible image by a developer, and the developed image can be transferred to a sheet of paper when necessary.

The photosensitivity and the durability of the electrophotographic photoconductor according to the present invention are remarkably improved.

Other features of this invention will become apparent in the course of the following description of exemplary embodiments, which are given for illustration of the invention and are not intended to be limiting thereof.

PREPARATION EXAMPLE 1-1

Preparation of Aldehyde Compound No. 13 Shown in TABLE 3

In a steam of nitrogen, 77.28 g (504.0 mmol) of phosphorus oxychloride was added dropwise to 100 ml of N,N-dimethylformamide (DMF) over a period of 20 minutes at a temperature of 3 to 6° C. on an ice bath, whereby a Vilsmeier reagent was produced.

To this Vilsmeier reagent, a solution prepared by dissolving 54.67 g (105.0 mmol) of a diamine compound represented by the following formula (26) in 300 ml of DMF was added dropwise at 6° C. over a period of 30 minutes.

(26)

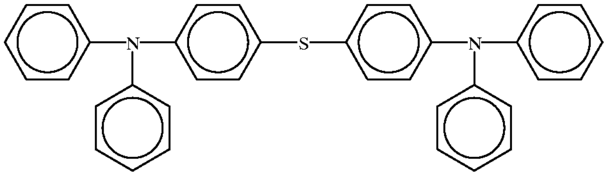

The temperature of the reaction mixture was returned to room temperature over a period of 30 minutes with stirring, and the reaction mixture was heated to 86° C. and stirred for 3 hours. Then, the reaction mixture was allowed to stand at room temperature, and poured into 2000 ml of ice-cold water. With the addition of a 20% aqueous solution of sodium hydroxide, the reaction mixture was made basic, and stirred at room temperature for 2 hours. The resultant yellow precipitate was extracted with ethyl acetate, and the resultant organic layer was washed with water and dried over anhydrous magnesium sulfate. The ethyl acetate was distilled away from the reaction mixture under reduced pressure, thereby obtaining a yellow-black oily material.

This material was then chromatographed on silica gel and eluted with a mixed solvent of toluene and ethyl acetate (at a ratio by volume of 20:1), so that an aldehyde compound No. 13 shown in TABLE 3 was obtained as yellow crystals in a yield of 47.16 g (77.9%).

The melting point of this compound was 155.5 to 157.5° C.

The melting point, and the results of the elemental analysis of each aldehyde compound are shown in TABLE 4.

Figure 8:
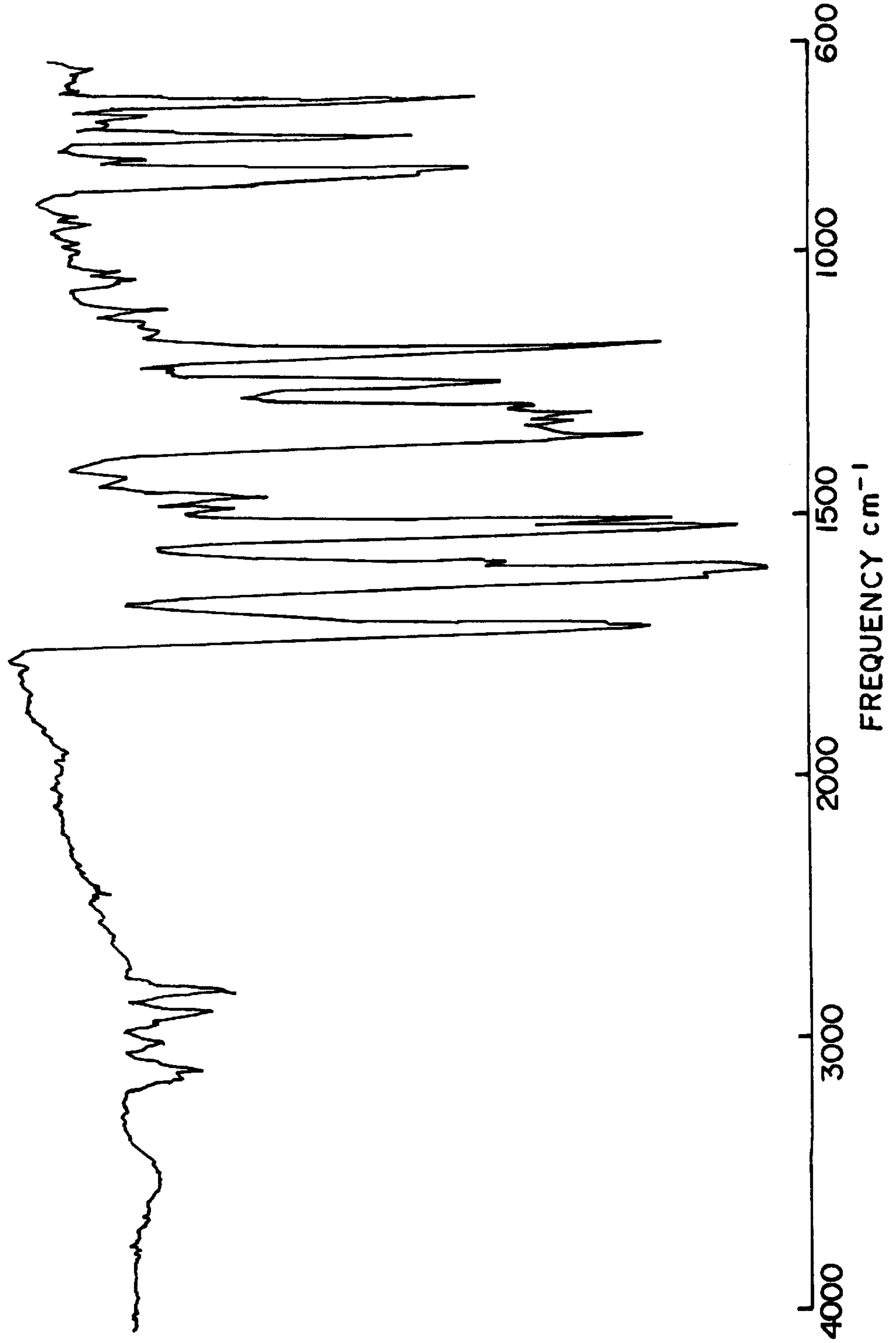
Figure 9:
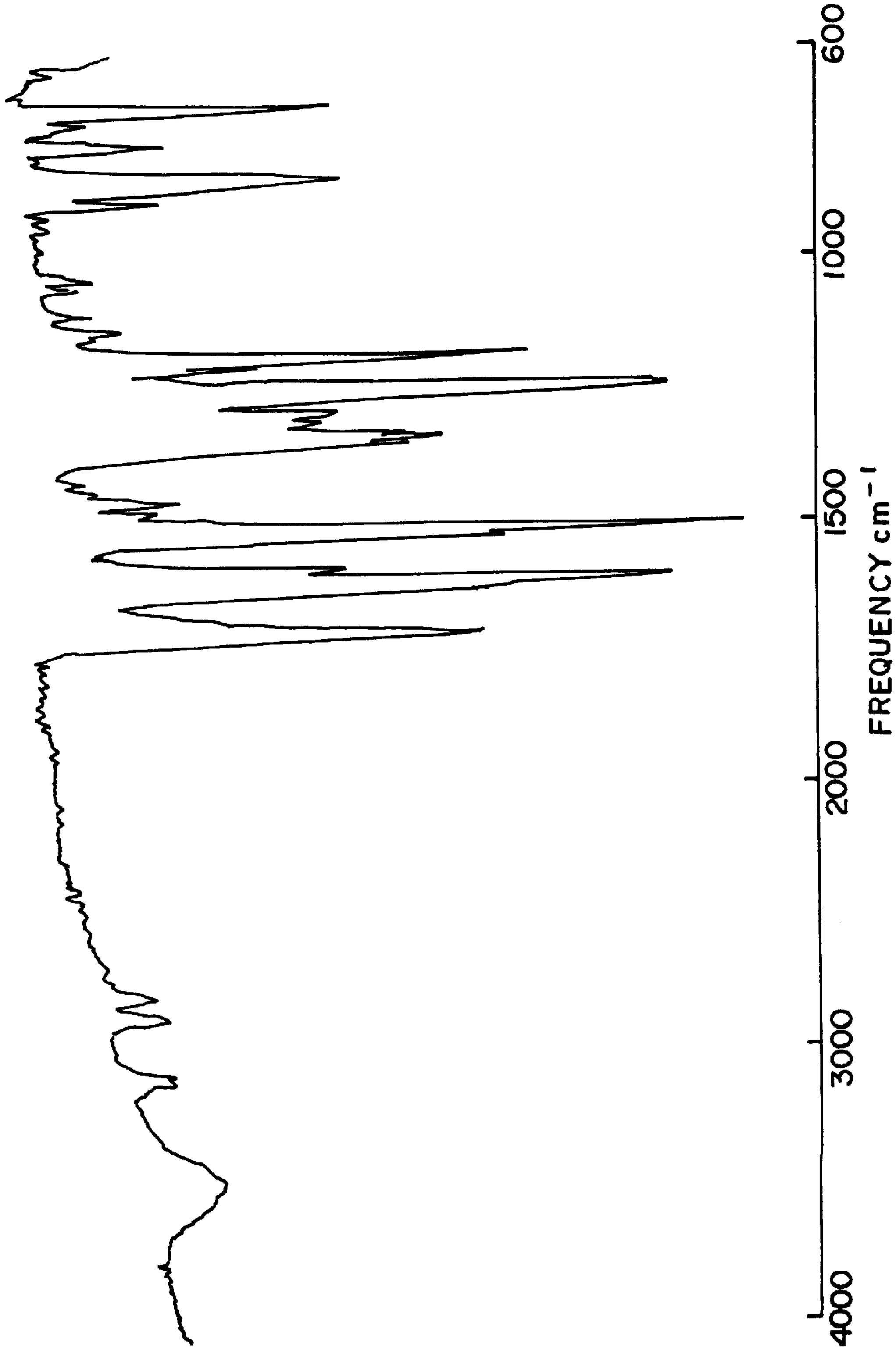

FIG. 8 and FIG. 9 show infrared spectra of the aldehyde compounds No. 1 and No. 7, respectively.

TABLE 4

| Preparation Example No. | Aldehyde Compound No. (See TABLE 3) | Diamine Compound (Raw Material) | Melting Point (° C.) | Elemental Analysis % C Found (Calcd.) | % H Found (Calcd.) | % N Found (Calcd.) |
|---|---|---|---|---|---|---|
| 1-1 | 13 | 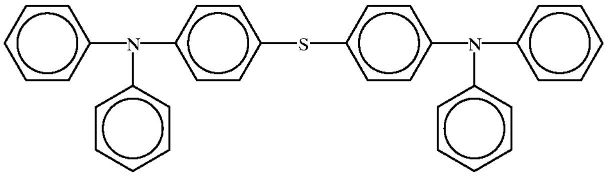 | 155.5–157.5 | 79.14 (79.31) | 4.89 (4.96) | 4.86 (4.74) |
| 1-2 | 1 | 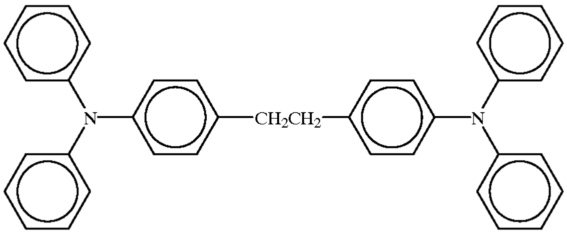 | 160.5–161.5 | 84.23 (83.39) | 5.59 (5.63) | 4.74 (4.89) |
| 1-3 | 7 | 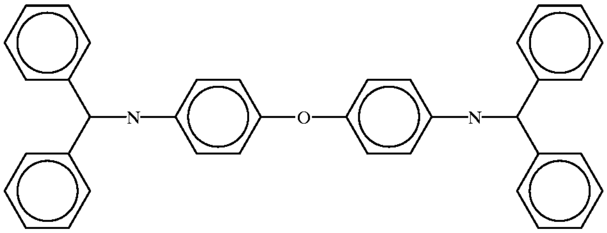 | 149.5–152.5 | 81.25 (81.41) | 5.00 (5.03) | 4.91 (5.00) |

The results of the elemental analysis of the thus obtained product were as follows:

| | % C | % H | % N |
|---|---|---|---|
| Found | 79.14 | 4.89 | 4.86 |
| Calculated | 79.31 | 4.96 | 4.74 |

The calculation is based on the formula for $C_{38}H_{28}N_2O_2S$.

Figure 7:
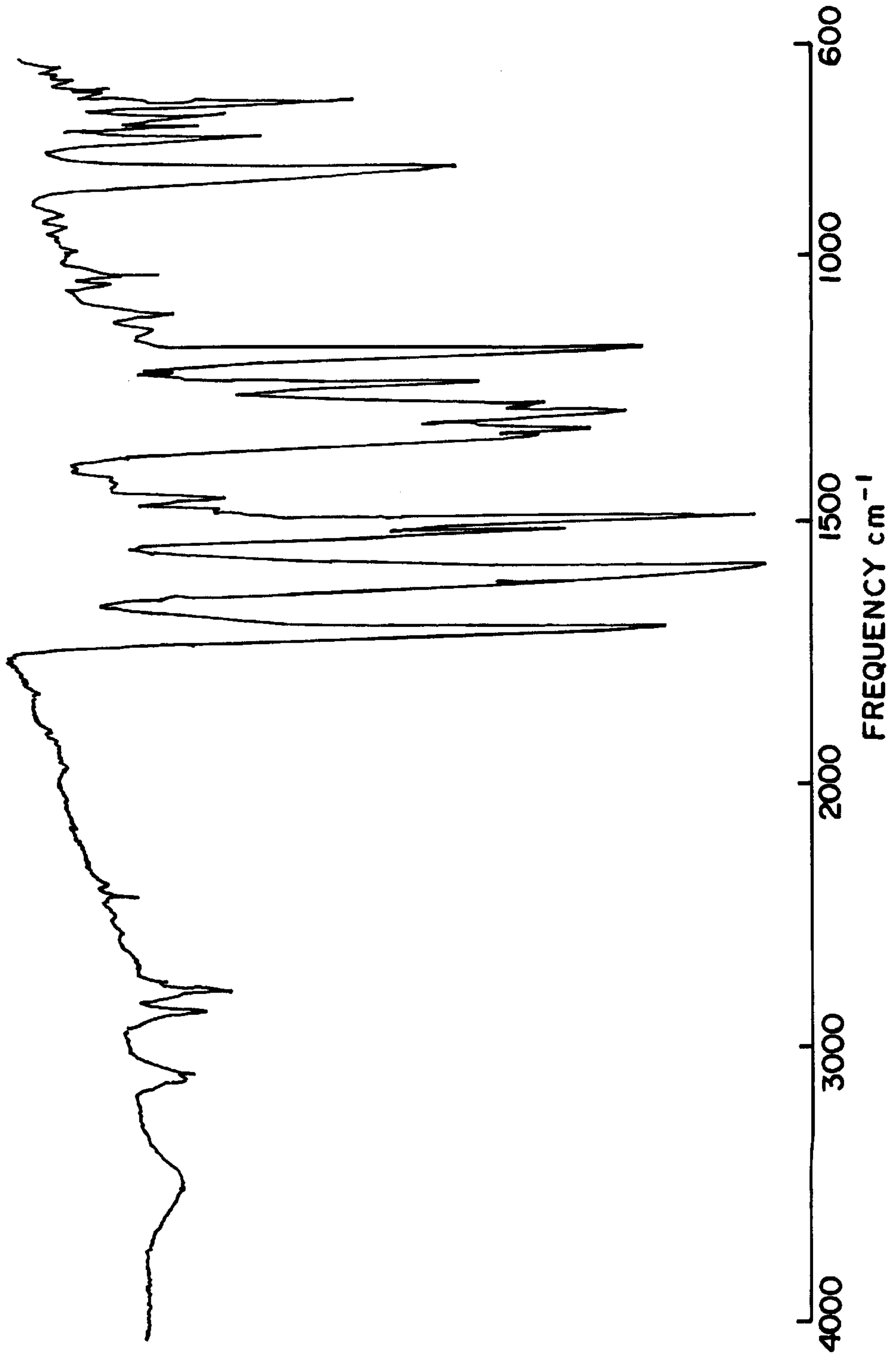
FIGS. 7 to 9 are IR spectra of aldehyde compounds respectively synthesized in Preparation Example 1-1 to 1-3, taken by use of a KBr tablet.

FIG. 7 is an infrared spectrum of the aldehyde compound No. 13 by use of a KBr tablet.

PREPARATION EXAMPLES 1-2 AND 1-3

The procedure for preparation of the aldehyde compound No. 13 in Preparation Example 1-1 was repeated except that the diamine compound of formula (26) used in Preparation Example 1-1 was replaced by each diamine compound shown in the following TABLE 4, so that aldehyde compounds No. 1 and No. 7 (shown in TABLE 3) for use in the present invention were respectively obtained in Preparation Examples 1-2 and 1-3.

PREPARATION EXAMPLE 2-1

Preparation of Aminostilbene Compound No. 1 Shown in TABLE 2

14.32 g (25.0 mmol) of the aldehyde compound No. 1 (shown in TABLE 3) represented by the following formula, synthesized in Preparation Example 1-2, and 15.49 g (60.0 mmol) of diethyl 4-methoxybenzyl phosphonate were placed in 100 ml of DMF.

Aldehyde Compound No. 1

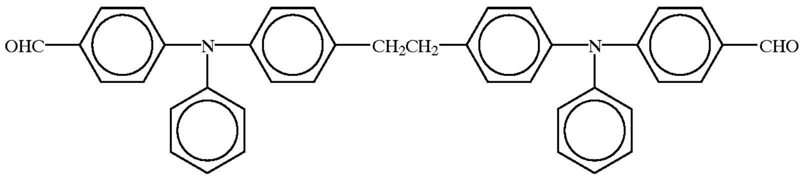

With stirring the above prepared mixture, 6.73 g (60.0 mmol) of potassium t-butoxide was added thereto over a period of 10 minutes, so that the reaction was carried out at room temperature for 3 hours.

This reaction mixture was poured into 400 ml of ice-cold water, and neutralized by the addition thereto of acetic acid. The resultant precipitate was separated from the reaction mixture by filtration, and successively washed with water and methanol, and then dried.

Thereafter, the obtained material was chromatographed on silica gel and eluted with a mixed solvent of toluene and cyclohexane (at a ratio by volume of 3:2), so that an aminostilbene compound No. 1 shown in TABLE 2 was obtained as light yellow crystals in a yield of 17.99 g (92.2%).

The melting point of this compound was 215.5 to 218.5° C.

The results of the elemental analysis of the thus obtained product were as follows:

| | % C | % H | % N |
|---|---|---|---|
| Found | 86.42 | 6.44 | 3.28 |

-continued

| | % C | % H | % N |
|---|---|---|---|
| Calculated | 86.12 | 6.19 | 3.59 |

The calculation is based on the formula for $C_{56}H_{48}N_2O_2$.

Figure 10:
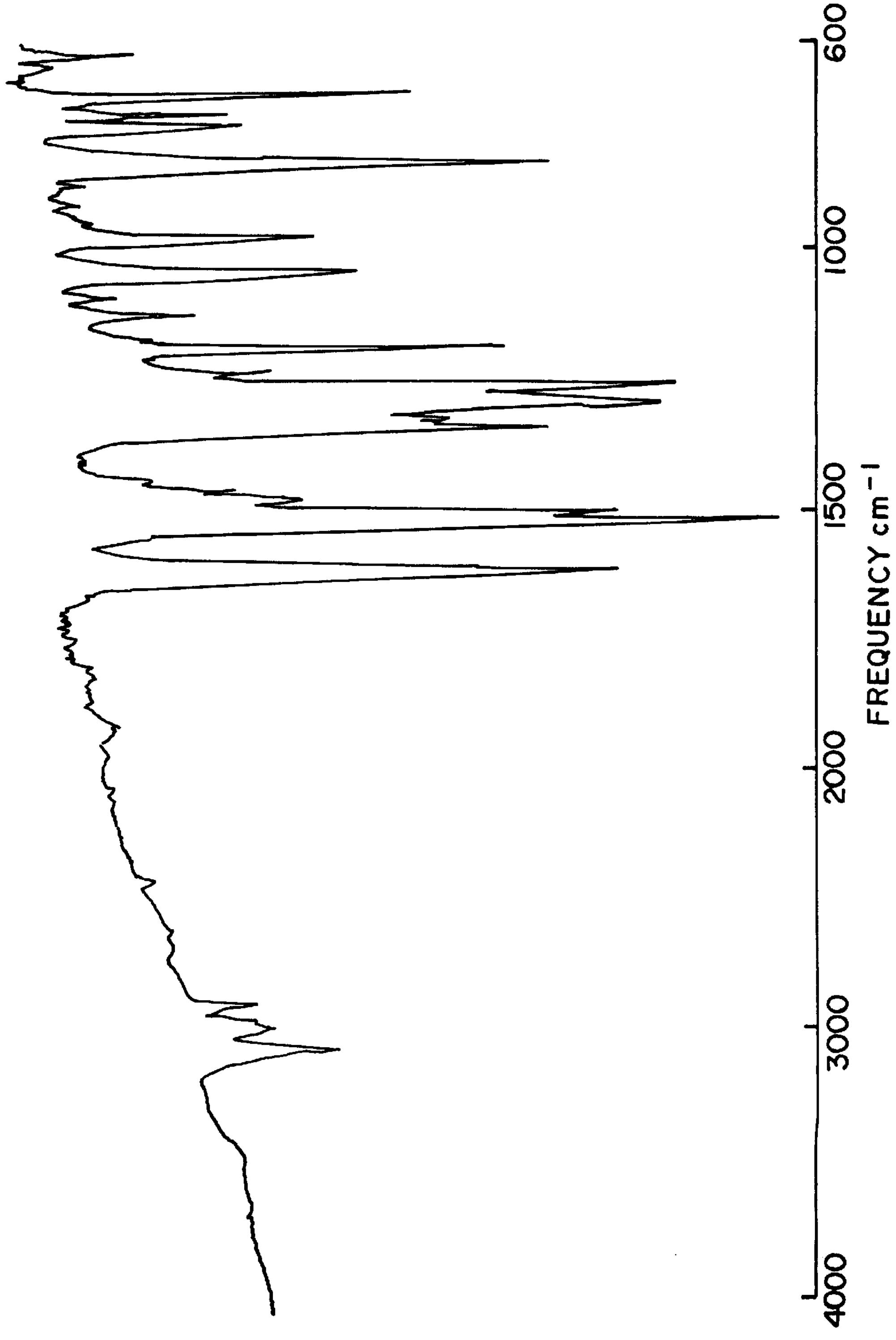
FIGS. 10 to 13 are IR spectra of aminostilbene compounds respectively synthesized in Preparation Examples 2-1 to 2-4, taken by use of a KBr tablet.

FIG. 10 is an infrared spectrum of the aminostilbene compound No. 1 by use of a KBr tablet.

PREPARATION EXAMPLES 2-2 TO 2-4

The procedure for preparation of the aminostilbene compound No. 1 in Preparation Example 2-1 was repeated except that the aldehyde compound No. 1 and diethyl 4-methoxybenzyl phosphonate used in Preparation Example 2-1 were replaced by the respective raw materials shown in the following TABLE 5, so that aminostilbene compounds No. 12, No. 13 and No. 14 (shown in TABLE 2) for use in the present invention were respectively obtained in Preparation Examples 2-2, 2-3, and 2-4.

The melting point, and the results of the elemental analysis of each aminostilbene compound are shown in TABLE 5.

Figure 11:
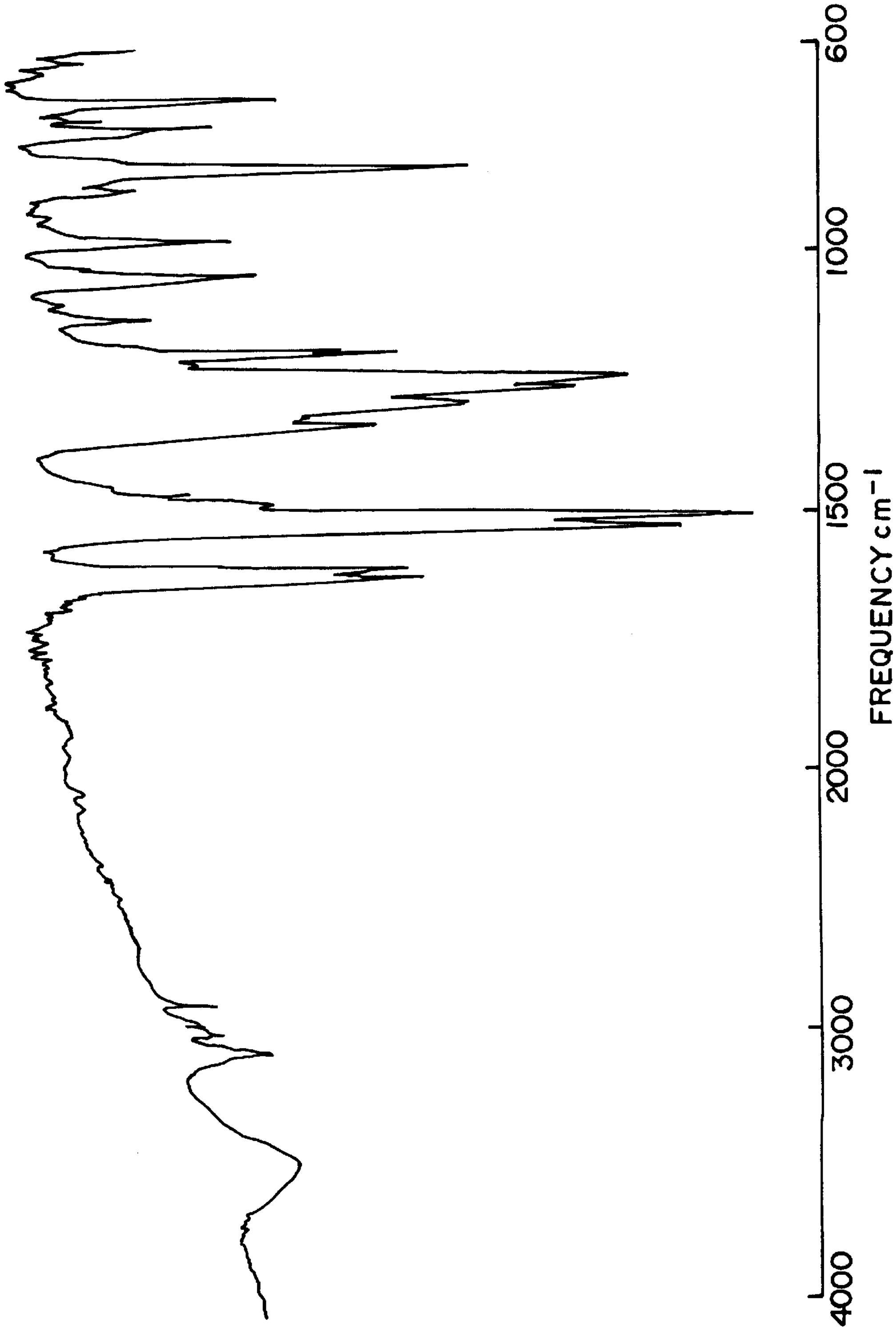
Figure 12:
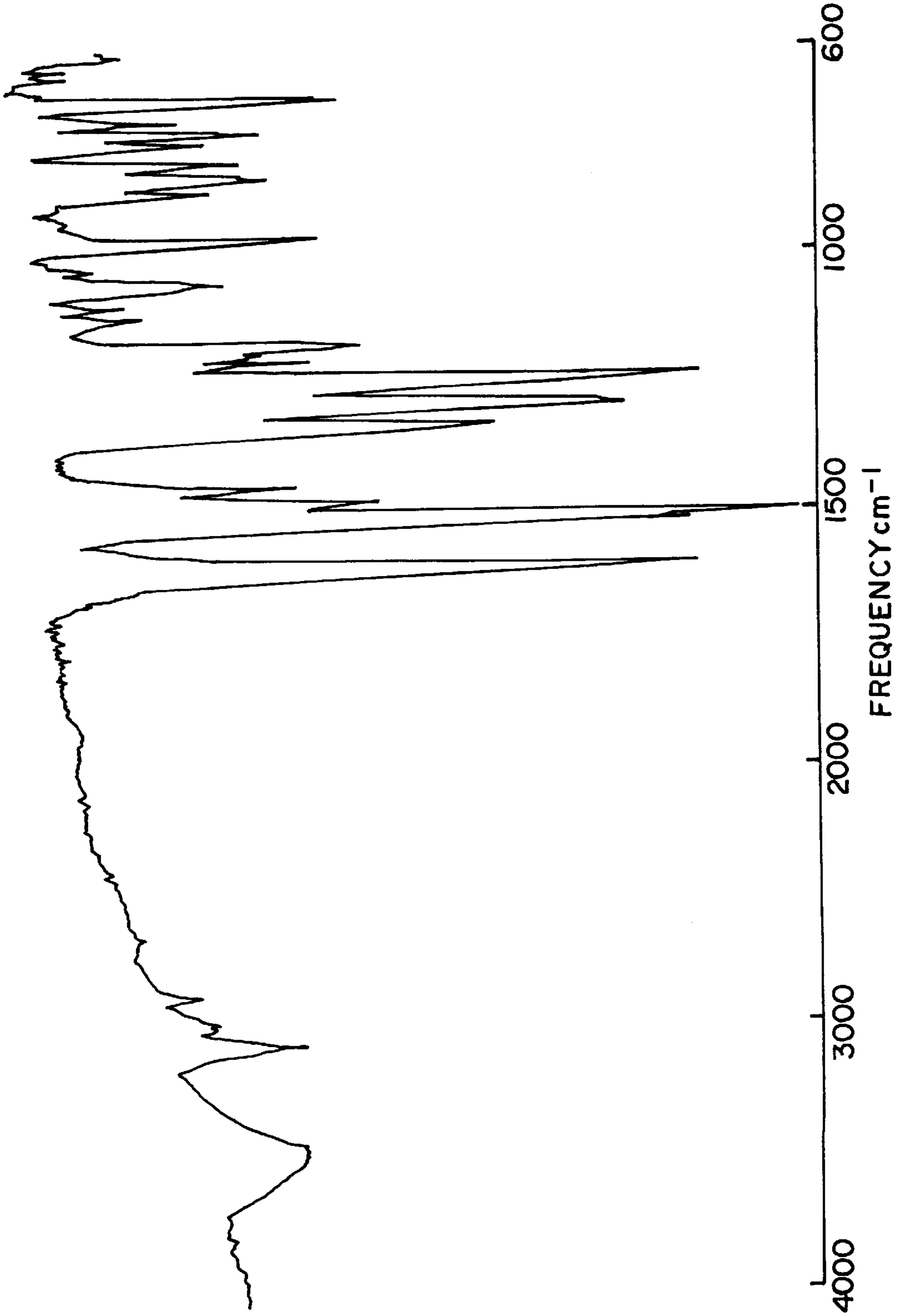
Figure 13:
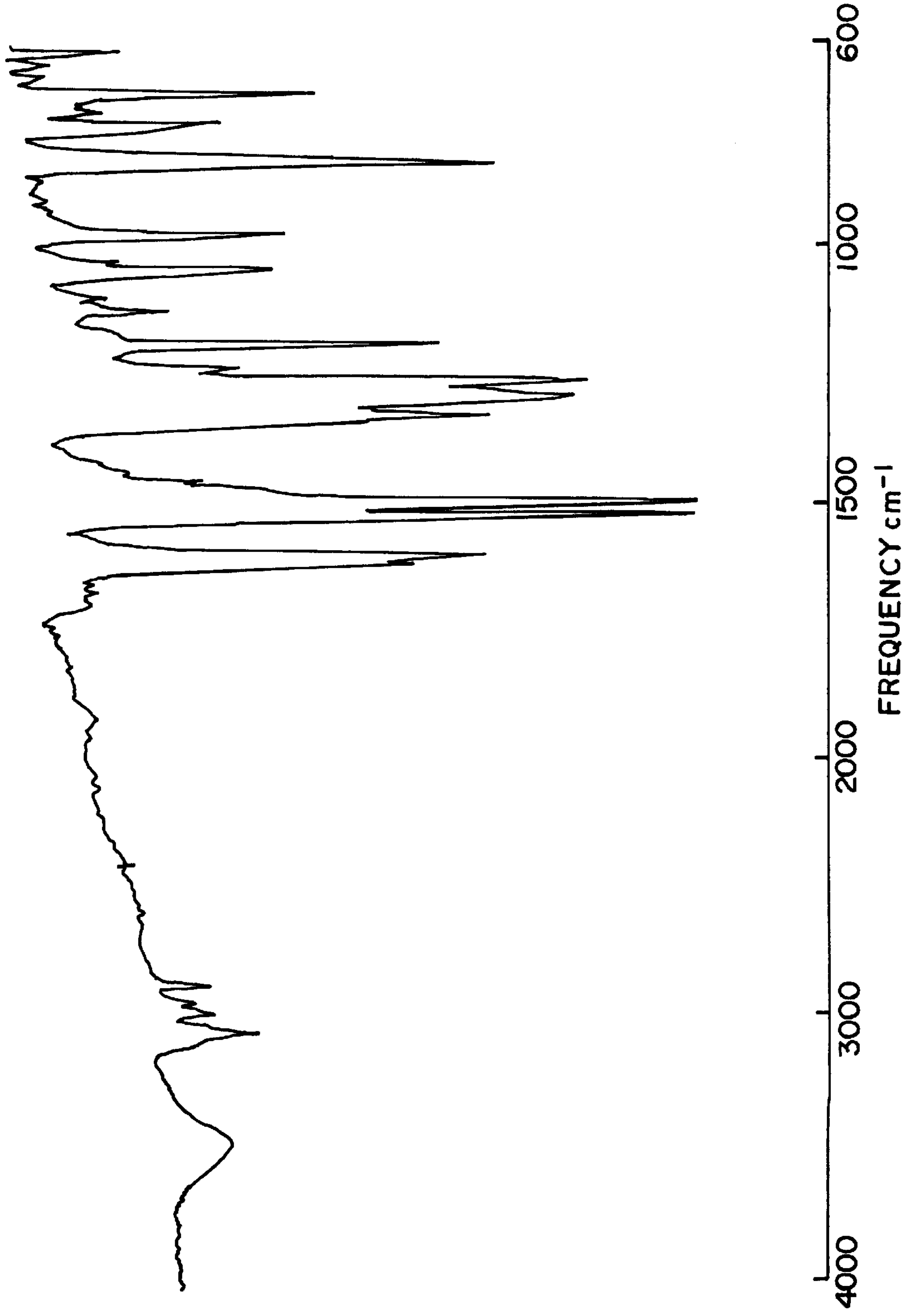

FIG. 11, FIG. 12 and FIG. 13 show infrared spectra of the aminostilbene compounds No. 12, No. 13 and No. 14, respectively.

TABLE 5

| Preparation Example No. | Aminostilbene Compound No. (See TABLE 2) | Raw Materials Aldehyde Compound (See TABLE 3) |
|---|---|---|
| 2-2 | 12 | 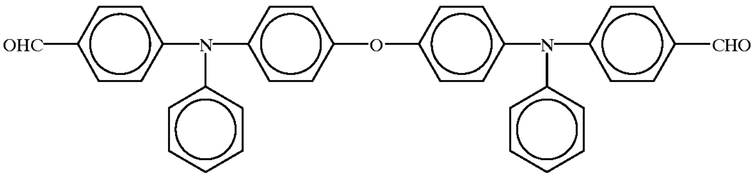 (No. 7) |
| 2-3 | 13 | 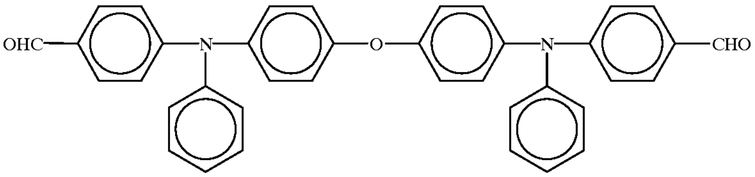 (No. 7) |

TABLE 5-continued

| | | |
|---|---|---|
| 2-4 | 14 | 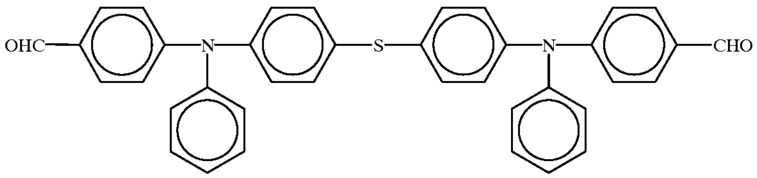 (No. 13) |

| Prepa-ration Example No. | Raw Materials Phosphorus-containing Compound | Melting Point (° C.) | Elemental Analysis % C Found (Calcd.) | % H Found (Calcd.) | % N Found (Calcd.) |
|---|---|---|---|---|---|
| 2-2 | 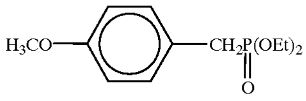 | 272 (Endo-thermic peak by DIA) | 84.25 (84.34) | 5.66 (5.78) | 3.58 (3.64) |
| 2-3 | 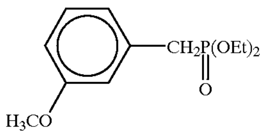 | 197.5–201.5 | 84.95 (84.34) | 5.87 (5.78) | 3.39 (3.6) |
| 2-4 | 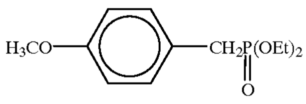 | 250 | 82.59 (82.62) | 5.57 (5.65) | 3.60 (3.57) |

PREPARATION EXAMPLE 3-1

Preparation of Diol Compound No. 1 Shown in TABLE 1

15.62 g (20.0 mmol) of the aminostilbene compound No. 1 represented by the following formula, synthesized in Preparation Example 2-1, and 10 g (107 mmol) of 90% sodium thioethylate were added to 100 ml of N,N-dimethylforamide dried using molecular sieves. The thus prepared mixture was stirred at 130 to 135° C. in a stream of nitrogen for 3 hours.

Aminostilbene Compound No. 1

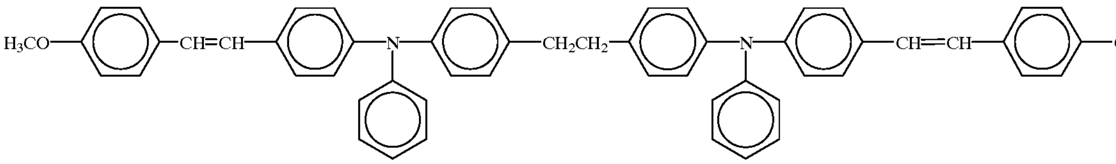

After the reaction mixture was cooled to 60° C., the mixture was poured into 300 ml of ice-cold water, and made acid with concentrated hydrochloric acid, and then stirred at room temperature for one hour. The precipitating crystals were separated from the reaction mixture by filtration, and successively washed with water and methanol, and then dried.

Thereafter, the obtained material was chromatographed on silica gel and eluted with a mixed solvent of toluene and ethyl acetate (at a ratio by volume of 10:1), so that a diol compound (hydroxystilbene compound) No. 1 shown in TABLE 1 was obtained as yellow crystals in a yield of 12.04 g (79.9%).

The melting point of this compound was 213.5 to 218.0° C.

The results of the elemental analysis of the thus obtained product were as follows:

| | % C | % H | % N |
|---|---|---|---|
| Found | 86.12 | 5.83 | 3.59 |
| Calculated | 86.14 | 5.89 | 3.72 |

The calculation is based on the formula for $C_{54}H_{44}N_2O_2$.

Figure 14:
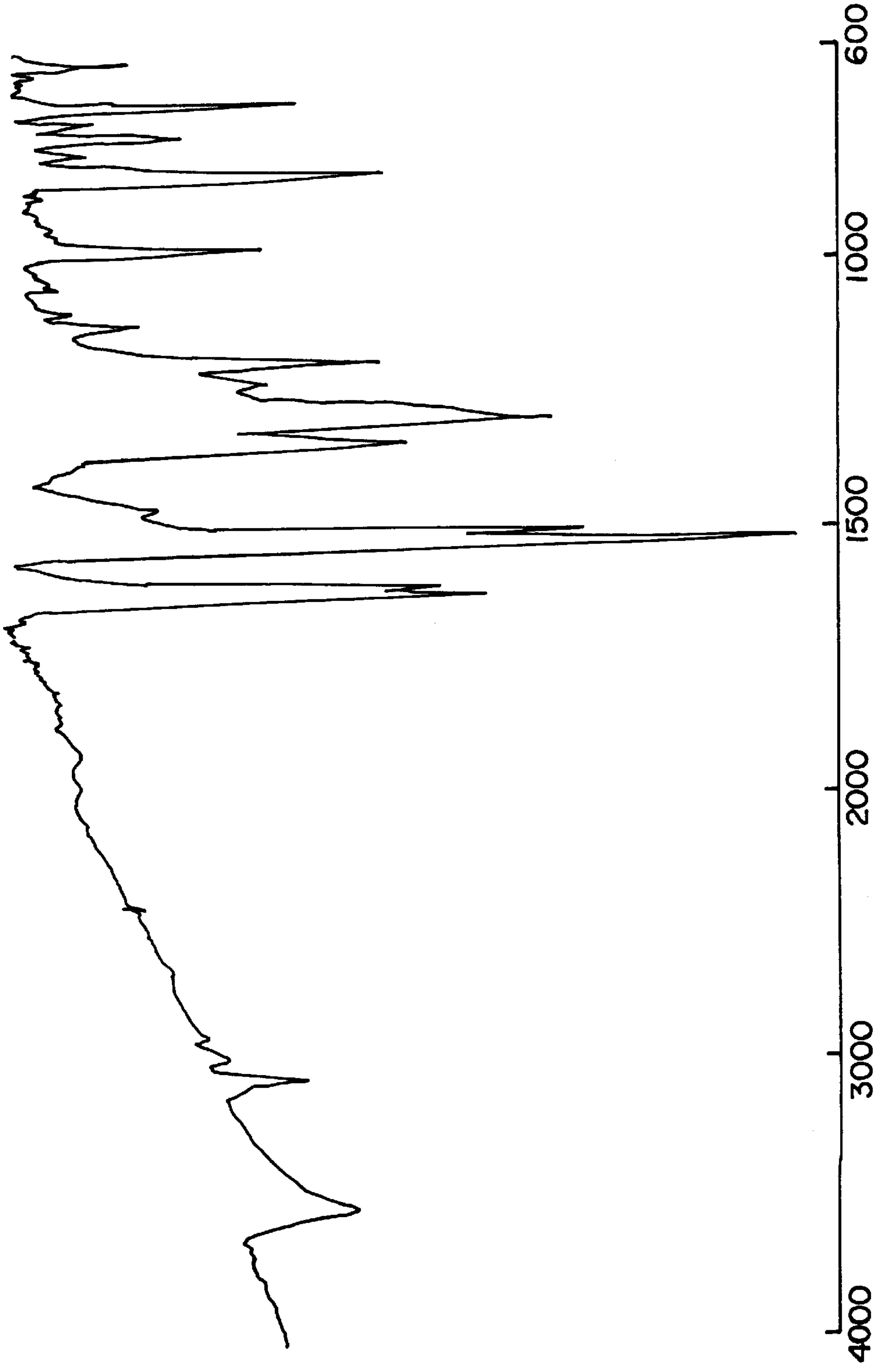
FIGS. 14 to 16 are IR spectra of diol compounds (hydroxystilbene compounds) respectively synthesized in Preparation Examples 3-1 to 3-3,taken by use of a KBr tablet.

FIG. 14 is an infrared spectrum of the diol compound No. 1 by use of a KBr tablet.

PREPARATION EXAMPLES 3-2 AND 3-3

The procedure for preparation of the diol compound No. 1 in Preparation Example 3-1 was repeated except that the aminostilbene compound No. 1 used in Preparation Example 3-1 was replaced by each aminostilbene compound shown in the following TABLE 6, so that diol compounds No. 12 and No. 14 (shown in TABLE 1) for use in the present invention were respectively obtained in Preparation Examples 3-2 and 3-3.

The melting point, and the results of the elemental analysis of each diol compound are shown in TABLE 6.

Figure 15:
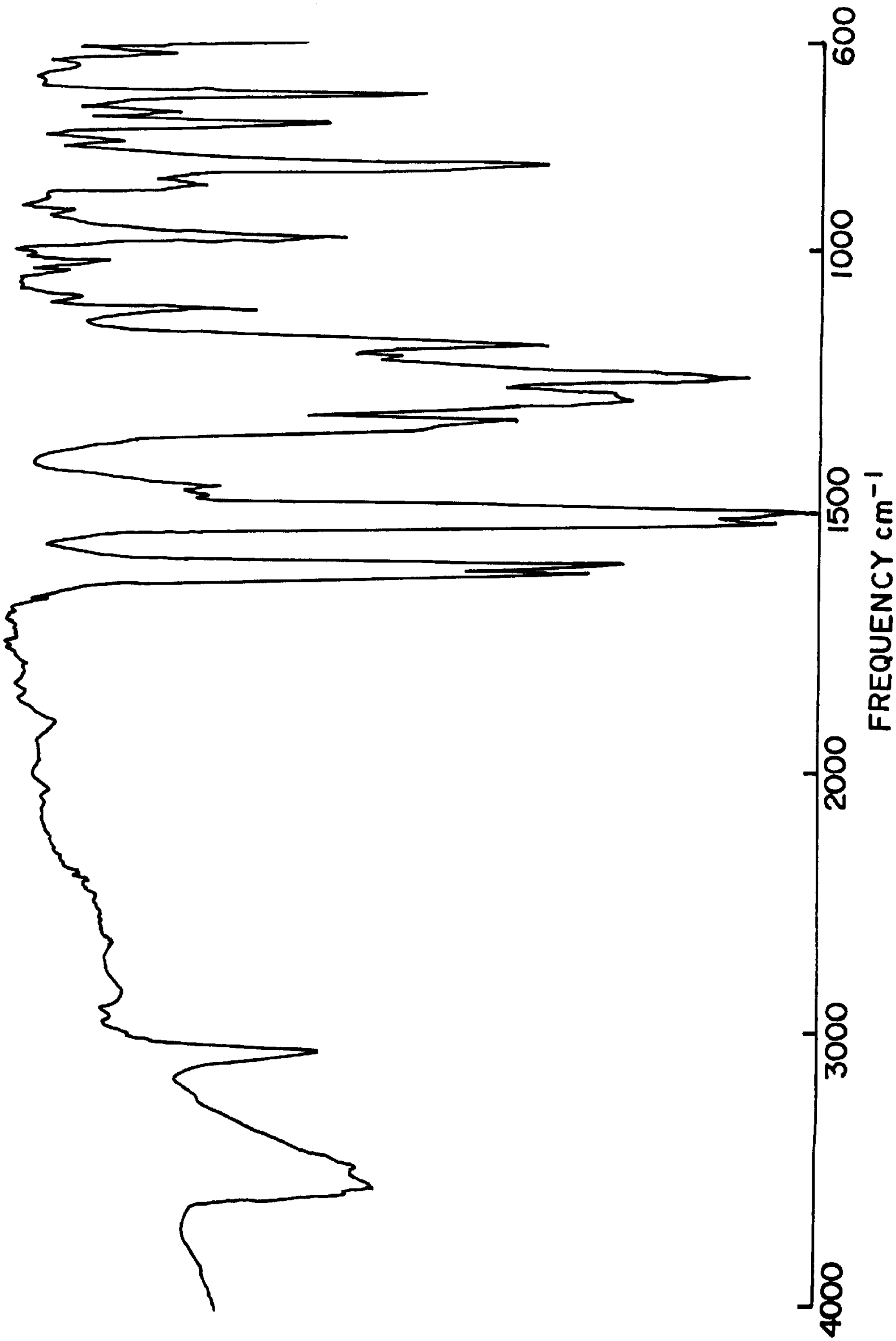
Figure 16:
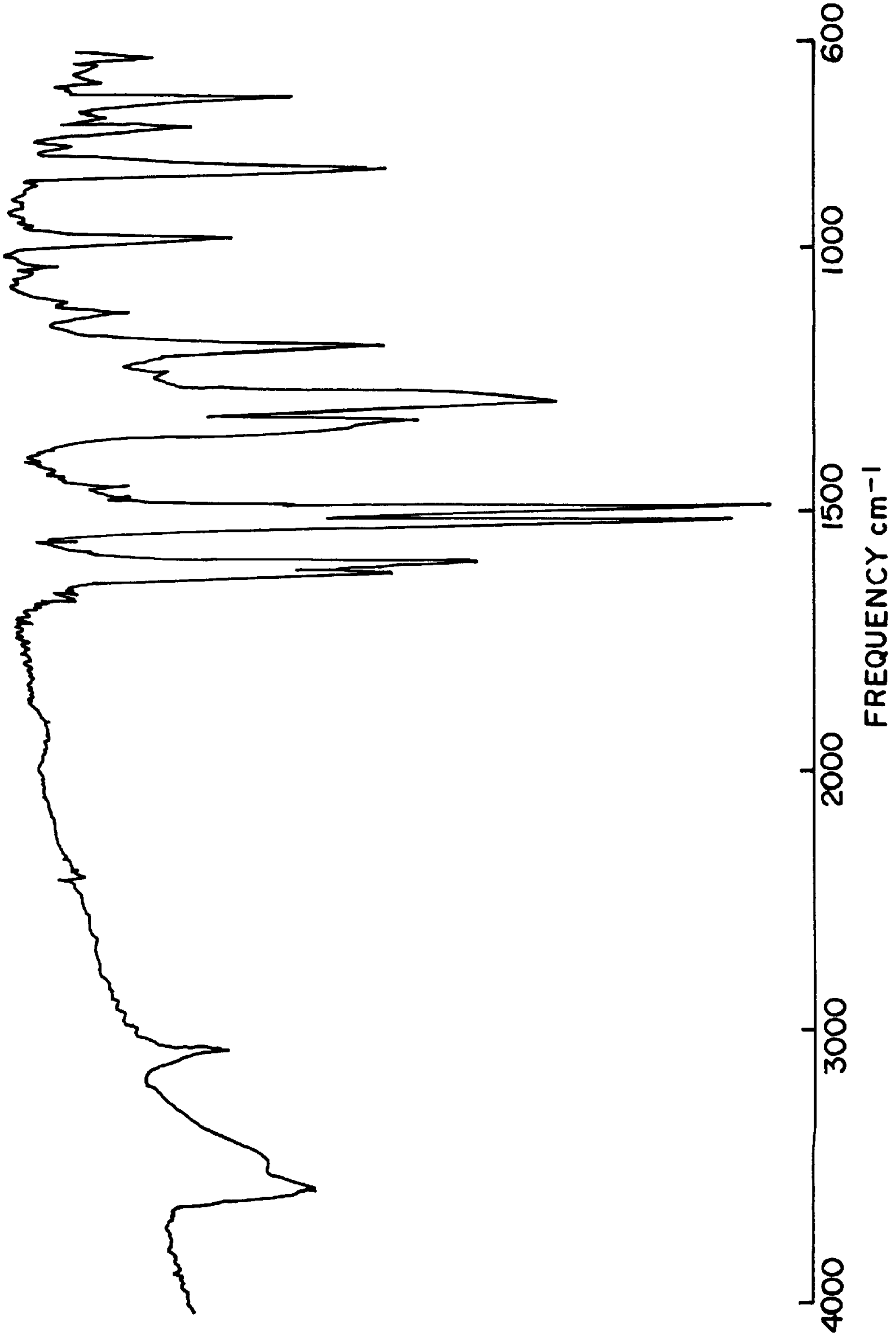

FIG. 15 and FIG. 16 show infrared spectra of the diol compounds No. 12 and No. 14, respectively.

TABLE 6

| Preparation Example No. | Diol Compound No. (See TABLE 1) | Aminostilbene Compound No. (Raw Material) (See TABLE 2) | Melting Point (° C.) | Elemental Analysis % C Found/ (Calcd.) | % H Found/ (Calcd.) | % N Found/ (Calcd.) |
|---|---|---|---|---|---|---|
| 3-1 | 1 | 1 | 213.5–218.0 | 86.12/ (86.14) | 5.83/ (5.89) | 3.59/ (3.72) |
| 3-2 | 12 | 12 | >250 | 84.31/ (84.34) | 5.38/ (5.44) | 3.57/ (3.78) |
| 3-3 | 14 | 14 | 235.0 | 82.47/ (82.51) | 5.29/ (5.33) | 3.71/ (3.70) |

EXAMPLE 1-1

Synthesis of Aromatic Polycarbonate Resin No. 1

In a stream of nitrogen a mixture of 2.26 g (3.0 mmol) of the diol compound No. 1 (shown in TABLE 1) represented by the following formula, synthesized in Preparation Example 3-1 and 0.91 g (9.0 mmol) of triethylamine was dissolved in 15 ml of dry tetrahydrofuran at room temperature.

Diol Compound No. 1

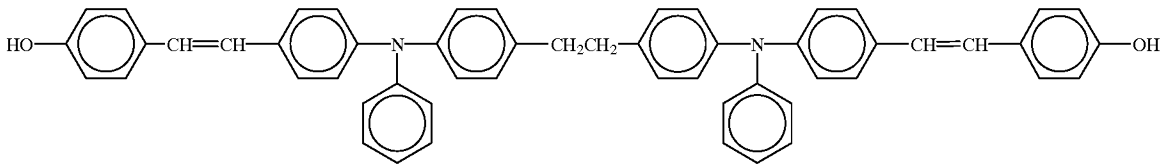

To the above prepared mixture, a solution prepared by dissolving 1.10 g (3.0 mmol) of tetraethylene glycol bis (chloroformate) in 3 ml of dry tetrahydrofuran was added dropwise over a period of 30 minutes. Then, the reaction mixture was stirred at room temperature for 3 hours. With the addition of 0.21 g of a 4% tetrahydrofuran solution of phenol, the reaction mixture was further stirred for one hour.

The resultant precipitating triethylamine hydrochloride was removed from the reaction mixture by filtration, and the residual filtrate (that is, tetrahydrofuran solution) was added dropwise to methanol. The thus precipitating product was separated by filtration, and dried by the application of heat thereto under reduced pressure.

Further, the thus obtained crude product was purified by repeating the process of dissolving the product in tetrahydrofuran and precipitating it in methanol twice, and the obtained resin was dried by the application of heat thereto under reduced pressure, so that an aromatic polycarbonate resin No. 1 according to the present invention was obtained as an alternating copolymer having a repeat unit shown in TABLE 8 in a yield of 2.36 g (75.2%).

The glass transition temperature (Tg) of the aromatic polycarbonate resin No. 1 was 82.3° C.

The polystyrene-reduced number-average molecular weight and weight-average molecular weight, which were measured by the gel permeation chromatography, were respectively 21,700 and 41,500.

The results of the elemental analysis of the thus obtained compound are as follows:

| | % C | % H | % N |
|---|---|---|---|
| Found | 78.44 | 6.52 | 2.66 |
| Calculated | 78.51 | 6.43 | 2.68 |

The calculation is based on the formula for $C_{68.36}H_{66.72}N_2O_{8.09}$.

Figure 17:
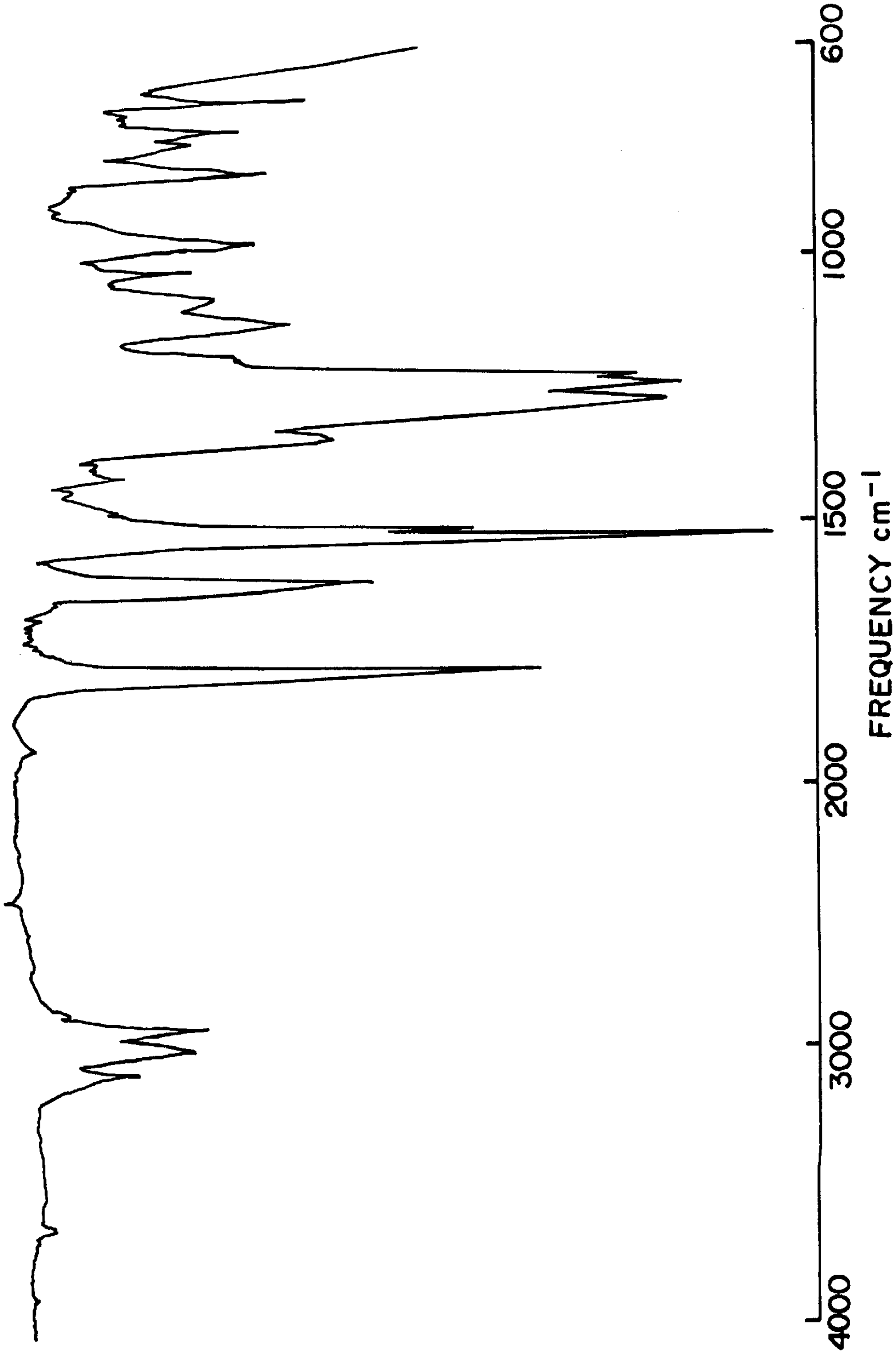
FIGS. 17 to 24 are IR spectra of aromatic polycarbonate resins according to the present invention, respectively synthesized in Examples 1-1 to 1-8, taken by use of a cast film.

FIG. 17 shows an infrared spectrum of the aromatic polycarbonate resin No. 1, taken by use of a cast film.

EXAMPLE 1-2 AND 1-3

Synthesis of Aromatic Polycarbonate Resins Nos. 2 and 3

The procedure for preparation of the aromatic polycarbonate resin No. 1 in Example 1-1 was repeated except that tetraethylene glycol bis(chloroformate) used in Example 1-1 was replaced by each bis(chloroformate) compound shown in TABLE 7A.

Thus, aromatic polycarbonate resins No. 2 and No. 3 according to the present invention were obtained, each having the repeat unit shown in TABLE 8.

The glass transition temperature (Tg), the polystyrene-reduced number-average molecular weight (Mn), the polystyrene-reduced weight-average molecular weight (Mw), and the results of the elemental analysis of each of the obtained aromatic polycarbonate resins No. 2 and No. 3 are shown in TABLE 8.

Figure 18:
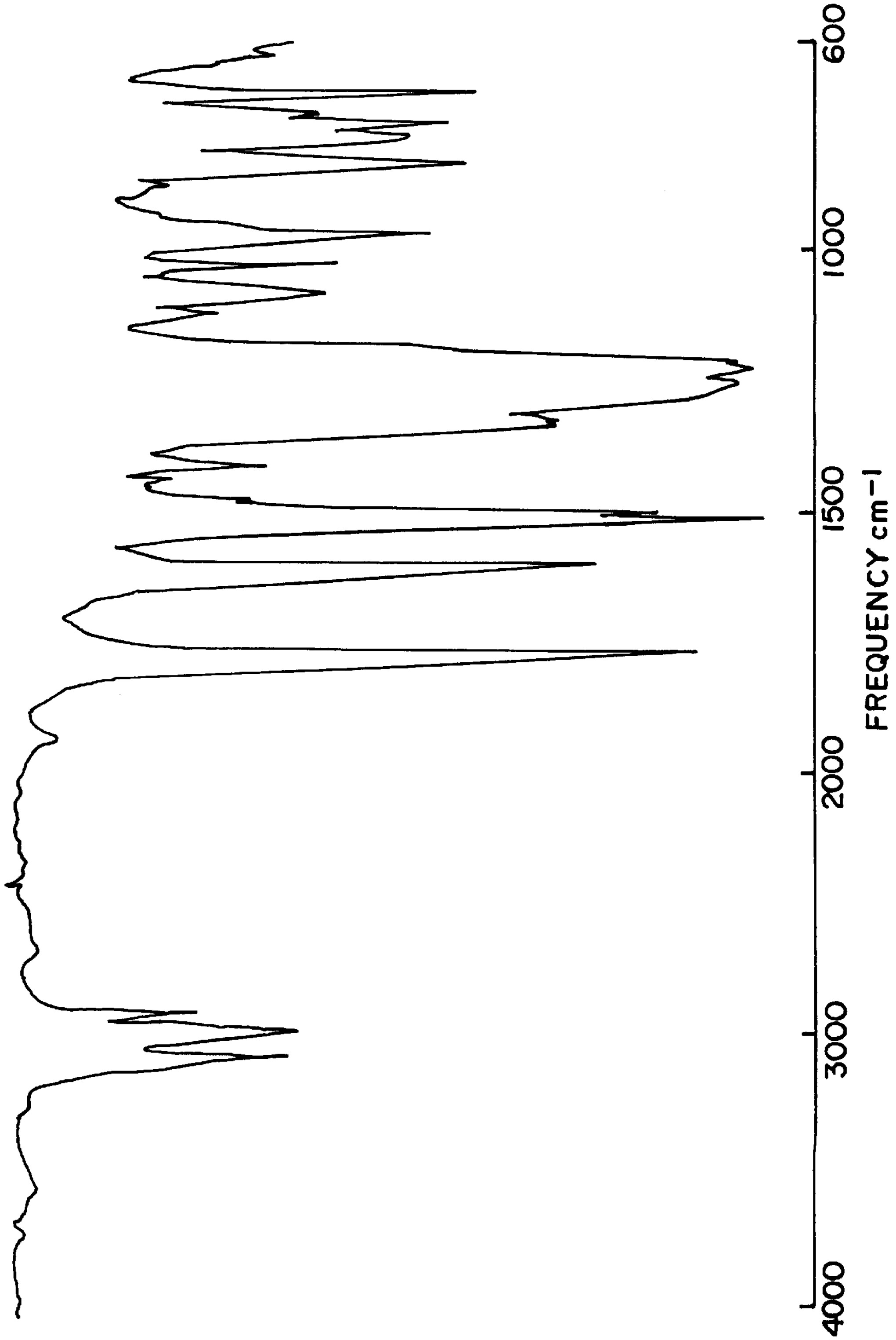
Figure 19:
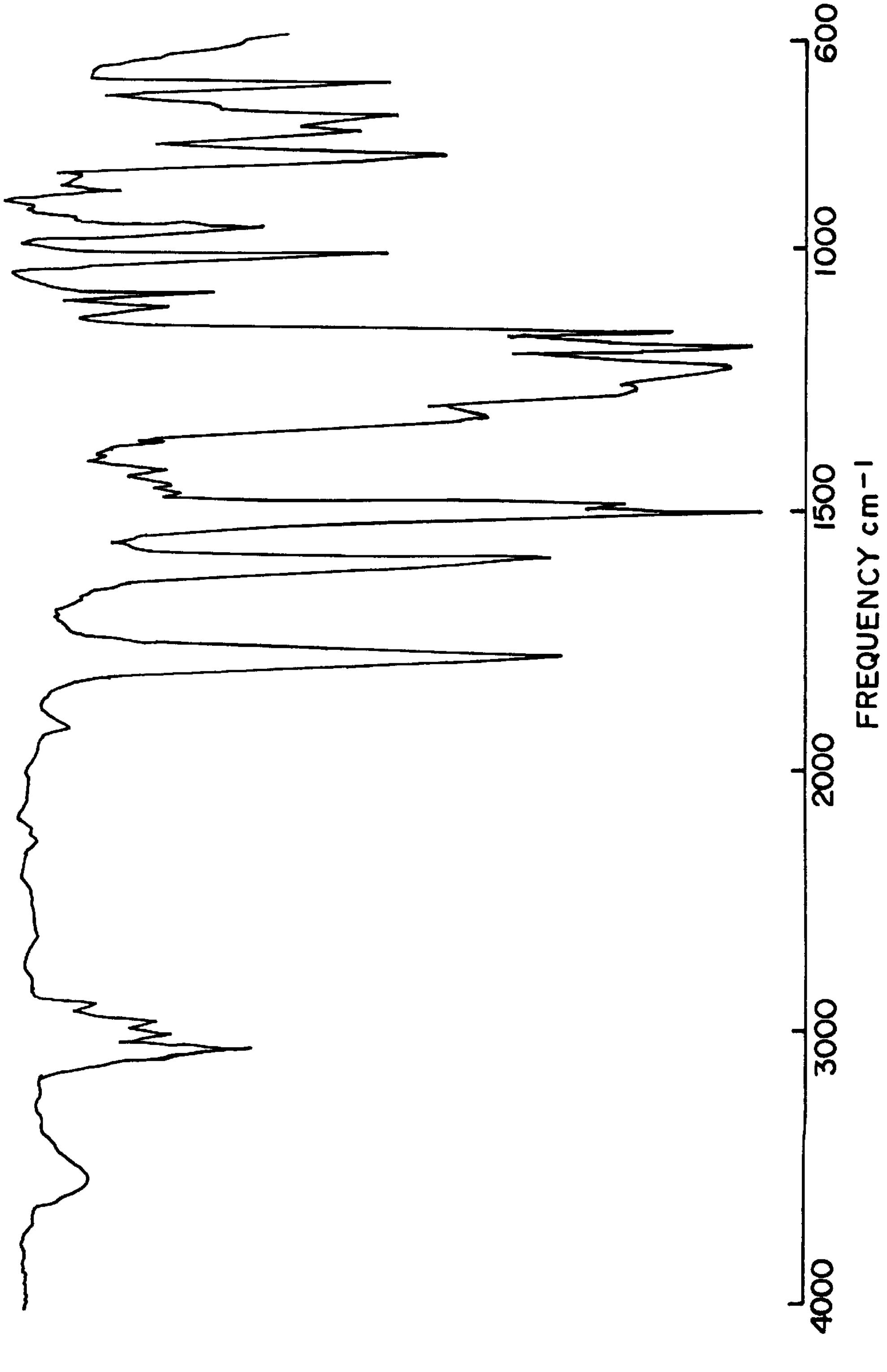

FIGS. 18 and 19 respectively show infrared spectra of the aromatic polycarbonate resins No. 2 and No. 3 obtained in Examples 1-2 and 1-3, taken by use of a cast film.

EXAMPLE 1-4

1.355 g (1.80 mmol) of the diol compound No. 1 synthesized in Preparation Example 3-1, 1.065 g (4.67 mmol) of bisphenol A, and 0.020 g of t-butylphenol were placed in a reaction vessel. In a stream of argon, the above prepared mixture was stirred with the addition thereto of 50 ml of ion exchange water in which 0.071 g of hydrosulfite and 1.035 g of sodium hydroxide were dissolved.

To the above reaction mixture, 35 ml of dichloromethane in which 1.152 g of triphosgene was dissolved was added dropwise at 3° C., and thereafter the temperature of the reaction mixture was returned to room temperature over a period of 15 minutes. Then, 1.5 ml of 10% sodium hydroxide and two drops of triethylamine were successively added to the reaction mixture to carry out the reaction for 2 hours.

With the addition of 0.010 g of t-butylphenol, the reaction mixture was further stirred for 2 hours. The thus obtained reaction mixture was precipitated in methanol, so that an aromatic polycarbonate resin No. 4 according to the present invention was obtained as a random copolymer having structural units shown in TABLE 8 was obtained in a yield of 2.49 g (96.1%).

The glass transition temperature (Tg) of the aromatic polycarbonate resin No. 4 was 171.2° C.

The polystyrene-reduced number-average molecular weight and weight-average molecular weight, which were measured by the gel permeation chromatography, were respectively 28,400 and 127,400.

The results of the elemental analysis of the thus obtained compound are as follows:

| | % C | % H | % N |
|---|---|---|---|
| Found | 80.44 | 5.37 | 2.13 |
| Calculated | 80.56 | 5.49 | 1.96 |

The calculation is based on the formula for $C_{26.84}H_{21.78}N_{0.56}O_3$.

Figure 20:
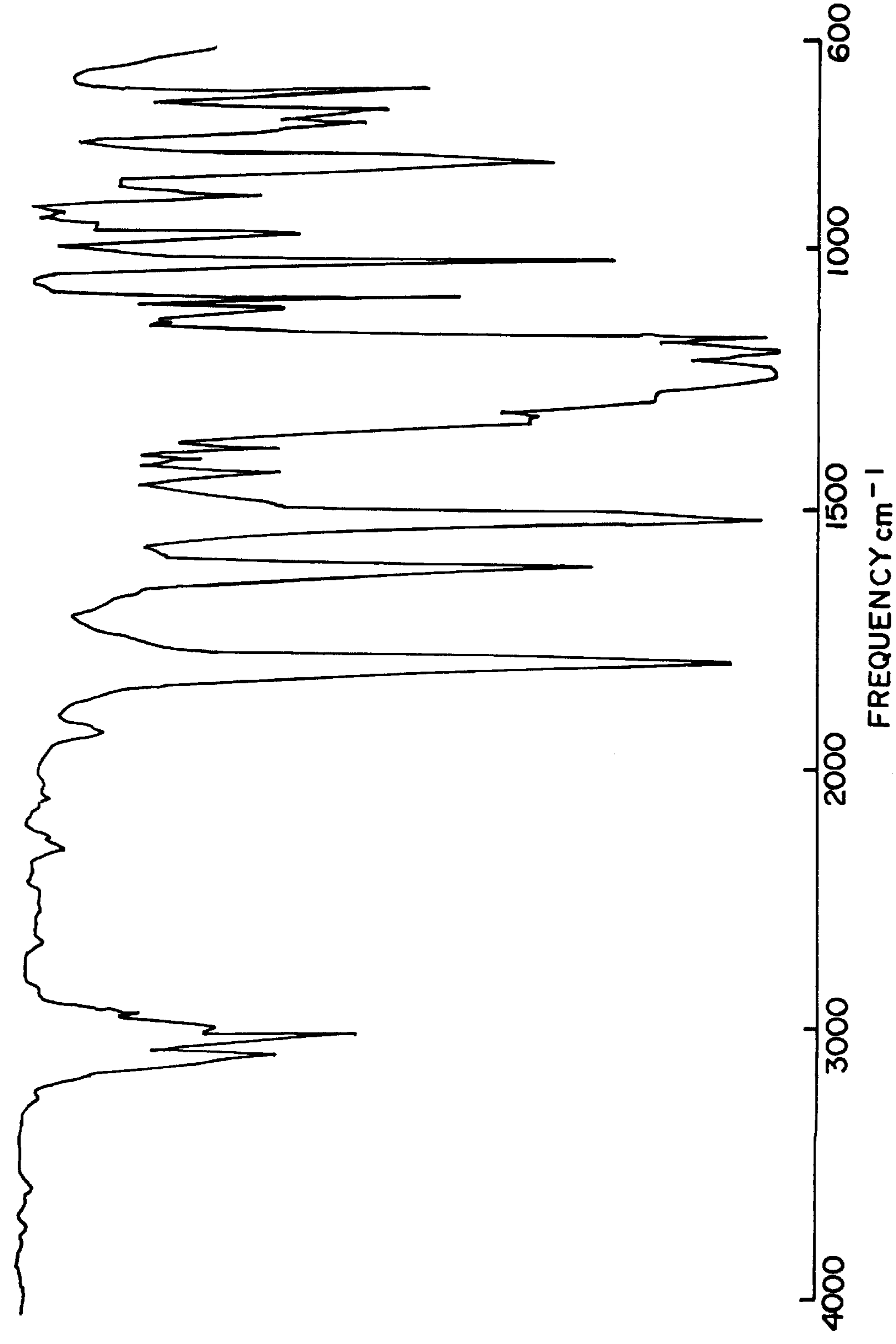
Figure 21:
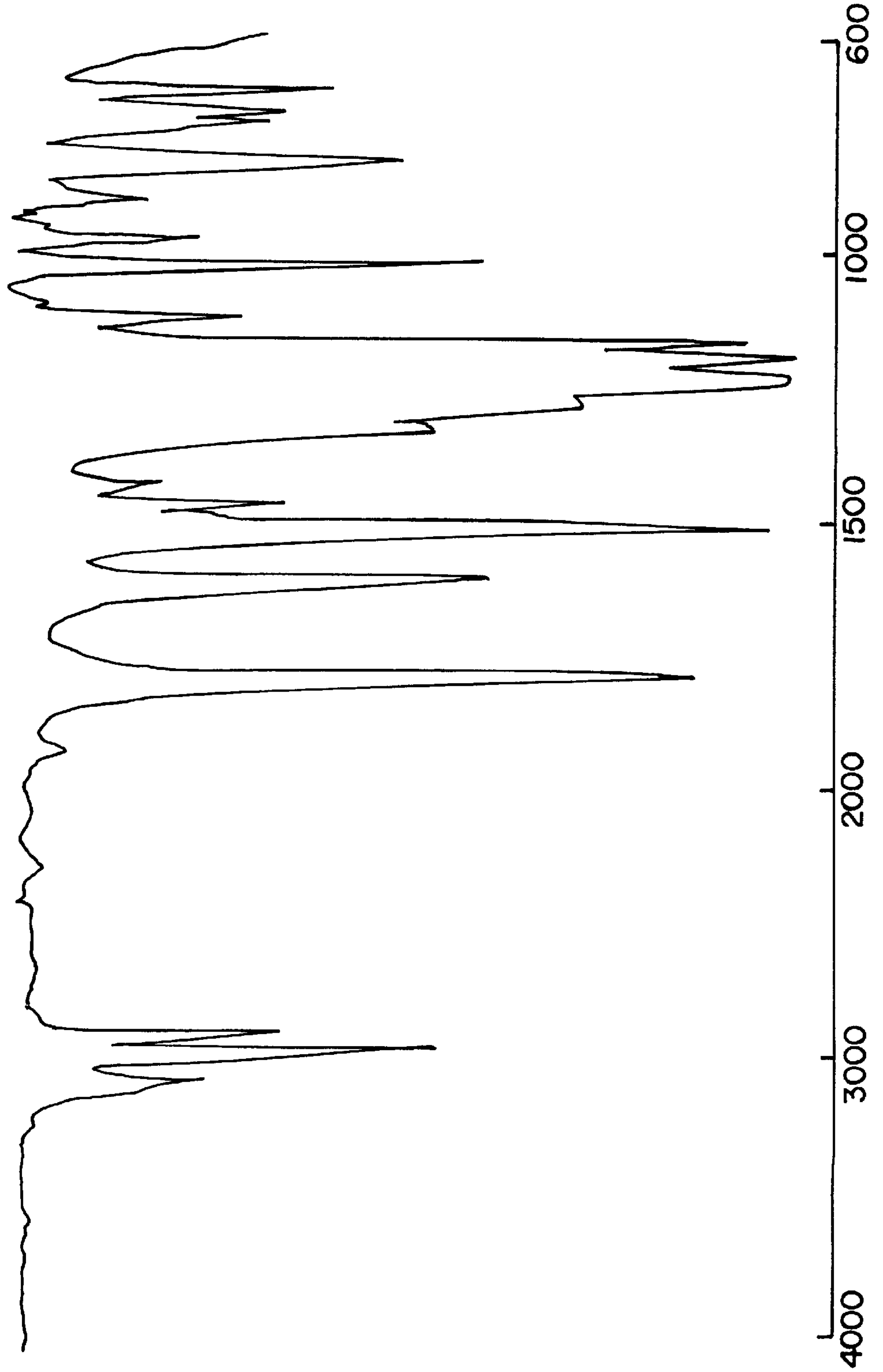
Figure 22:
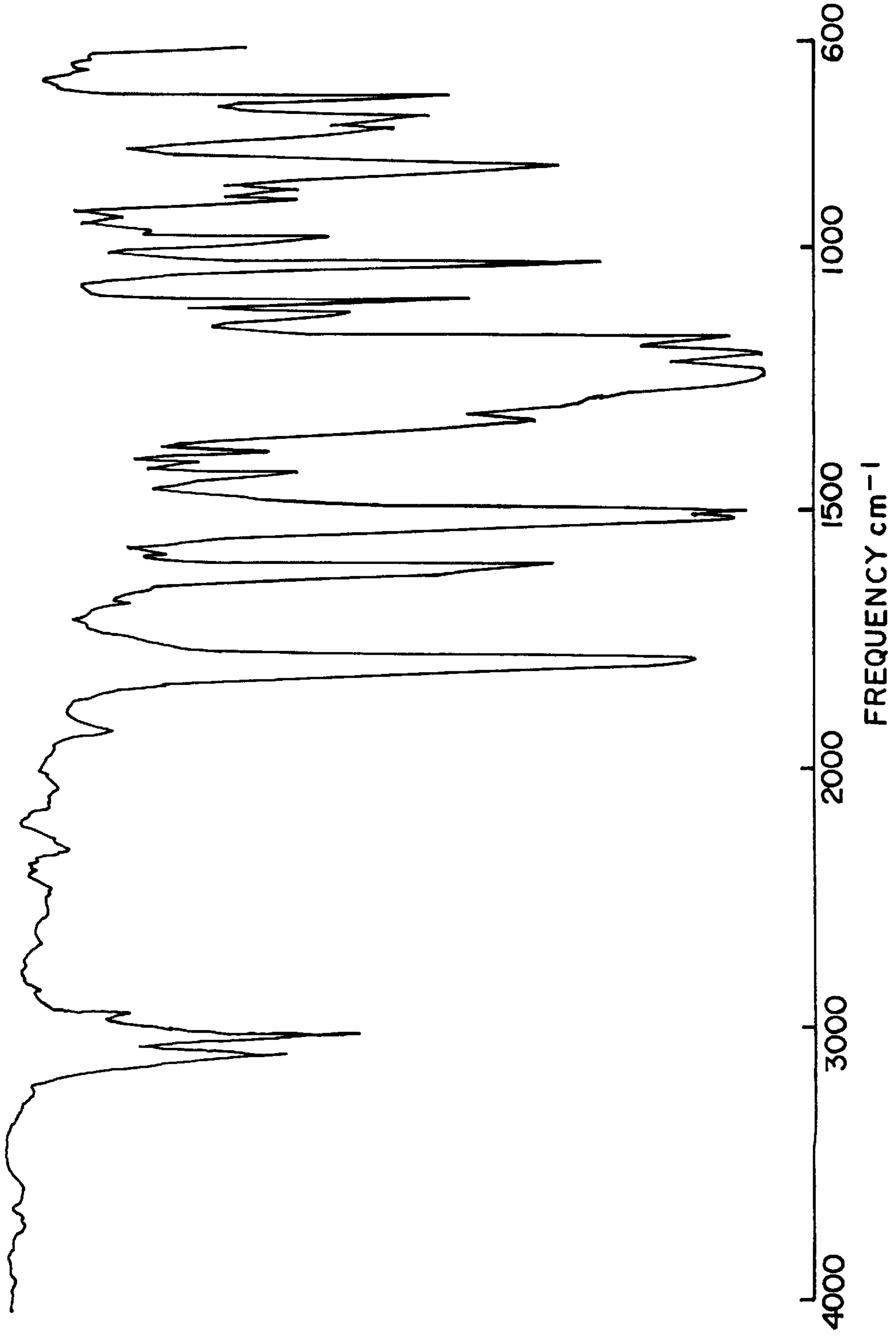
Figure 23:
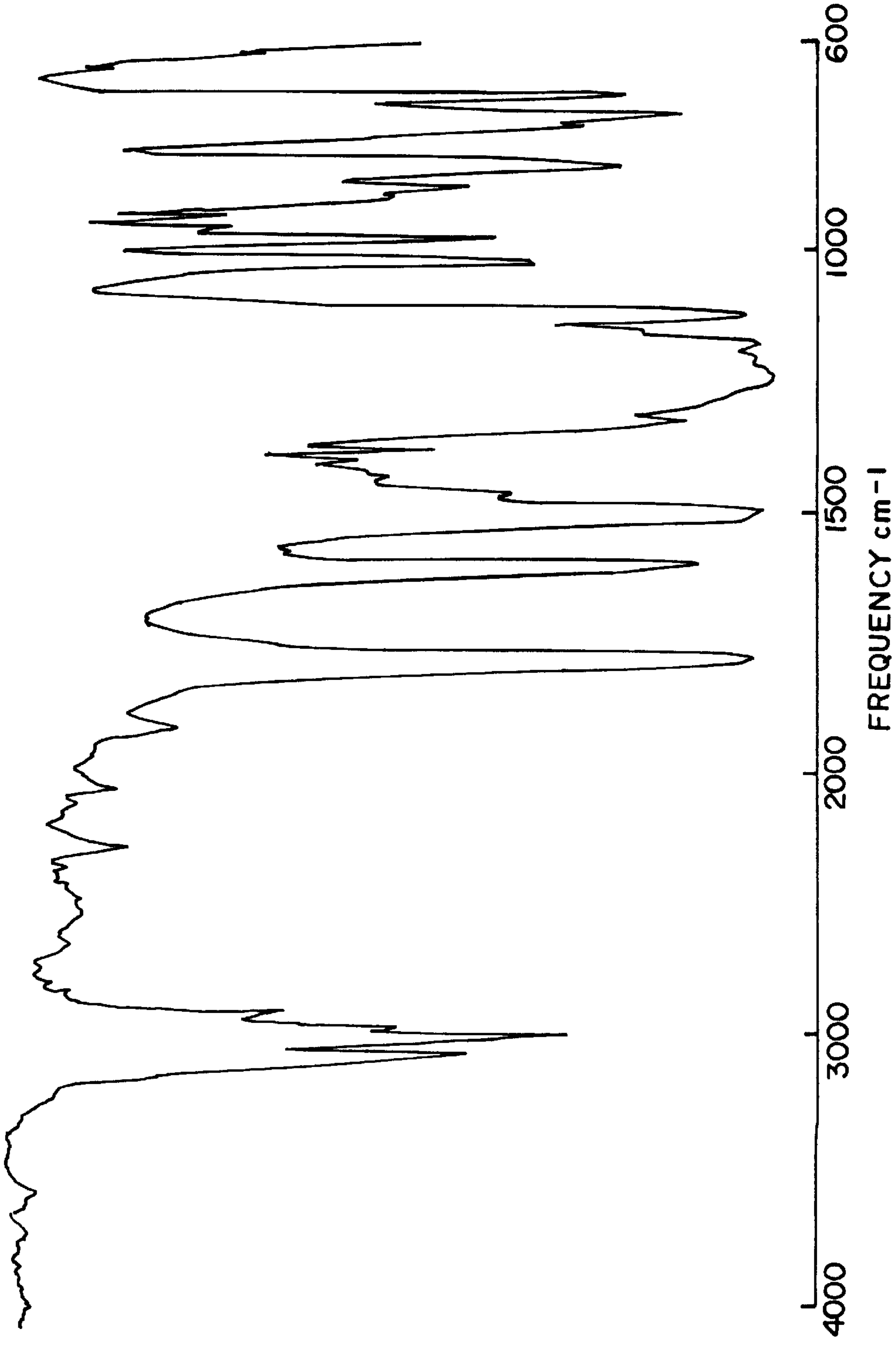
Figure 24:
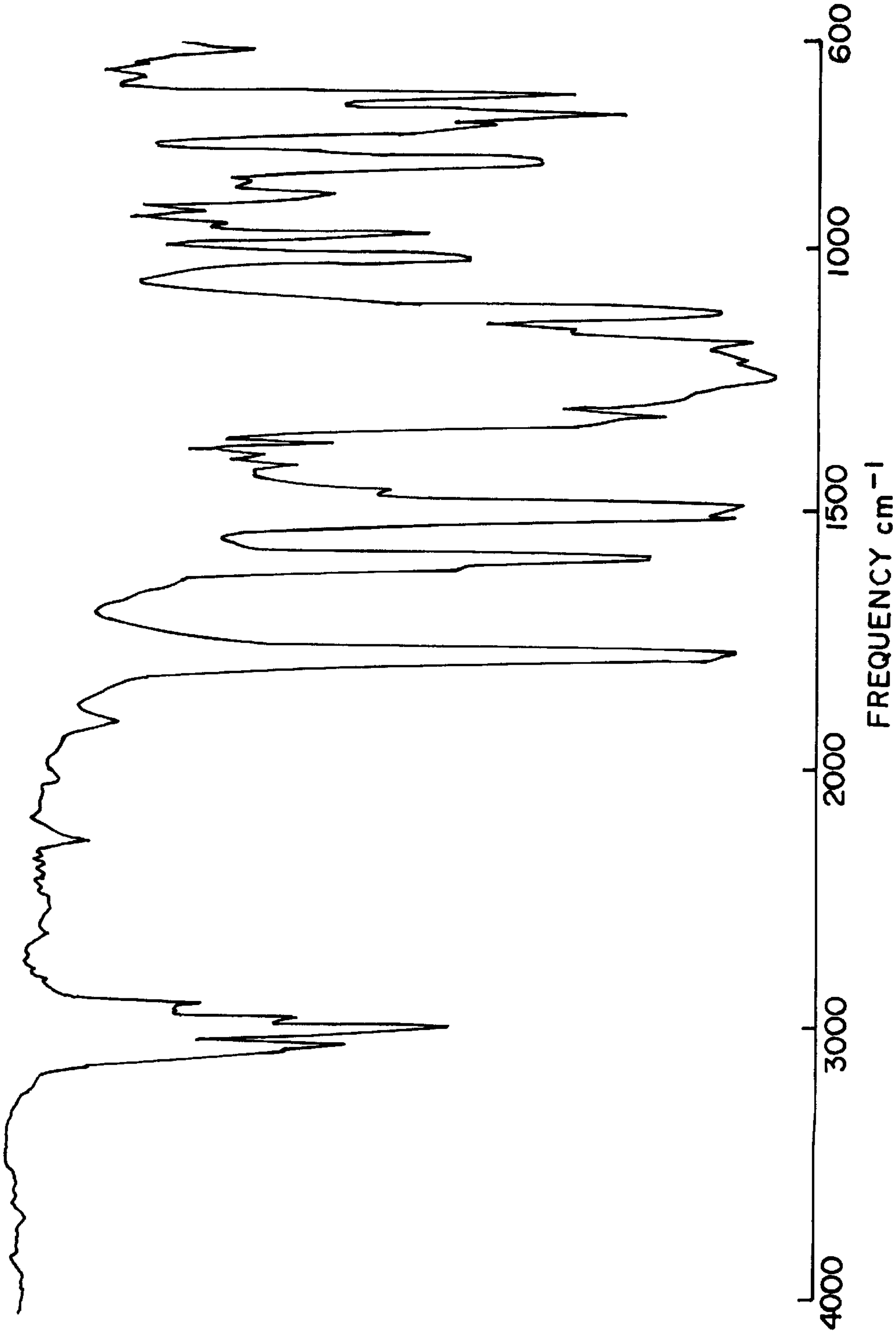

FIG. 20 shows an infrared spectrum of the aromatic polycarbonate resin No. 4, taken by use of a cast film.

EXAMPLE 1-5 AND 1-8

Synthesis of Aromatic Polycarbonate Resins Nos. 5 to 8

The procedure for preparation of the aromatic polycarbonate resin No. 4 in Example 1-4 was repeated except that the diol compound No. 1 and bisphenol A used in Example 1-4 were replaced by the respective diol compounds shown in TABLE 7B.

Thus, aromatic polycarbonate resins No. 5 to No. 8 according to the present invention were obtained, each having the structural units shown in TABLE 8.

The glass transition temperature (Tg), the polystyrene-reduced number-average molecular weight (Mn), the polystyrene-reduced weight-average molecular weight (Mw), and the results of the elemental analysis of each of the obtained aromatic polycarbonate resins No. 5 to No. 8 are shown in TABLE 8.

FIGS. 21, 22, 23 and 24 respectively show infrared spectra of the aromatic polycarbonate resins Nos. 5, 6, 7 and 8 obtained in Examples 1-5, 1-6, 1-7 and 1-8, taken by use of a cast film.

TABLE 7A

| Example No. | Raw Materials Diol with charge transporting properties (See TABLE 1) |
|---|---|
| 1-1 | 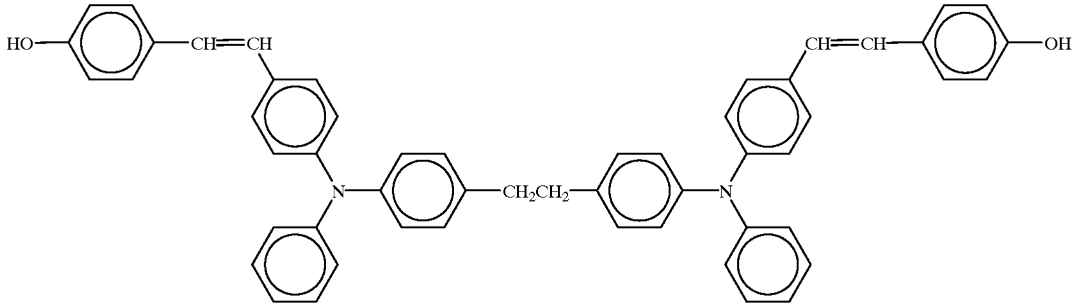 (Diol No. 1) |

TABLE 7A-continued
1-2
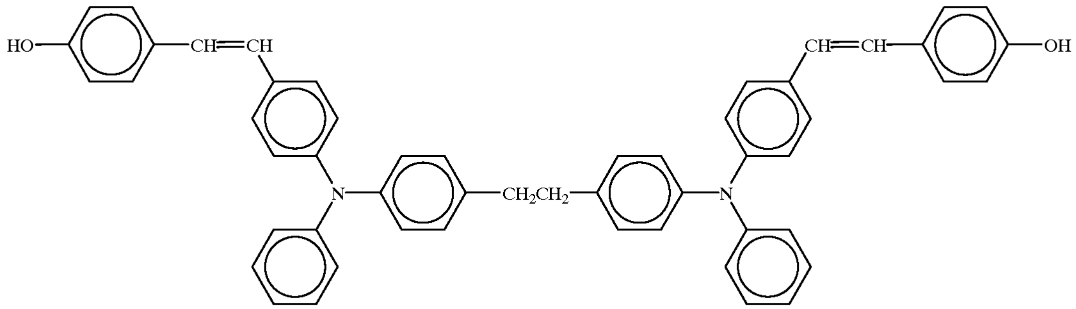
(Diol No. 1)
1-3
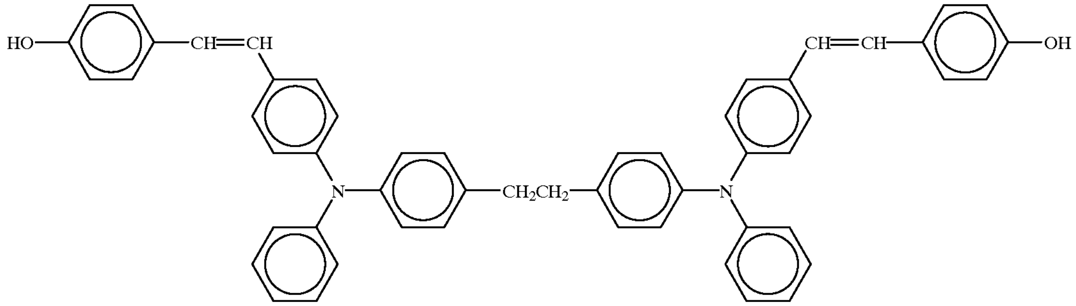
(Diol No. 1)
| Example No. | Raw Materials Bis(chloroformate) compound) | Poly-carbonate Resin No. |
|---|---|---|
| 1-1 | 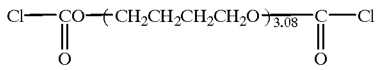 | 1 |
| 1-2 | 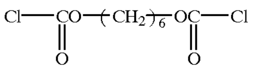 | 2 |
| 1-3 | 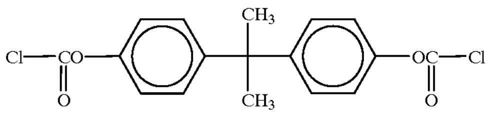 | 3 |
TABLE 7B
| Example No. | Raw Materials Diol with charge transporting properties (See TABLE 1) |
|---|---|
| 1-4 | 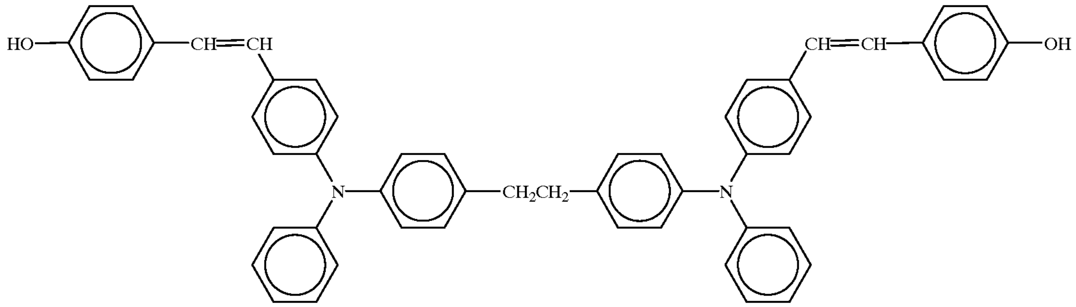 (Diol No. 1) |

TABLE 7B-continued
| | |
|---|---|
| 1-5 | 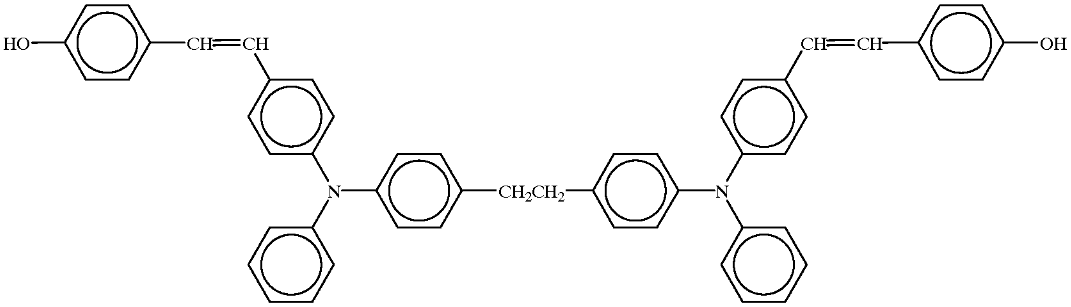 (Diol No. 1) |
| 1-6 | 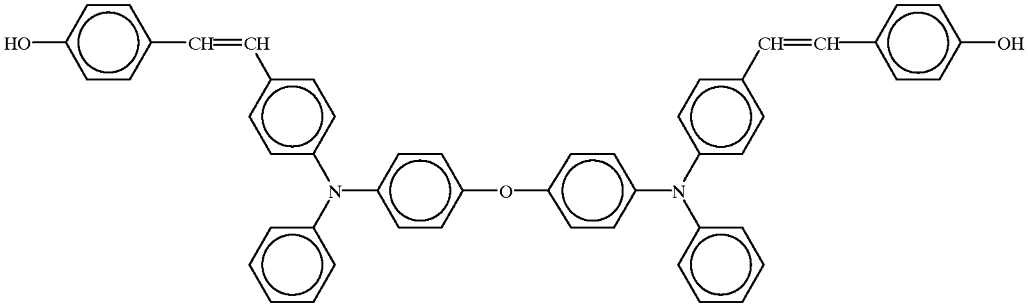 (Diol No. 12) |
| Example No. | Raw Materials Bis(chloroformate compound) | Poly-carbonate Resin No. |
|---|---|---|
| 1-4 | 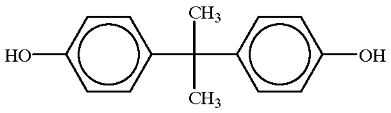 | 4 |
| 1-5 | 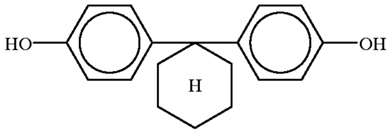 | 5 |
| 1-6 | 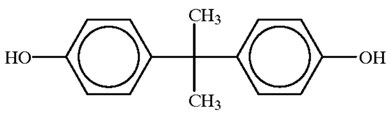 | 6 |

TABLE 8
| Example No. | Polycarbonate Resin No. | Structure of Polycarbonate Resin | Molecular Weight Mn | Molecular Weight Mw | Elemental Analysis % C Found (Calcd.) | Elemental Analysis % H Found (Calcd.) | Elemental Analysis % N Found (Calcd.) | Tg (° C.) |
|---|---|---|---|---|---|---|---|---|
| 1-1 | 1 | 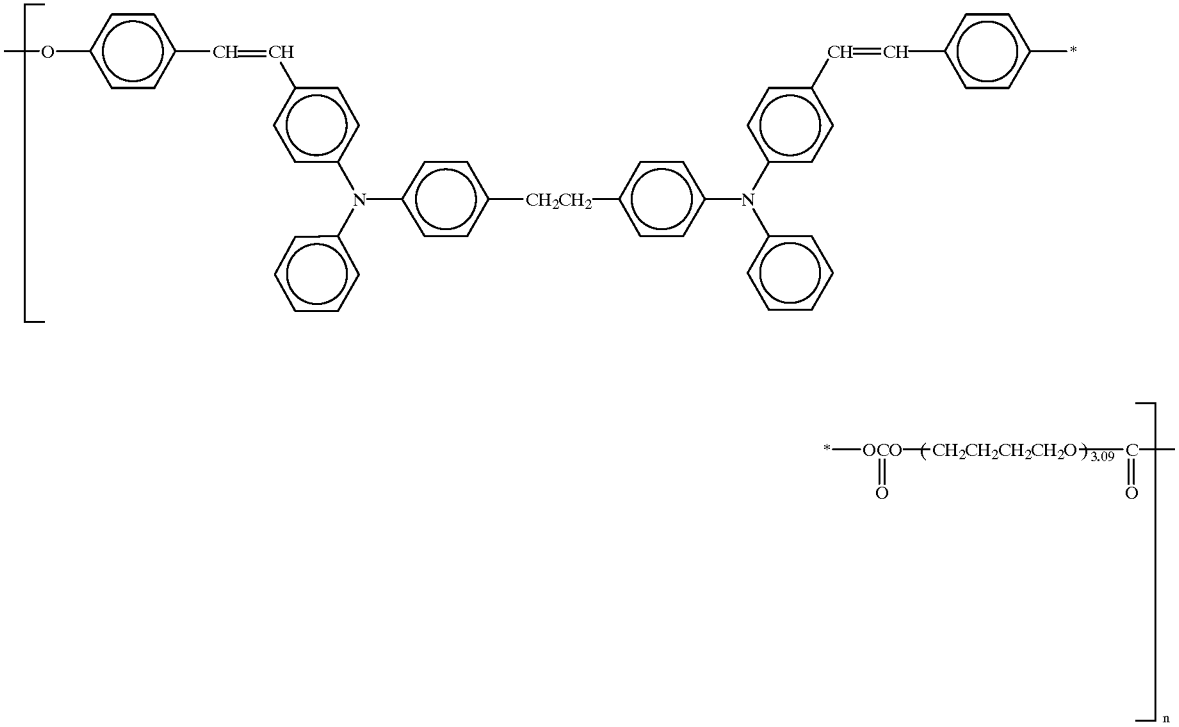 | 21700 | 41500 | 78.44 (78.51) | 6.52 (6.43) | 2.66 (2.68) | 82.3 |

TABLE 8-continued
| Example No. | Polycarbonate Resin No. | Structure of Polycarbonate Resin | Molecular Weight Mn | Molecular Weight Mw | Elemental Analysis % C Found (Calcd.) | Elemental Analysis % H Found (Calcd.) | Elemental Analysis % N Found (Calcd.) | Tg (° C.) |
|---|---|---|---|---|---|---|---|---|
| 1-2 | 2 | 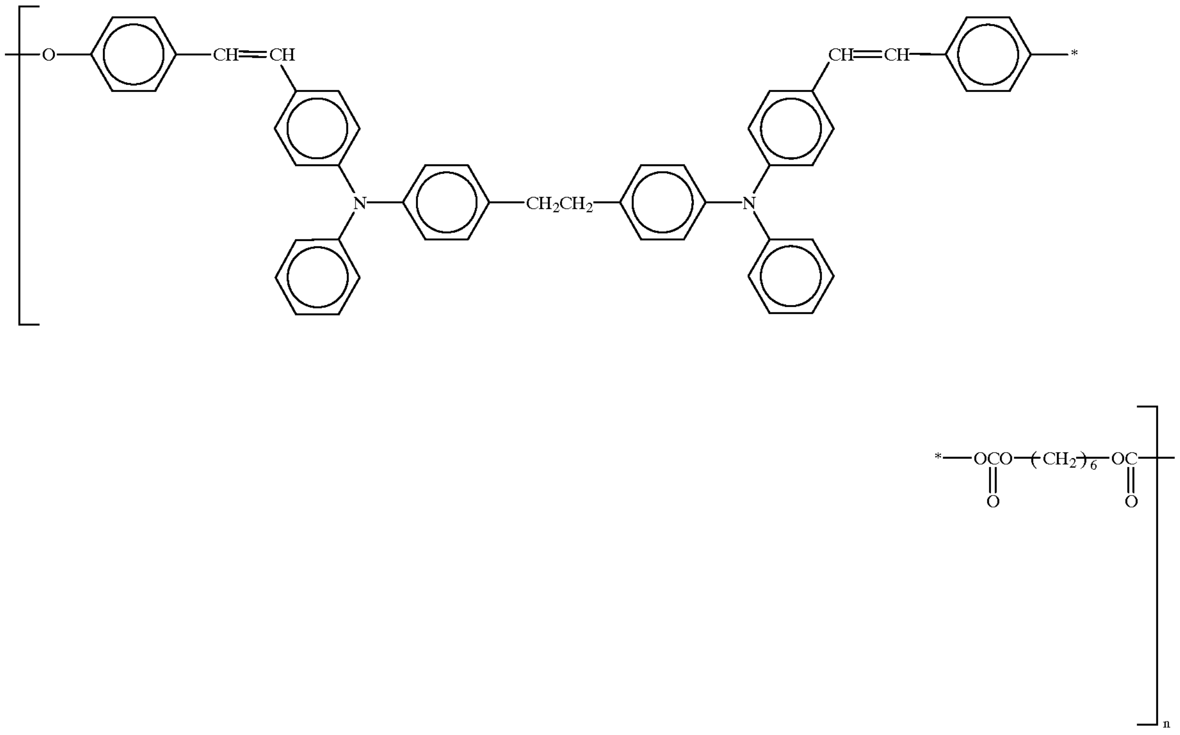 | 23400 | 60800 | 80.56 (80.67) | 5.96 (5.90) | 3.06 (3.04) | 136.3 |

TABLE 8-continued
| Example No. | Polycarbonate Resin No. | Structure of Polycarbonate Resin | Molecular Weight Mn | Molecular Weight Mw | Elemental Analysis % C Found (Calcd.) | Elemental Analysis % H Found (Calcd.) | Elemental Analysis % N Found (Calcd.) | Tg (° C.) |
|---|---|---|---|---|---|---|---|---|
| 1-3 | 3 | 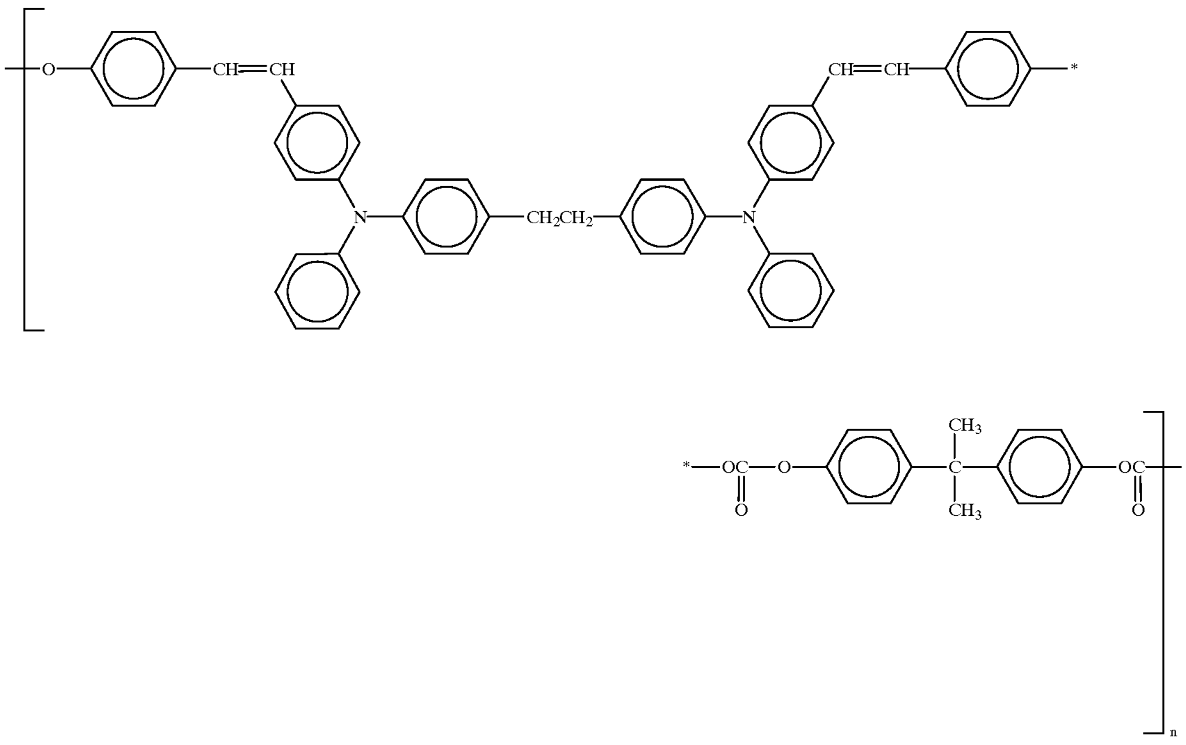 | 5700 | 10800 | 82.76 (82.53) | 5.49 (5.46) | 2.78 (2.71) | 146.1 |

TABLE 8-continued
| Example No. | Polycarbonate Resin No. | Structure of Polycarbonate Resin | Molecular Weight Mn | Molecular Weight Mw | Elemental Analysis % C Found (Calcd.) | Elemental Analysis % H Found (Calcd.) | Elemental Analysis % N Found (Calcd.) | Tg (° C.) |
|---|---|---|---|---|---|---|---|---|
| 1-4 | 4 | 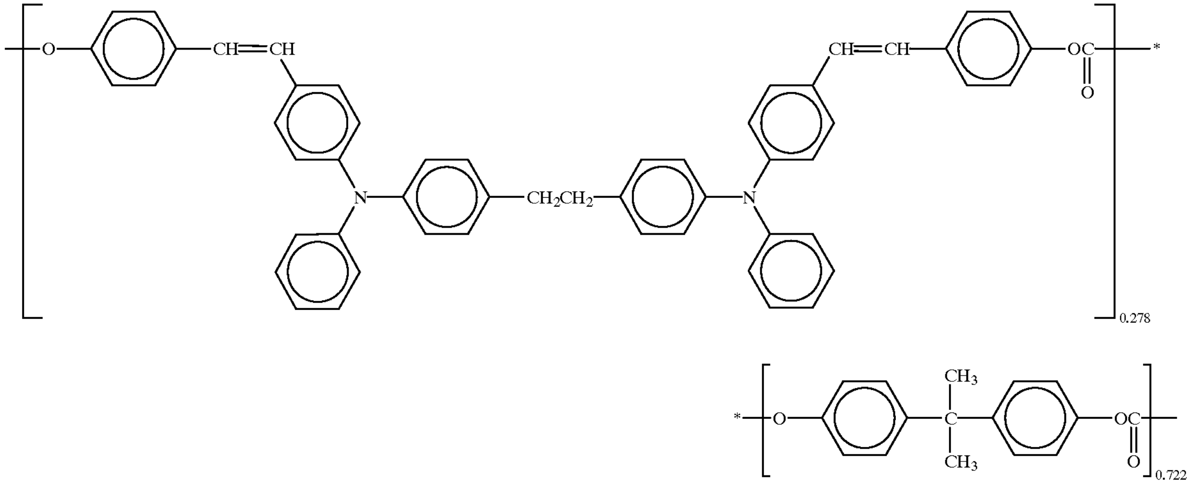 | 28400 | 127400 | 80.44 (80.56) | 5.37 (5.49) | 2.13 (1.96) | 171.2 |
| 1-5 | 5 | 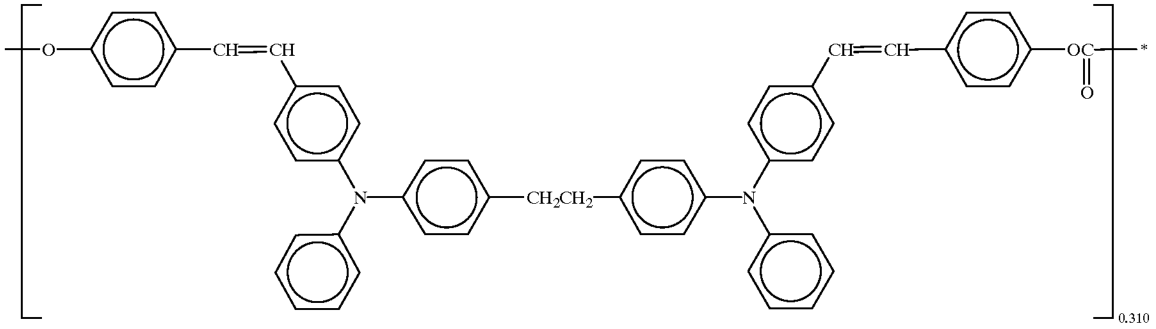 | 46600 | 142500 | 81.44 (81.48) | 5.74 (5.77) | 2.24 (1.95) | 173.9 |

TABLE 8-continued
| Example No. | Polycarbonate Resin No. | Structure of Polycarbonate Resin | Molecular Weight Mn | Molecular Weight Mw | Elemental Analysis % C Found (Calcd.) | Elemental Analysis % H Found (Calcd.) | Elemental Analysis % N Found (Calcd.) | Tg (° C.) |
|---|---|---|---|---|---|---|---|---|
| 1-6 | 6 | 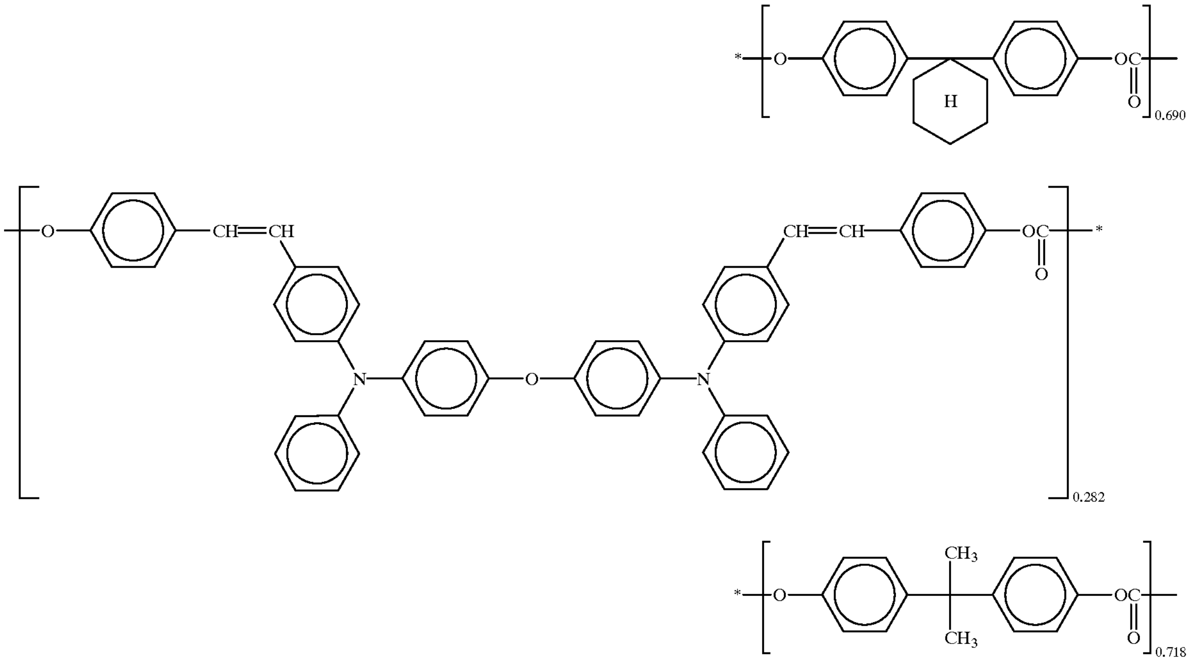 | 46600 | 139000 | 79.49 (79.61) | 5.13 (5.25) | 2.01 (1.98) | 183.7 |

TABLE 8-continued
| Example No. | Polycarbonate Resin No. | Structure of Polycarbonate Resin | Molecular Weight Mn | Molecular Weight Mw | Elemental Analysis % C Found (Calcd.) | Elemental Analysis % H Found (Calcd.) | Elemental Analysis % N Found (Calcd.) | Tg (° C.) |
|---|---|---|---|---|---|---|---|---|
| 1-7 | 7 | 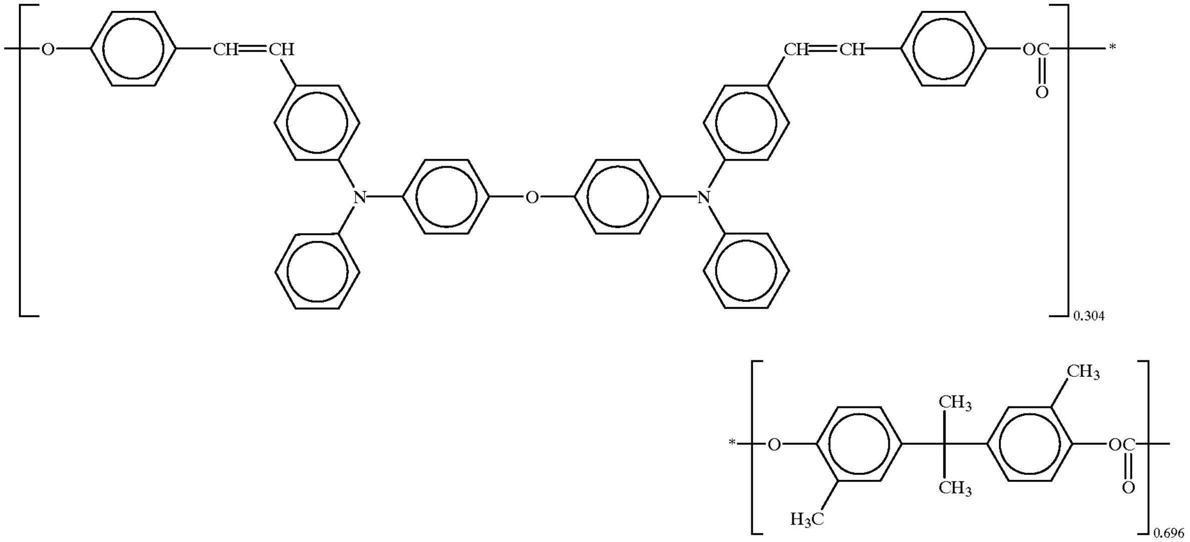 | 45000 | 143700 | 80.01 (80.06) | 5.58 (5.65) | 1.97 (1.98) | 160.9 |

TABLE 8-continued
| Example No. | Polycarbonate Resin No. | Structure of Polycarbonate Resin | Molecular Weight Mn | Molecular Weight Mw | Elemental Analysis % C Found (Calcd.) | Elemental Analysis % H Found (Calcd.) | Elemental Analysis % N Found (Calcd.) | Tg (° C.) |
|---|---|---|---|---|---|---|---|---|
| 1-8 | 8 | 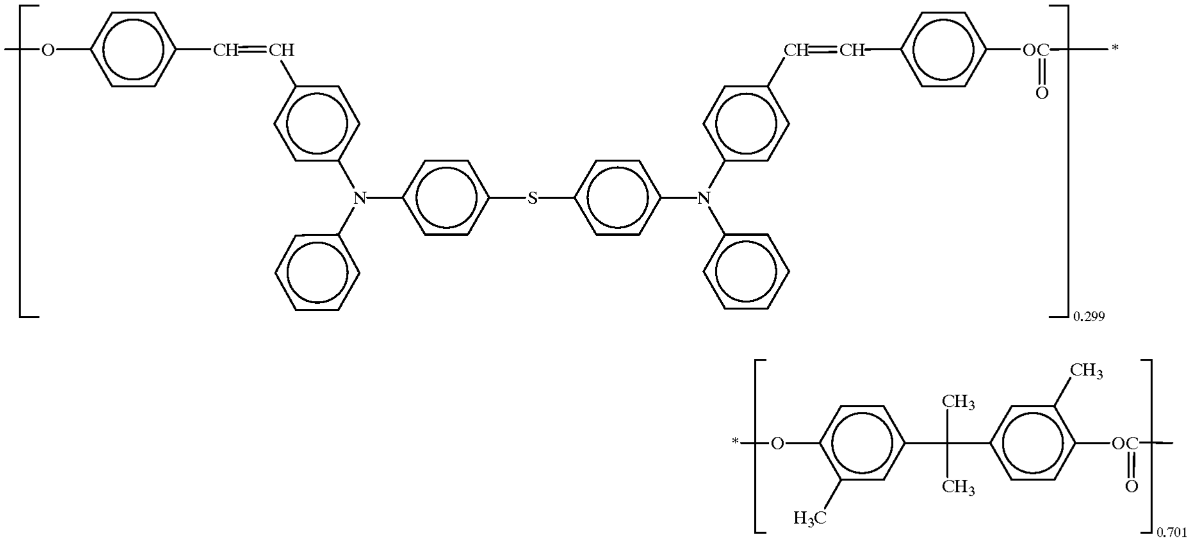 | 44000 | 143600 | 79.02 (79.14) | 5.52 (5.60) | 1.89 (1.94) | 164.8 |

Example 2-1

[Fabrication of Photoconductor No. 1]

(Formation of intermediate layer)

A commercially available polyamide resin (Trademark "CM-8000", made by Toray Industries, Inc.) was dissolved in a mixed solvent of methanol and butanol, so that a coating liquid for an intermediate layer was prepared.

The thus prepared coating liquid was coated on an aluminum plate by a doctor blade, and dried at room temperature, so that an intermediate layer with a thickness of 0.3 μm was provided on the aluminum plate.

(Formation of charge generation layer)

A coating liquid for a charge generation layer was prepared by pulverizing and dispersing a bisazo compound of the following formula, serving as a charge generation material, in a mixed solvent of cyclohexanone and 2-butanone in a ball mill. The thus obtained coating liquid was coated on the above prepared intermediate layer by a doctor blade, and dried at room temperature. Thus, a charge generation layer with a thickness of 0.5 μm was formed on the intermediate layer.

<Bisazo compound>

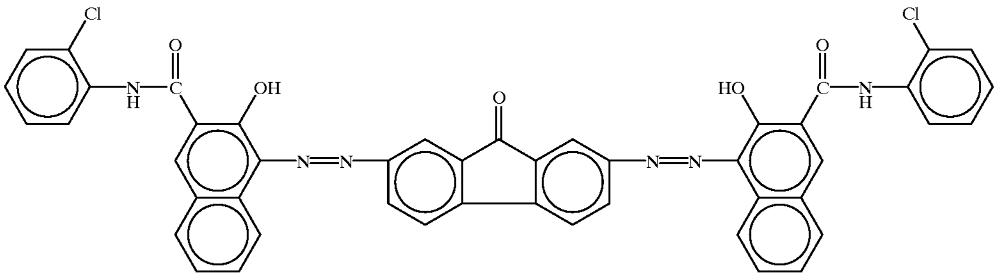

(Formation of charge transport layer)

The aromatic polycarbonate resin No. 1 shown in TABLE 8, prepared in Example 1-1, which served as a charge transport material, was dissolved in dichloromethane. The thus obtained coating liquid was coated on the above prepared charge generation layer by a doctor blade, and dried at room temperature and then at 120° C. for 20 minutes, so that a charge transport layer with a thickness of 20 μm was provided on the charge generation layer.

Thus, an electrophotographic photoconductor No. 1 according to the present invention was fabricated.

Examples 2-2 to 2-8

The procedure for fabrication of the layered electrophotographic photoconductor No. 1 in Example 2-1 was repeated except that the aromatic polycarbonate resin No. 1 for use in the charge transport layer coating liquid in Example 2-1 was replaced by each of the aromatic polycarbonate resins shown in TABLE 9.

Thus, electrophotographic photoconductors No. 2 to No. 8 according to the present invention were fabricated.

Each of the electrophotographic photoconductors No. 1 through No. 8 according to the present invention obtained in Examples 2-1 to 2-8 was charged negatively in the dark under application of −6 kV of corona charge for 20 seconds, using a commercially available electrostatic copying sheet testing apparatus ("Paper Analyzer Model SP-428" made by Kawaguchi Electro Works Co., Ltd.). The surface potential Vm (V) was measured.

Then, each electrophotographic photoconductor was allowed to stand in the dark for 20 seconds without applying any charge thereto, and the surface potential Vo (V) of the photoconductor was measured.

Each photoconductor was then illuminated by a tungsten lamp in such a manner that the illuminance on the illuminated surface of the photoconductor was 4.5 lux, and the exposure $E_{2/2}$ (lux·sec) required to reduce the surface potential Vo(V) to ½× the surface potential Vo (V) was measured.

The results are shown in TABLE 9.

TABLE 9

| Example No. | Aromatic Polycarbonate Resin No. | −Vm (V) | −Vo (V) | $E_{1/2}$ (lux · sec) |
|---|---|---|---|---|
| 2-1 | No. 1 | 1323 | 1030 | 1.06 |
| 2-2 | No. 2 | 1470 | 1205 | 1.17 |
| 2-3 | No. 3 | 637 | 507 | 0.79 |
| 2-4 | No. 4 | 1591 | 1382 | 1.11 |
| 2-5 | No. 5 | 1582 | 1363 | 1.07 |
| 2-6 | No. 6 | 1490 | 1295 | 1.06 |
| 2-7 | No. 7 | 1590 | 1386 | 1.08 |
| 2-8 | No. 8 | 1575 | 1378 | 1.10 |

Furthermore, each of the above obtained electrophotographic photoconductors No. 1 to No. 8 was set in a commercially available electrophotographic copying machine, and the photoconductor was charged and exposed to light images via the original images to form latent electrostatic images thereon. Then, the latent electrostatic images formed on the photoconductor were developed into visisble toner images by a dry developer, and the visible toner images were transferred to a sheet of plain paper and fixed thereon. As a result, clear toner images were obtained on the paper. When a wet developer was employed for the image formation, clear images were formed on the paper similarly.

As previously explained, the aromatic polycarbonate resin according to the present invention has the charge transporting properties and high mechanical strength, so that the photosensitive and durability of the photoconductor are sufficiently high when the aromatic polycarbonate resin is used in the photoconductive layer.

Japanese Patent Application No. 09-153846 filed Jun. 11, 1997, Japanese Patent Application No. 09-153988 filed Jun. 11, 1997, Japanese Patent Application No. 09-326324 filed Nov. 27, 1997, Japanese Patent Application No. 10-160845 filed Jun. 9, 1998, Japanese Patent Application No. 10-160853 filed Jun. 9, 1998, Japanese Patent Application No. 10-162207 filed Jun. 10, 1998, and Japanese Patent Application No. 10-162228 filed Jun. 10, 1998 are hereby incorporated by reference.

What is claimed is:

1. An aromatic polycarbonate resin comprising a structural unit of formula (1):

(1)

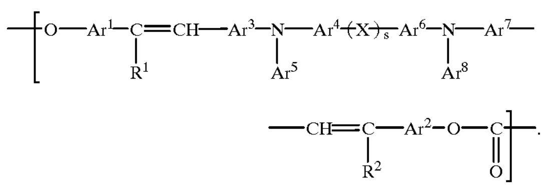

wherein $R^1$ and $R^2$, which may be the same or different, are each a hydrogen atom, an alkyl group which may have a substituent, or an aryl group which may have a substituent; $Ar^1$, $Ar^2$, $Ar^3$, $Ar^4$, $Ar^6$ and $Ar^7$, which may be the same or different, are each an arylene group which may have a substituent; $Ar^5$ and $Ar^8$, which may be the same or different, are each an aryl group which may have a substituent; X is —O—, —S—, —SO—, —$SO_2$—, —CO—, a straight-chain, branched or cyclic alkylene group having 1 to 12 carbon atoms, or an arylene group which may have a substituent; and s is an integer of 0 or 1.

2. An aromatic polycarbonate resin comprising a structural unit of formula (1) and a structural unit of formula (2), with a composition ratio of said structural unit of formula (1) to said structural unit of formula (2) satisfying a relationship of $0<k/(k+j)\leqq 1$, wherein k is a moiety ratio of said structural unit of formula (1) and j is a moiety ratio of said structural unit of formula (2) in said aromatic polycarbonate resin:

(1)

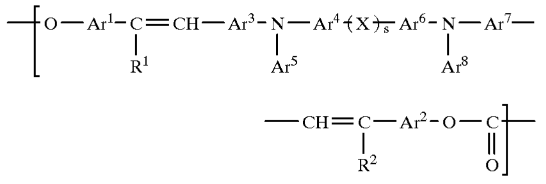

(2)

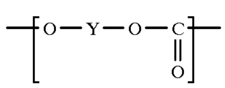

wherein $R^1$ and $R^2$, which may be the same or different, are each a hydrogen atom, an alkyl group which may have a substituent, or an aryl group which may have a substitutent; $Ar^1$, $Ar^2$, $Ar^3$, $Ar^4$, $Ar^6$ and $Ar^7$, which may be the same or different, are each an arylene group which may have a substituent; $Ar^5$ and $Ar^8$, which may be the same or different, are each an aryl group which may have a substitutent; X is —O—, —S—, —SO—, —$SO_2$—, —CO—, a straight-chain, branched or cyclic alkylene group having 1 to 12 carbon atoms, or an arylene group which may have a substituent; s is an integer of 0 or 1; and Y is a bivalent aliphatic group, a bivalent cyclic aliphatic group, a bivalent aromatic group, a bivalent group obtained by bonding the above-mentioned bivalent groups, or

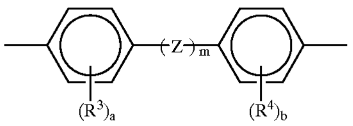

or

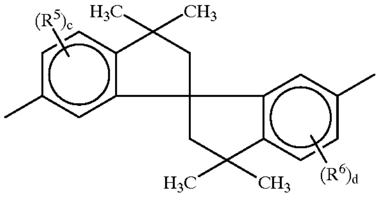

in which $R^3$, $R^4$, $R^5$ and $R^6$ are each independently an alkyl group which may have a substituent, an aryl group which may have a substituent, or a halogen atom; a and b are each independently an integer of 0 to 4; c and d are each independently an integer of 0 to 3; and m is an integer of 0 or 1, provided that when m=1, Z is a straight-chain alkylene group having 2 to 12 carbon atoms, —O—, —S—, —SO—, —$SO_2$—, —CO—,

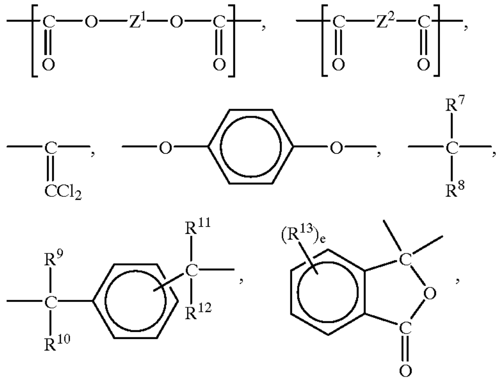

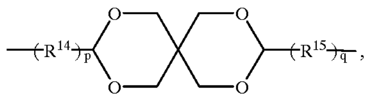

or

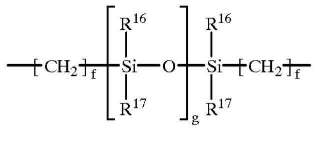

in which $Z^1$ and $Z^2$ are each a bivalent aliphatic group which may have a substituent or an arylene group which may have a substituent; and $R^7$, $R^8$, $R^9$, $R^{10}$, $R^{11}$, $R^{12}$ and $R^{13}$ are each independently a hydrogen atom, a halogen atom, an alkyl group having 1 to 5 carbon atoms which may have a substituent, and alkoxyl group having 1 to 5 carbon atoms which may have a substituent, or an aryl group which may have a substituent, and $R^7$ and $R^8$ may form a carbocyclic ring or heterocyclic ring having 6 to 12 carbon atoms in combination, or may form a carbocyclic ring or heterocyclic ring in combination with $R^3$ and $R^4$; p and q are each an integer of 0 or 1, provided that when p and q represent 1, $R^{14}$ and $R^{15}$ are each an alkylene group having 1 to 4 carbon atoms; $R^{16}$ and $R^{17}$ are each independently an alkyl group having 1 to 5 carbon atoms which may have a substituent, or an aryl group which may have a substituent; e is an integer of 0 of 4; f is an integer of 0 to 20; and g is an integer of 0 to 2000.

3. The polycarbonate resin as claimed in claim 1, wherein said structural unit of formula (1) is represented by formula (4):

(4)

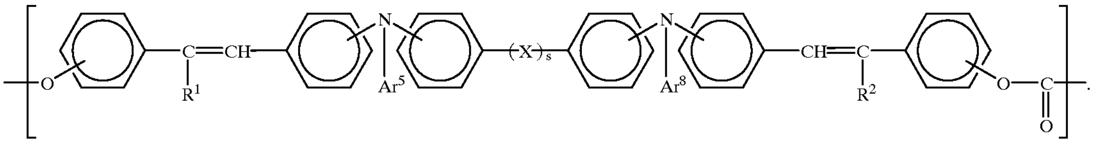

wherein $R^1$, $R^2$, $Ar^5$, $Ar^8$, X and s are respectively the same as defined in formula (1).

4. The polycarbonate resin as claimed in claim 3, wherein said structural unit of formula (4) is represented by formula (6):

(6)

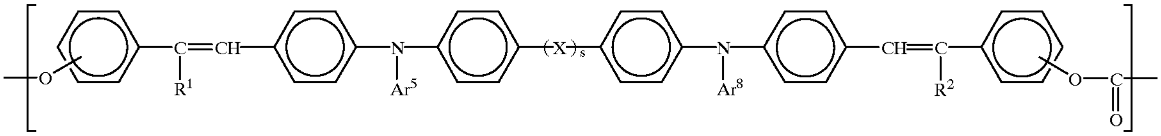

wherein $R^1$, $R^2$, $Ar^5$, $Ar^8$, X and s are respectively the same as defined in formula (4).

5. The polycarbonate resin as claimed in claim 4, wherein said structural unit of formula (6) is represented by formula (8):

(8)

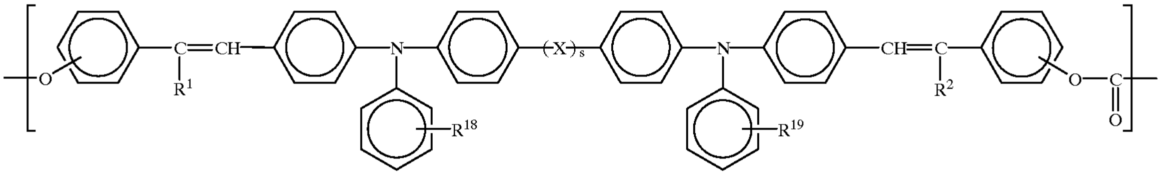

wherein $R^1$, $R^2$, X and s are respectively the same as defined in formula (6); and $R^{18}$ and $R^{19}$, which may be the same or different, are each a hydrogen atom, an alkyl group which may have a substituent, or an aryl group which may have a substitutent.

6. The polycarbonate resin as claimed as claim 2, wherein said structural unit of formula (1) is represented by formula (4):

(4)

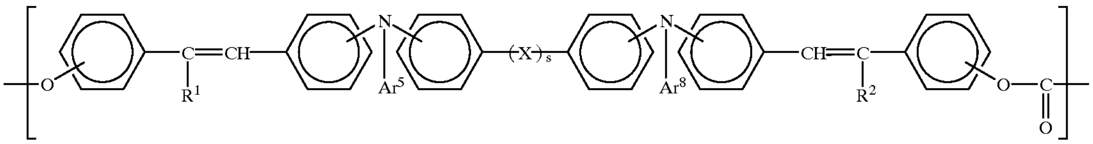

wherein $R^1$, $R^2$, $Ar^5$, $Ar^8$, X and s are respectively the same as defined in formula (1).

7. The polycarbonate resin as claimed in claim 6, wherein said structural unit of formula (4) is represented by formula (6):

(6)

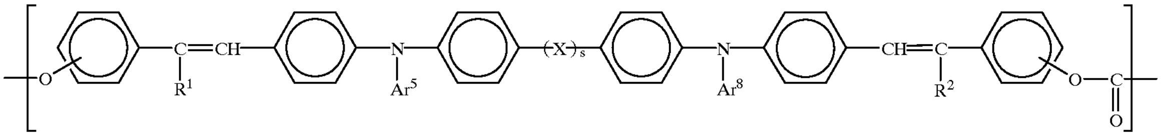

wherein $R^1$, $R^2$, $Ar^5$, $Ar^8$, X and s are representively the same as defined in formula (4).

8. The polycarbonate resin as claimed in claim 7, wherein said structural unit of formula (6) is represented by formula (8):

(8)

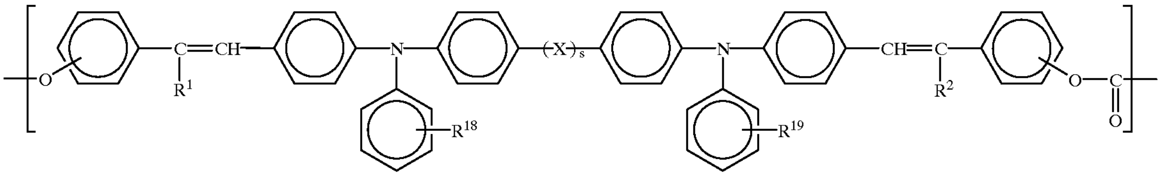

wherein $R^1$, $R^2$, X and s are respectively the same as defined in formula (6); and $R^{18}$ and $R^{19}$, which may be the same or different, are each a hydrogen atom, an alkyl group which may have a substituent, or an aryl group which may have a substituent.

9. An aromatic polycarbonate resin comprising a repeat unit of formula (3):

(3)

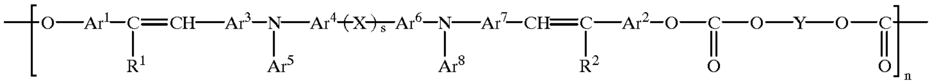

wherein $R^1$ and $R^2$, which may be the same or different, are each a hydrogen atom, and alkyl group which may have a substituent, or an aryl group which may have a substituent; $Ar^1$, $Ar^2$, $Ar^3$, $Ar^4$, $Ar^6$ and $Ar^7$, which may be the same or different, are each an arylene group which may have a substituent; $Ar^5$ and $Ar^2$, which may be the same or different, are each an aryl group which may have a substituent; X is —O—, —S—, —SO—, —$SO_2$—, —CO—, a straight-chain, branched or cyclic alkylene group having 1 to 12 carbon atoms, or an arylene group which may have a substituent; s is an integer of 0 or 1; n is an integer of 2 to 5000; and Y is a bivalent aliphatic group, a bivalent cyclic aliphatic group, a bivalent aromatic group, a bivalent group obtained by bonding the above-mentioned bivalent groups, or

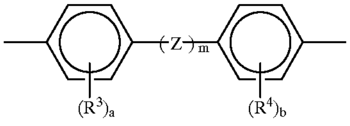

or

-continued

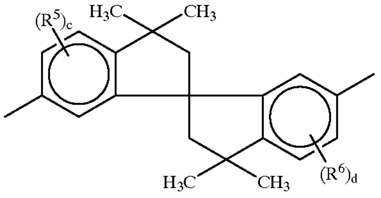

in which $R^3$, $R^4$, $R^5$ and $R^6$ are each independently an alkyl group which may have a substituent, an aryl group which may have a substituent, or a halogen atom; a and b are each independently an integer of 0 to 4; c and d are each independently an integer of 0 to 3; and m is an integer of 0 or 1, provided that when m=1, Z is a straight-chain alkylene group having 2 to 12 carbon atoms, —O—, —S—, —SO—, —$SO_2$—, —CO—,

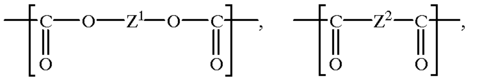

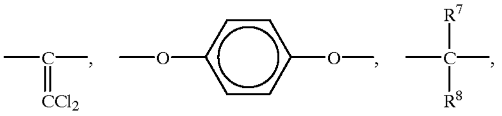

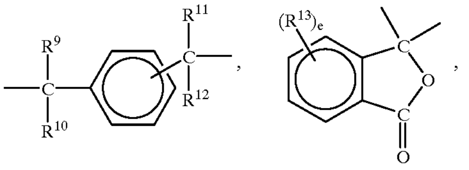

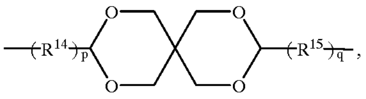 or

-continued

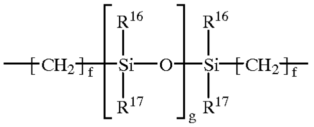

group which may have a substituent or an arylene group which may have a substituent; and $R^7$, $R^8$, $R^9$, $R^{10}$, $R^{11}$, $R^{12}$ and $R^{13}$ are each independently a hydrogen atom, a halogen atom, and alkyl group having 1 to 5 carbon atoms which may have a substituent, an alkoxyl group having 1 to 5 carbon atoms which may have a substituent, or an aryl group which may have a substituent, and $R^7$ and $R^8$ may form a carbocyclic ring or heterocyclic ring having 6 to 12 carbon atoms in combination, or may form a carbocyclic ring or heterocyclic ring in combination with $R^3$ and $R^4$; p and q are each an integer of 0 or l, provided that when p and q represent 1, $R^{14}$ and $R^{15}$ are each an alkylene group having 1 to 4 carbon atoms; $R^{16}$ and $R^{17}$ are each independently an alkyl group having 1 to 5 carbon atoms which may have a substituent, or an aryl group which may have a substitutent; e is an integer of 0 to 4; f is an integer of 0 to 20; and g is an integer of 0 to 2000.

10. The polycarbonate resin as claimed in claim 9, wherein said repeat unit of formula (3) is represented by formula (5):

(5)

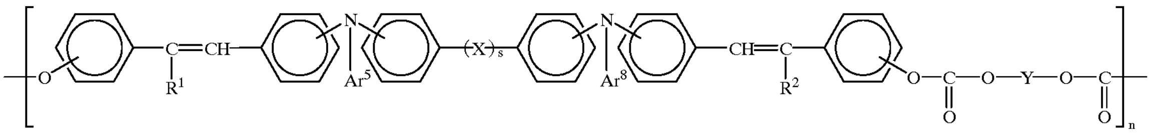

wherein $R^1$, $R^2$, $Ar^5$, $Ar^8$, s, X, Y and n are respectively the same as defined in formula (3).

11. The polycarbonate resin as claimed in claim 10, wherein said repeat unit of formula (5) is represented by formula (7):

(7)

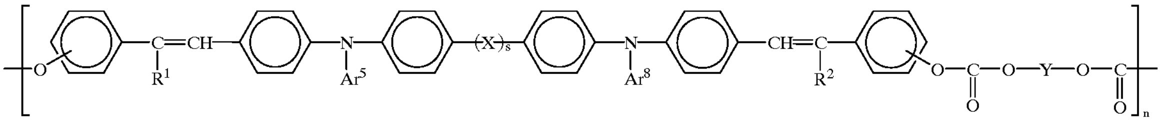

wherein $R^1$, $R^2$, $Ar^5$, $Ar^8$, s, X, Y and n are respectively the same as defined in formula (5).

12. The polycarbonate resin as claimed in claim 11, wherein said repeat unit of formula (7) is represented by formula (9):

(9)

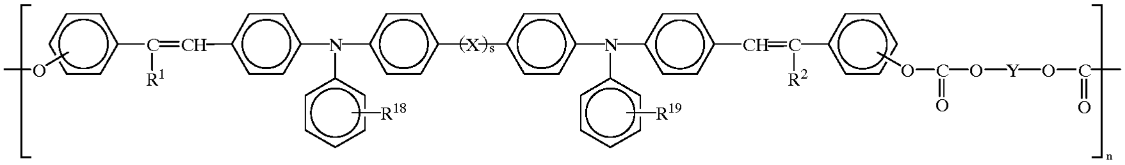

wherein $R^1$, $R^2$, s, X, Y and n are respectively the same as defined in formula (7); and $R^{18}$ and $R^{19}$, which may be the same or different, are each a hydrogen atom, an alkyl group which may have a substituent, or an aryl group which may have a substituent.

* * * * *

UNITED STATES PATENT AND TRADEMARK OFFICE

CERTIFICATE OF CORRECTION

PATENT NO. : 6,172,176 B1
DATED : January 9, 2001
INVENTOR(S) : Chiaki Tanaka et al.

It is certified that error appears in the above-identified patent and that said Letters Patent is hereby corrected as shown below:

Column 8,
Line 13, "the second" should read -- The second --;
Line 59, "and may of" should read -- and many of --.

Column 9,
Line 42, "by (1)," should read -- by formula (1), --.

Column 13,
Line 29, "wherein $R^1$ 1," should read -- wherein $R^1$, --.

Column 14,
Line 65, "hologenated carbonyl" should read -- halogenated carbonyl --.

Column 15,
Line 34, "formula (4) are" should read -- formula (14) are --.

Column 16,
Line 14, "and discholoropropane;" should read -- and dicholoropropane --.

Column 18,
Line 33, "trimethylamine" should read -- triethylamine --;
Line 34, "agent," should read -- agents, --.

Column 19,
Line 3, "(issued b" should read -- (issued by --.

Column 20,
Line 3, "bisphenylyl group." should read -- biphenylyl group. --.

Column 45,
Table 1, Row 20, " $—CH_2CH_2—$ "

should read -- $—CH_2CH_2CH_2—$ --.

UNITED STATES PATENT AND TRADEMARK OFFICE

CERTIFICATE OF CORRECTION

PATENT NO. : 6,172,176 B1
DATED : January 9, 2001
INVENTOR(S) : Chiaki Tanaka et al.

It is certified that error appears in the above-identified patent and that said Letters Patent is hereby corrected as shown below:

Column 61,
Line 29, "substituent," should read -- substituent; --.

Column 64,
Line 20, "$Ar^5$ and $Ar^7$," should read -- $Ar^6$ and $Ar^7$, --;
Line 43, "formula —$P^{30}$ $(R^{22})_3B^-$," should read -- formula —$P^+$ $(R^{22})_3B^-$, --.

Column 67,
Table 2 formula,

“  ”

Should read -- 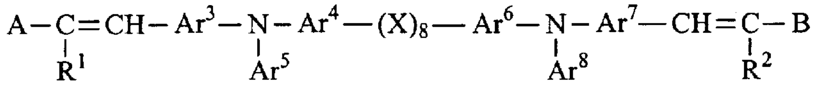 --

Column 73,
Table 2, row 25, 2nd circle benzene,

“ 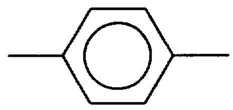 ”

should read -- 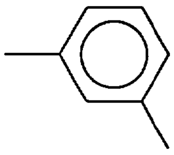 --.

UNITED STATES PATENT AND TRADEMARK OFFICE

CERTIFICATE OF CORRECTION

PATENT NO. : 6,172,176 B1 
DATED : January 9, 2001
INVENTOR(S) : Chiaki Tanaka et al.

It is certified that error appears in the above-identified patent and that said Letters Patent is hereby corrected as shown below:

Column 110,
formula (21),

“

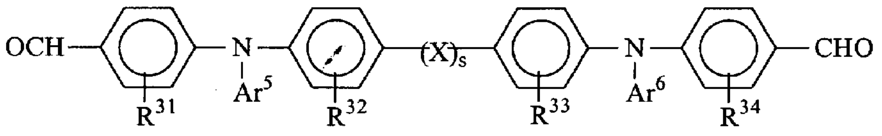

”

should read

--

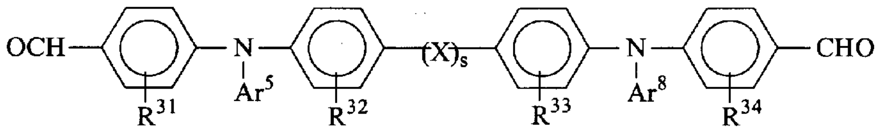

--.

Column 112
formula (24)

“

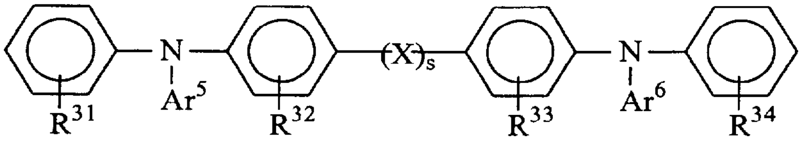

”

T should read

--

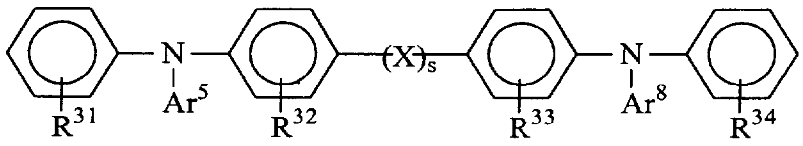

--;

UNITED STATES PATENT AND TRADEMARK OFFICE

CERTIFICATE OF CORRECTION

PATENT NO. : 6,172,176 B1
DATED : January 9, 2001
INVENTOR(S) : Chiaki Tanaka et al.

It is certified that error appears in the above-identified patent and that said Letters Patent is hereby corrected as shown below:

Column 112 cont'd.
Table 3, Column headings
"Aldehyde Comp. No. $R^{31}$ $R^{32}$ $R^{35}$ $R^{34}$ $R^{33}$ $R^{36}$ X"

should read
-- Aldehyde Comp. No. $R^{31}$ $R^{32}$ $R^{33}$ $R^{34}$ $R^{35}$ $R^{36}$ X --.

Column 117,
Line 12, "triethylene glycol-bis(4-hydroxybenzoate), 1,3-bis(4-"
should read -- triethylene glycol-bis(4-hydroxybenzoate), --;
Line 13, "hydroxyphenyl)-tetramethyldisiloxane, and"
should read -- 1,3-bis(4-hydroxyphenyl)-tetramethyldisiloxane, and Column 129,
Table 6, Example 3-2, Column %C, "84.31/(84.34)" should read -- 84.34/(84.30) --.

Column 135,
Table 7B, insert the following:

TABLE 7B (continued)

| Example No. | Raw Materials | | Poly-carbonate Resin No. |
|---|---|---|---|
| | Diol with charge transporting properties (See TABLE 1) | Bis(chloroformate compound) | |
| 1-7 | 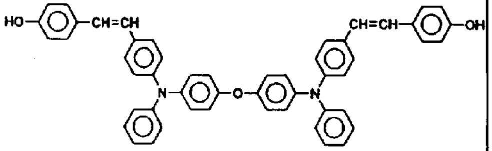 (Diol No. 12) | 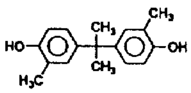 | 7 |
| 1-8 | 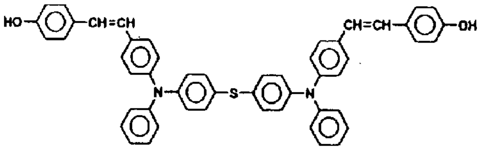 (Diol No. 14) | 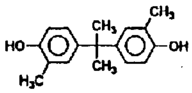 | 8 |

UNITED STATES PATENT AND TRADEMARK OFFICE

CERTIFICATE OF CORRECTION

PATENT NO. : 6,172,176 B1
DATED : January 9, 2001
INVENTOR(S) : Chiaki Tanaka et al.

It is certified that error appears in the above-identified patent and that said Letters Patent is hereby corrected as shown below:

Column 152,
Line 8, "exposure $E_{2/2}$" should read -- exposure $E_{1/2}$ --;
Line 9, "to ½x the" should read -- to ½ the --;
Line 56, "photosensitive" should read -- photosensitivity --.

Column 160,
Lines 13 and 14, "group which may have a substituent or an arylene group" should read -- in which $Z^1$ and $Z^2$ are each a bivalent aliphatic group which may have a substituent or an arylene group --.

Signed and Sealed this

Thirtieth Day of July, 2002

Attest:

JAMES E. ROGAN

*Attesting Officer* *Director of the United States Patent and Trademark Office*